(12) United States Patent
Amimoto et al.

(10) Patent No.: US 11,699,961 B2
(45) Date of Patent: Jul. 11, 2023

(54) THREE-LEVEL POWER CONVERSION DEVICE

(71) Applicant: Mitsubishi Electric Corporation, Tokyo (JP)

(72) Inventors: Takeshi Amimoto, Tokyo (JP); Naoki Nishio, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 113 days.

(21) Appl. No.: 17/603,003

(22) PCT Filed: Jul. 4, 2019

(86) PCT No.: PCT/JP2019/026731
§ 371 (c)(1),
(2) Date: Oct. 12, 2021

(87) PCT Pub. No.: WO2021/002016
PCT Pub. Date: Jan. 7, 2021

(65) Prior Publication Data
US 2022/0181991 A1    Jun. 9, 2022

(51) Int. Cl.
*H02M 7/483*    (2007.01)
*H02M 7/487*    (2007.01)
(Continued)

(52) U.S. Cl.
CPC ........... *H02M 7/487* (2013.01); *H02M 1/007* (2021.05); *H02M 1/126* (2013.01); *H02M 7/483* (2013.01);
(Continued)

(58) Field of Classification Search
CPC ........ H02M 1/007; H02M 1/12; H02M 7/483; H02M 7/487; H02M 7/5387; H02M 7/53871; H02M 7/5395
See application file for complete search history.

(56) References Cited

U.S. PATENT DOCUMENTS 9,013,906 B2*   4/2015   Itoh ....................... H02M 7/483
                                                363/132
2008/0067872 A1*   3/2008   Moth ....................... H02J 9/062
                                                 307/64
(Continued)

FOREIGN PATENT DOCUMENTS

| JP | 2015-27170 A | 2/2015 |
| JP | 2017-127115 A | 7/2017 |
| WO | 2010/095241 A1 | 8/2010 |

OTHER PUBLICATIONS

International Search Report and Written Opinion dated Sep. 17, 2019, received for PCT Application PCT/JP2019/026731, Filed on Jul. 4, 2019, 12 pages including English Translation.

*Primary Examiner* — Gary L Laxton
(74) *Attorney, Agent, or Firm* — Xsensus LLP

(57) ABSTRACT

A bridge circuit includes a first leg and a second leg arranged in parallel between the first node and the third node. A clamp circuit includes a third leg including a first bidirectional switch disposed between a fourth node that is a midpoint of the first leg and a fifth node that is a midpoint of the second leg. A first reactor is connected with the fourth node and a sixth node, and a second reactor is connected with a fifth node and a seventh node. A fourth leg includes a second bidirectional switch disposed between the second node and the fourth node or the fifth node.

18 Claims, 40 Drawing Sheets

(51) Int. Cl.
*H02M 1/00* (2006.01)
*H02M 1/12* (2006.01)
*H02M 7/5387* (2007.01)
*H02M 7/5395* (2006.01)

(52) U.S. Cl.
CPC ..... *H02M 7/5387* (2013.01); *H02M 7/53871* (2013.01); *H02M 7/5395* (2013.01)

(56) References Cited

U.S. PATENT DOCUMENTS

| | | |
|---|---|---|
| 2011/0051478 A1 | 3/2011 | Sato et al. |
| 2016/0248334 A1 | 8/2016 | Patel et al. |
| 2018/0138827 A1* | 5/2018 | Goto ..................... H02M 7/521 |
| 2022/0181990 A1* | 6/2022 | Amimoto ............ H02M 1/0009 |

* cited by examiner

FIG.3

| BRIDGE CIRCUIT SWITCHING STATE | | CLAMP CIRCUIT SWITCHING STATE | | OUTPUT VOLTAGE VOUT | OPERATION MODE |
|---|---|---|---|---|---|
| ELEMENT 5 ELEMENT 8 | ELEMENT 6 ELEMENT 7 | ELEMENT 9 | ELEMENT 10 | | |
| ON | OFF | ON | OFF | POSITIVE BIAS | FIRST SWITCHING MODE |
| OFF | OFF | ON | OFF | ZERO BIAS | FIRST DEAD TIME MODE |
| OFF | OFF | ON | ON | ZERO BIAS | SECOND SWITCHING MODE |
| OFF | ON | OFF | ON | NEGATIVE BIAS | THIRD SWITCHING MODE |
| OFF | OFF | OFF | ON | ZERO BIAS | SECOND DEAD TIME MODE |

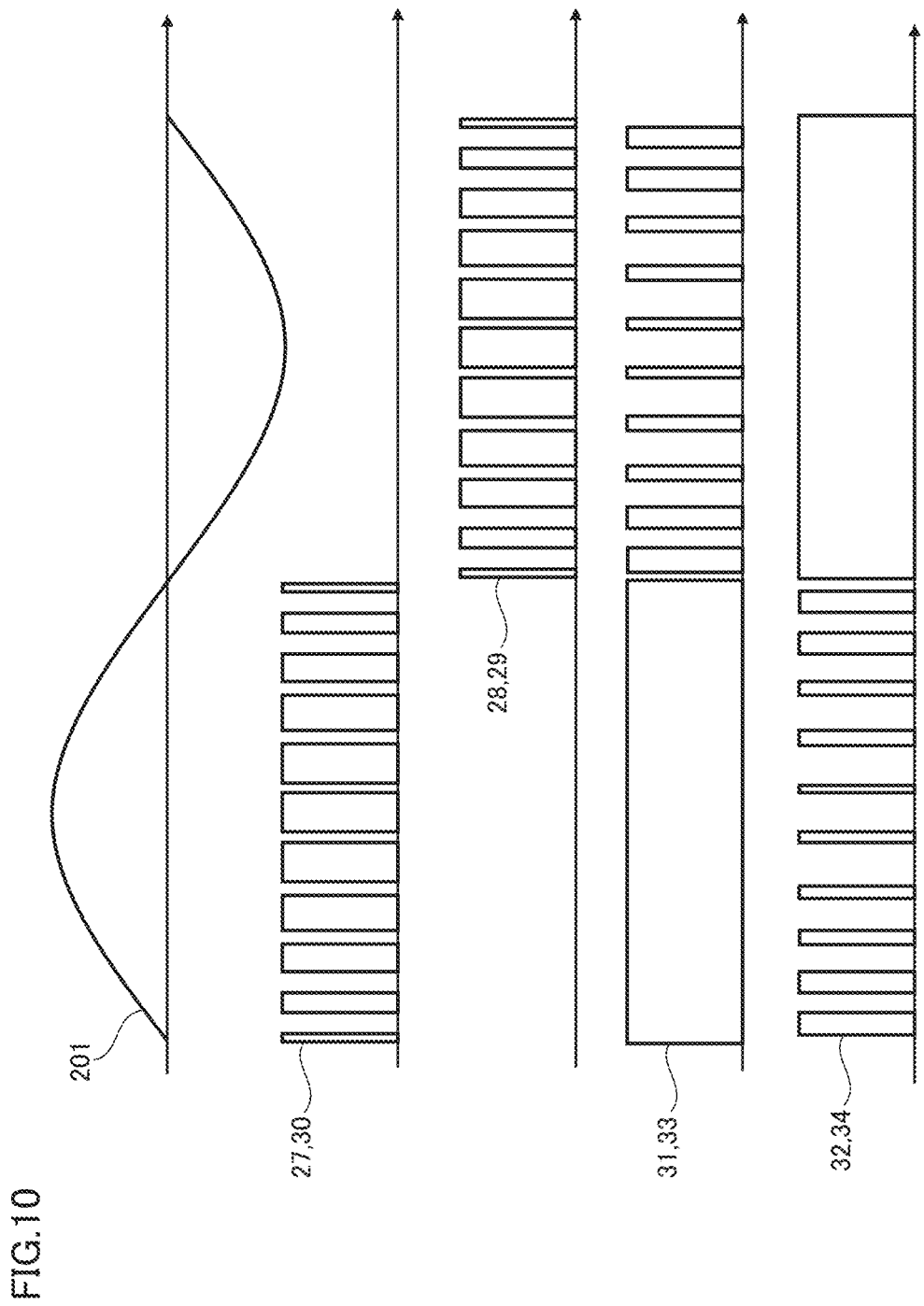

FIG.11

| BRIDGE CIRCUIT SWITCHING STATE | | CLAMP CIRCUIT SWITCHING STATE | | OUTPUT VOLTAGE VOUT | OPERATION MODE |
|---|---|---|---|---|---|
| ELEMENT 5 ELEMENT 8 | ELEMENT 6 ELEMENT 7 | ELEMENT 9 | ELEMENT 10 | | |
| ON | OFF | ON | OFF | POSITIVE BIAS | FIRST SWITCHING MODE |
| OFF | OFF | ON | OFF | ZERO BIAS | FIRST DEAD TIME MODE |
| OFF | OFF | ON | ON | ZERO BIAS | SECOND SWITCHING MODE |
| OFF | ON | OFF | ON | NEGATIVE BIAS | THIRD SWITCHING MODE |
| OFF | OFF | OFF | ON | ZERO BIAS | SECOND DEAD TIME MODE |

THREE-LEVEL POWER CONVERSION DEVICE

CROSS-REFERENCE TO RELATED APPLICATION

The present application is based on PCT filing PCT/JP2019/026731, filed Jul. 4, 2019, the entire contents of which are incorporated herein by reference.

TECHNICAL FIELD

The present invention relates to a three-level power conversion device.

BACKGROUND ART

A three-level power conversion device including a clamp circuit is known. For example, a three-level power conversion device described in PTL 1 includes a bridge circuit, a filter circuit, a clamp circuit, and a control circuit. The bridge circuit converts a DC voltage and outputs an AC voltage. The filter circuit attenuates a high-frequency component of the AC voltage output from the bridge circuit. The clamp circuit is interposed between the bridge circuit and the filter circuit, and can short-circuit an output side of the bridge circuit. The control circuit controls a plurality of switching elements included in the bridge circuit and the clamp circuit to output the AC voltage having at least three voltage levels from the filter circuit.

CITATION LIST

Patent Literature

PTL 1: Japanese Patent Laying-Open No. 2017-127115

SUMMARY OF INVENTION

Technical Problem

When the three-level power conversion device including the clamp circuit is caused to perform single-phase three-wire operation, the following problem is generated. When the two AC powers output from the three-level power conversion device are different from each other, some currents pass through a power supply, but other currents do not pass through the power supply. As a result, the three-level power conversion device cannot continue stable operation.

An object of the present invention is to provide a three-level power conversion device including a clamp circuit capable of performing the stable single-phase three-wire operation.

Solution to Problem

A three-level power conversion device according to one aspect of the present invention includes: a first filter circuit including a first capacitor disposed between a first node to which a positive electrode of a DC power supply is connected and a second node and a second capacitor disposed between the second node and a third node to which a negative electrode of the DC power supply is connected; a bridge circuit including a first leg and a second leg disposed in parallel between the first node and the third node; a clamp circuit including a third leg including a first bidirectional switch disposed between a fourth node that is a midpoint of the first leg and a fifth node that is a midpoint of the second leg; a second filter circuit including a first reactor including a first terminal connected to the fourth node and a second terminal connected to a sixth node and a second reactor including a first terminal connected to the fifth node and a second terminal connected to a seventh node; and a fourth leg including a second bidirectional switch disposed between the second node and the fourth node or the fifth node.

Advantageous Effects of Invention

When the three-level power conversion device of the present invention includes the second bidirectional switch, generation of the state in which part of the current passes through the power supply (DC power supply, first capacitor, second capacitor) but other currents do not pass through the power supply (DC power supply, first capacitor, second capacitor) can be reduced in the case of different magnitudes of the two AC powers output from the three-level power conversion device. As a result, the three-level power conversion device can continue stable operation.

BRIEF DESCRIPTION OF DRAWINGS

FIG. 3 is a view illustrating a relationship between states of switching elements included in a bridge circuit 200 and a clamp circuit 300 and an output voltage VOUT and an operation mode of the power conversion device 1 when the switching elements 11, 12 are not used.

FIG. 10 is a view illustrating the AC power command value 201 and the drive signal 27 to 34 during the single-phase three-wire operation when the switching elements 11, 12 of the power conversion device 1 of the first embodiment are used.

FIG. 11 is a view illustrating the relationship between the states of the switching elements included in the bridge circuit 200 and the clamp circuit 300 and the output voltage VOUT and the operation mode of the power conversion device 1 when the switching elements 11, 12 are used.

DESCRIPTION OF EMBODIMENTS

With reference to the drawings, embodiments will be described below.

First Embodiment

Figure 1:
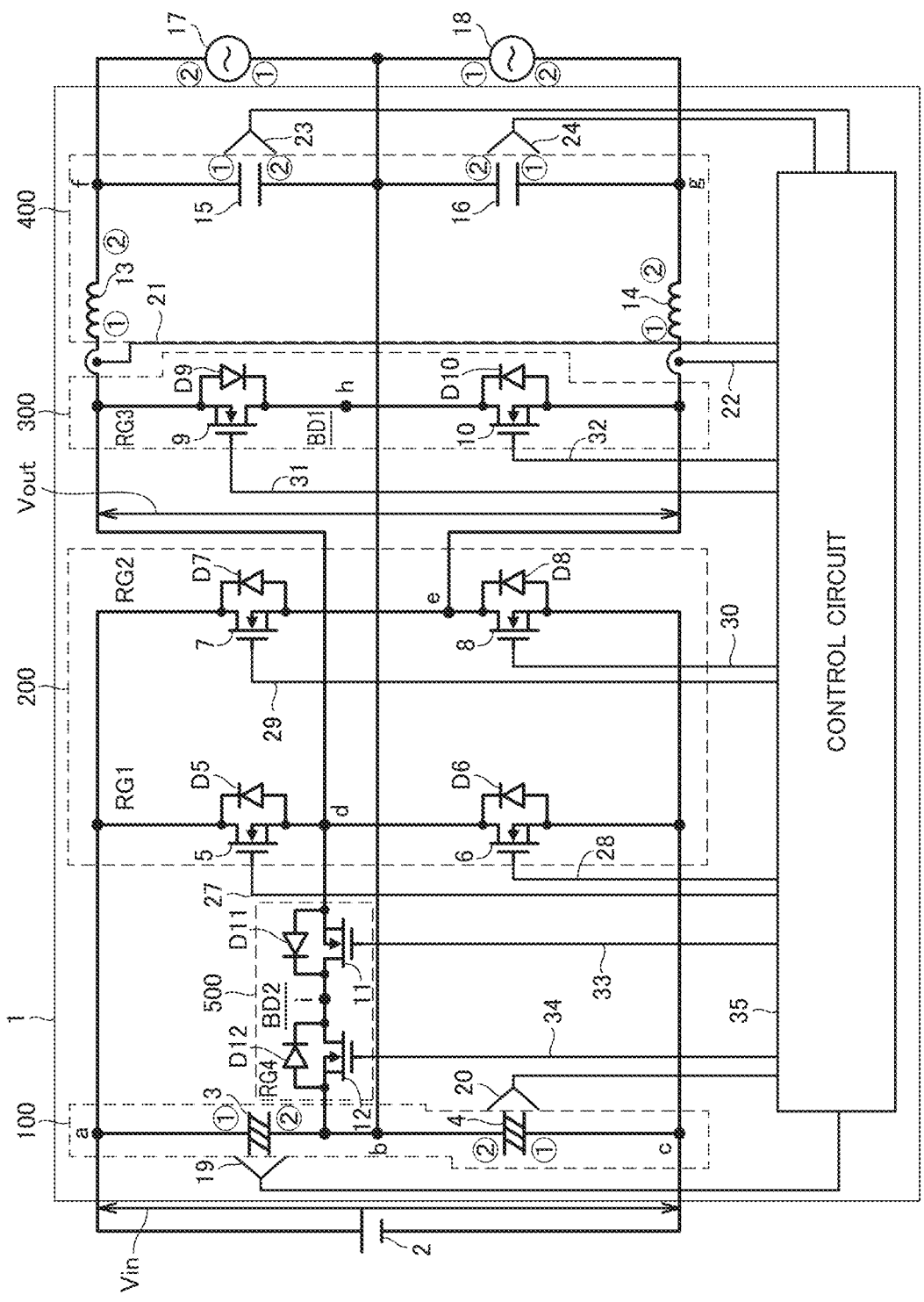
FIG. 1 is a view illustrating a configuration of a power conversion device 1 according to a first embodiment.

FIG. 1 is a view illustrating a configuration of a power conversion device 1 according to a first embodiment. Power conversion device 1 is a three-level power conversion device. In the following description, the three-level power conversion device is also referred to as a power conversion device.

An input of power conversion device 1 is connected to a DC power supply 2. An output of power conversion device 1 is connected to an AC power supply 17 and an AC power supply 18.

For example, DC power supply 2 is a DC stabilizing power supply, a fuel cell, a solar cell, a wind power generator, or a storage battery. DC power supply 2 may be directly connected to a power supply or may be connected to an inverter through a conversion mechanism such as a converter.

For example, AC power supply 17 and AC power supply 18 are a power system or an AC load. When DC power supply 2 is a secondary battery, not only discharge but also charge can be performed. Accordingly, power conversion device 1 can not only convert DC power into AC power, but also convert the AC power into the DC power.

Power conversion device 1 includes a first filter circuit 100, a bridge circuit 200, a clamp circuit 300, a second filter circuit 400, a fourth leg 500, voltage detectors 19 to 20, current detectors 21 to 22, voltage detectors 23 to 24, and a control circuit 35.

A positive electrode of DC power supply 2 is connected to a node a (first node). A negative electrode of DC power supply 2 is connected to a node c (third node). A first terminal of AC power supply 17 and the first terminal of AC power supply 18 are connected at a node b (second node). A second terminal of AC power supply 17 is connected to a node f (sixth node). A second terminal of AC power supply 18 is connected to a node g (seventh node).

First filter circuit 100 includes a capacitor 3 (first capacitor) disposed between node a and node b (second node) and a capacitor 4 (second capacitor) disposed between node b and node c. A first terminal of capacitor 3 is connected to node a. A second terminal of capacitor 3 is connected to node b. A first terminal of capacitor 4 is connected to node c. A second terminal of capacitor 4 is connected to node b.

Bridge circuit 200 includes a first leg RG1 and a second leg RG2 arranged in parallel between node a and node c. Bridge circuit 200 operates as an inverter circuit that converts the DC power supplied from DC power supply 2 into the AC power. Bridge circuit 200 converts a DC voltage VIN supplied from DC power supply 2 into an AC voltage defined by a combination of a positive bias (+VIN) and a negative bias (−VIN).

First leg RG1 includes a switching element 5 (first switching element) disposed between node a and a node d (fourth node) that is a midpoint of first leg RG1 and a switching element 6 (second switching element) disposed between node d and node c. A positive electrode of switching element 5 is connected to node a. A negative electrode of switching element 5 is connected to node d. A positive electrode of switching element 6 is connected to node d. A negative electrode of switching element 6 is connected to node c. First leg RG1 further includes a diode D5 (first diode) connected in antiparallel to switching element 5 and a diode D6 (second diode) connected in antiparallel to switching element 6.

Second leg RG2 includes a switching element 7 (third switching element) arranged between node a and a node e (fifth node) that is a midpoint of second leg RG2 and a switching element 8 (fourth switching element) disposed between node e and node c. A positive electrode of switching element 7 is connected to node a. A negative electrode of switching element 7 is connected to node e. A positive electrode of switching element 8 is connected to node e. A negative electrode of switching element 8 is connected to node c. Second leg RG2 further includes a diode D7 (third diode) connected in antiparallel to switching element 7 and a diode D8 (fourth diode) connected in antiparallel to switching element 8.

Clamp circuit 300 includes a third leg RG3 including a first bidirectional switch BD1 disposed between node d and node e. Clamp circuit 300 is configured to be capable of short-circuiting node d and node e.

First bidirectional switch BD1 includes a switching element 9 (fifth switching element), a switching element 10 (sixth switching element), a diode D9 (fifth diode), and a diode D10 (sixth diode). Switching element 9 is disposed between node d and a node h (eighth node). Switching element 10 is disposed between node h and node e. A negative electrode of switching element 9 is connected to node d. A negative electrode of switching element 10 is connected to node e. A positive electrode of switching element 9 and a positive electrode of switching element 10 are connected to node h. Diode D9 is connected in antiparallel to switching element 9. Diode D10 is connected in antiparallel to switching element 10.

Second filter circuit 400 includes a capacitor 15 (third capacitor) and a capacitor 16 (fourth capacitor) connected in series between node f and node g. A first terminal of the capacitor 15 is connected to node f, and a second terminal of capacitor 15 is connected to node b. A first terminal of capacitor 16 is connected to node g, and a second terminal of capacitor 16 is connected to node b.

Second filter circuit 400 further includes a reactor 13 (first reactor) and a reactor 14 (second reactor).

Reactor 13 (first reactor) is disposed between node d and node f. A first terminal of reactor 13 is connected to node d. A second terminal of reactor 13 is connected to node f.

Reactor 14 (second reactor) is disposed between node e and node g. A first terminal of reactor 14 is connected to node e. A second terminal of reactor 14 is connected to node g.

Fourth leg 500 (RG4) includes a second bidirectional switch BD2 disposed between node b and node d.

Second bidirectional switch BD2 includes a switching element 11 (eighth switching element), a switching element 12 (seventh switching element), a diode D11 (eighth diode), and a diode D12 (seventh diode).

Switching element 12 is disposed between node b and a node i (ninth node). Switching element 11 is disposed between node i and node d. A negative electrode of switching element 12 is connected to node b. A negative electrode of switching element 11 is connected to node d. A positive electrode of switching element 12 and a positive electrode of switching element 11 are connected to node i.

Diode D12 is connected in antiparallel to switching element 12. Diode D11 is connected in antiparallel to switching element 11.

Voltage detector 19 detects the voltage at both ends of capacitor 3. Voltage detector 20 detects the voltage at both ends of capacitor 4. Current detector 21 detects the current flowing through reactor 13. Current detector 22 detects the current flowing through reactor 14.

Voltage detector 23 detects the voltage at both ends of capacitor 15. Voltage detector 24 detects the voltage at both ends of capacitor 16.

Control circuit 35 receives output signals from voltage detectors 19, 20, 23, 24 and output signals from current detectors 21, 22. Control circuit 35 outputs a drive signal 27 driving switching element 5, a drive signal 28 driving switching element 6, a drive signal 29 driving switching element 7, a drive signal 30 driving switching element 8, a drive signal 31 driving switching element 9, a drive signal 32 driving switching element 10, a drive signal 33 driving switching element 11, and a drive signal 34 driving switching element 12.

Switching element 5 to 12 is configured by a metal oxide semiconductor field effect transistor (MOSFET), an insulated gate bipolar transistor (IGBT), or a high electron mobility transistor (HEMT). When switching element 5 to 12 is configured by the IGBT, a positive electrode of switching element 5 to 12 corresponds to a collector, a negative electrode corresponds to an emitter, and a control electrode corresponds to a gate. When switching element 5 to 12 is configured by the MOSFET, diodes D5 to D12 can utilize a parasitic diode formed in a direction from the source to the drain of the MOSFET or the HEMT. Capacitors 3, 4 are assumed to be electrolytic capacitors, but may be film capacitors or storage batteries.

Power conversion device 1 performs the single-phase three-wire operation or the single-phase two-wire operation. When power conversion device 1 performs the single-phase three-wire operation, it is assumed that AC power supply 17 and AC power supply 18 are loads that consume different power.

(A) When Switching Element 11 and Switching Element 12 are not Used

First, the case where switching element 11 and switching element 12 are not used will be described. Not using switching element 11 and switching element 12 means that switching element 11 and switching element 12 are always in an off-state, or that power conversion device 1 does not include switching element 11 and switching element 12.

Figure 2:
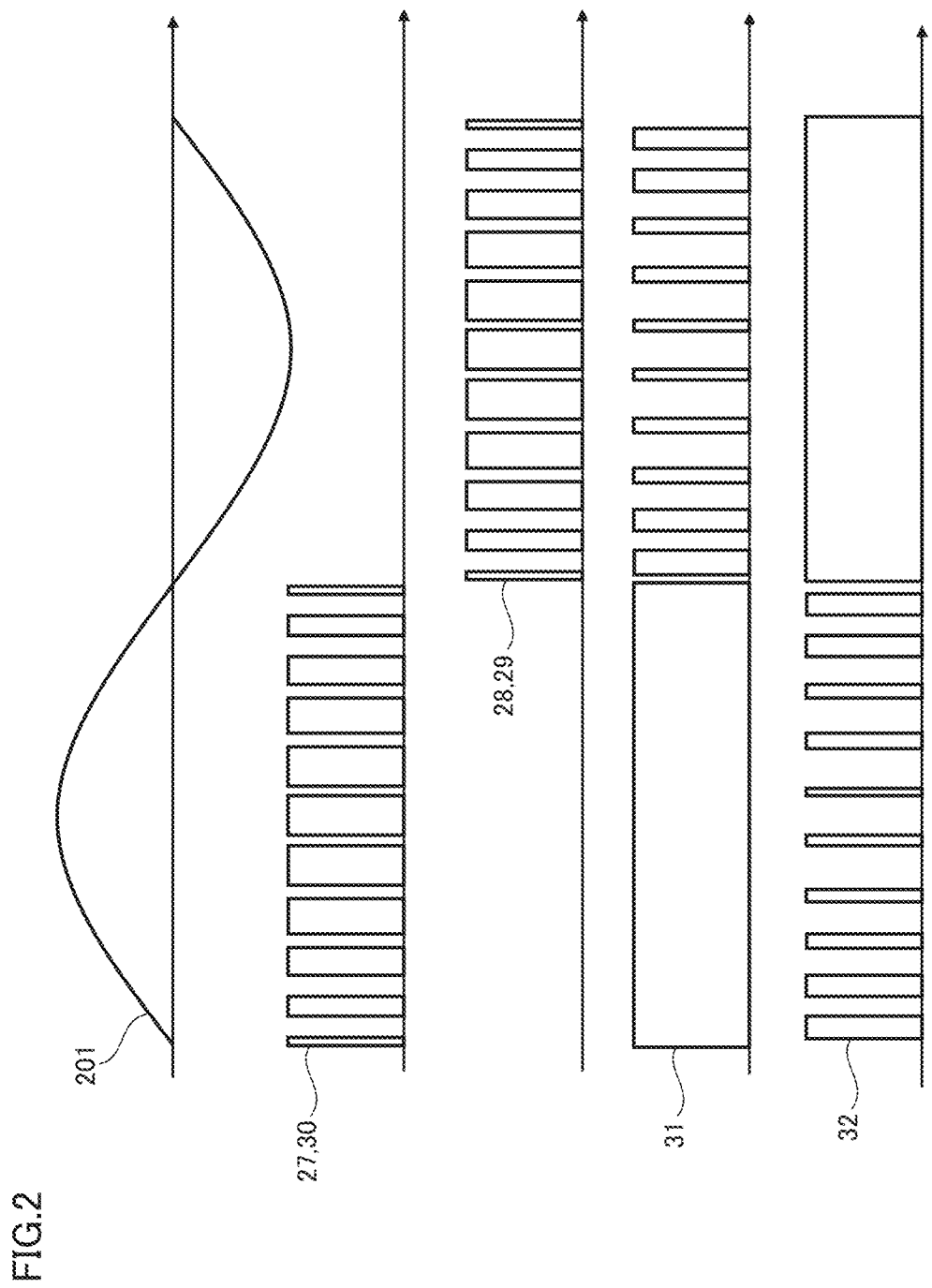
FIG. 2 is a view illustrating an AC power command value 201 and a drive signal 27 to 32 during single-phase three-wire operation when switching elements 11, 12 of the power conversion device 1 of the first embodiment are not used.

FIG. 2 is a view illustrating an AC power command value 201 and drive signals 27 to 32 during the single-phase three-wire operation when switching elements 11, 12 of power conversion device 1 of the first embodiment are not used.

FIG. 2 illustrates AC power command value 201, drive signals 27, 30 of switching elements 5, 8, drive signals 28, 29 of switching elements 6 and 7, drive signal 31 of switching element 9, and drive signal 32 of switching element 10. Drive signals 27 to 32 are a binary of a high level or a low level. When a high-level drive signal is input to the switching element, the switching element is turned on to be in a conductive state. When a low-level drive signal is input to the switching element, the switching element is turned off to be in a cutoff state.

When AC power command value 201 is positive, the operation is as follows.

Switching element 5, switching element 8, and switching element 10 perform the switching. At this point, the switching operation of switching element 10 is complementary to the switching operations of switching element 5 and switching element 8. Switching element 6 and switching element 7 are always in an off-state. Switching element 9 is always in an on-state.

When AC power command value 201 is negative, the operation is as follows.

Switching element 6, switching element 7, and switching element 9 perform the switching. At this point, the switching operation of switching element 9 is complementary to the switching operations of switching element 6 and switching element 7. Switching element 5 and switching element 8 are always in the off-state. Switching element 10 is always in the on-state.

In the above-described complementary operation, on-timing of one switching element and off-timing of the other switching element are set so as not to be completely the same. This is to avoid generation of a short-circuit state of DC power supply 2.

For example, when switching elements 5, 8 are turned from on to off while switching element 10 is turned from off to on, because switching element 9 is always in the on-state, there is a possibility that all switching elements 5, 8, 9, 10 are temporarily in the on-state. In this case, a path short-circuiting DC power supply 2 is generated, and power conversion device 1 may fail due to overcurrent. For this reason, at the timing of switching on and off of switching elements 5, 8, 10 such that the path short-circuiting DC power supply 2 is not generated, dead time in which all three switching elements 5, 8, 10 are turned off is provided. At this point, there is no problem in that switching element 9 is always in the on-state. In this way, the generation of the short circuit can be prevented by switching the switching element in the on-state after providing the period in which all three switching elements 5, 8, 10 are turned off. Similarly, the dead time is provided at the time of switching on and off of switching elements 6, 7, 9. In general, a power conversion device of several kW often performs the switching of several tens of kilohertz, and in this case, the dead time of several microseconds is often provided. However, because the switching element using a SiC or GaN material called a wide bandgap semiconductor has short rising and falling time of the switching, the switching element may operate at the dead time of several tens of nanoseconds to several hundreds of nanoseconds.

FIG. 3 is a view illustrating a relationship between states of switching elements included in bridge circuit 200 and clamp circuit 300 and an output voltage VOUT and an operation mode of power conversion device 1 when switching elements 11, 12 are not used. The output voltage is a voltage between node d and node e. Output voltage VOUT is any of three levels of positive bias, zero bias, and negative bias. The positive bias is a voltage VIN of DC power supply 2. The zero bias is zero. The negative bias is (−VIN).

When switching elements 5, 8 are turned on, switching elements 6, 7 are turned off, switching element 9 is turned on, and switching element 10 is turned off, output voltage VOUT becomes a positive bias, and power conversion device 1 is set to a first switching mode.

When switching elements 5, 8 are turned off, switching elements 6, 7 are turned off, switching element 9 is turned on, and switching element 10 is turned off, output voltage VOUT becomes zero bias, and power conversion device 1 is set to a first dead time mode.

When switching elements 5, 8 are turned off, switching elements 6, 7 are turned off, switching element 9 is turned on, and switching element 10 is turned on, output voltage VOUT becomes zero bias, and power conversion device 1 is set to a second switching mode.

When switching elements 5, 8 are turned off, switching elements 6, 7 are turned on, switching element 9 is turned off, and switching element 10 is turned on, output voltage VOUT becomes a negative bias, and power conversion device 1 is set to a third switching mode.

When switching elements 5, 8 are turned off, switching elements 6, 7 are turned off, switching element 9 is turned off, and switching element 10 is turned on, output voltage VOUT becomes zero bias, and power conversion device 1 is set to a second dead time mode.

(A-1) Positive AC Voltage, Positive AC Current, and Power of AC Power Supply 17>Power of AC Power Supply 18

The operation when the power of AC power supply 17 is larger than the power of AC power supply 18 in the case of the positive AC voltage and the positive AC current will be described.

When the AC voltage is positive, the voltage at the first terminal of capacitor 15 is positive, the voltage at the second terminal of capacitor 15 is negative, the voltage at the second terminal of capacitor 16 is positive, and the voltage at the first terminal of capacitor 16 is negative.

When the alternating current is positive, the current flows from the first terminal to the second terminal of reactor 13. At this point, switching elements 5, 8, 10 perform switching operations, switching elements 6, 7 are always in the off-state, and switching element 9 is always in the on-state.

It is assumed that the voltage of AC power supply 17 and the voltage of AC power supply 18 are controlled by control circuit 35 so as to become, for example, 100 [V]. In this case, AC power supply 17 and AC power supply 18 operate as AC loads, and the power consumed by AC power supply 17 is larger than the power consumed by AC power supply 18. Because the power of AC power supply 17 is larger than the power of AC power supply 18, the current flowing through AC power supply 17 is larger than the current flowing through AC power supply 18.

(A-1-1) Power Transmission Period

First, power conversion device 1 starts a power transmission period.

Figure 4:
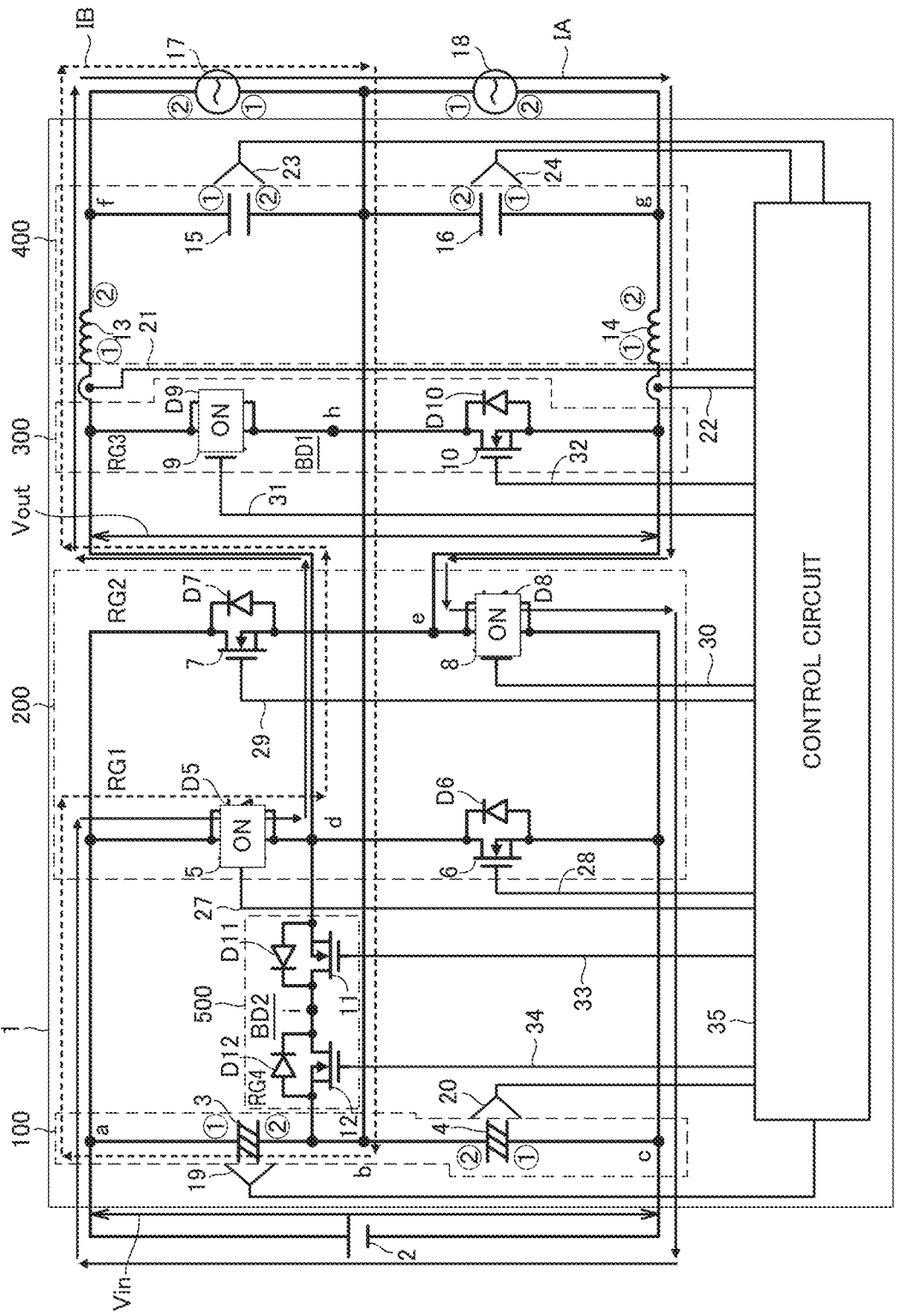
FIG. 4 is a view illustrating a current path during a power transmission period when an AC voltage is positive, an AC current is positive, and current flowing through an AC power supply 17 is larger than current flowing through an AC power supply 18 in the single-phase three-wire operation when the switching elements 11, 12 are not used.

FIG. 4 is a view illustrating a current path during the power transmission period when the AC voltage is positive, the AC current is positive, and the current flowing through AC power supply 17 is larger than the current flowing through AC power supply 18 in the single-phase three-wire operation when switching elements 11, 12 are not used.

In the power transmission period, switching elements 5, 8 are turned on by the switching, switching elements 6, 7 are always in the off-state, switching element 9 is always in the on-state, and switching element 10 is turned off by the switching. That is, power conversion device 1 is set to the first switching mode.

During the power transmission period, a current IA flows through DC power supply 2, switching element 5, reactor 13, AC power supply 17, AC power supply 18, reactor 14, switching element 8, and DC power supply 2 in this order. Furthermore, because the current flowing through AC power supply 17 is larger than the current flowing through AC power supply 18, a current IB obtained by subtracting the current flowing through AC power supply 18 from the current flowing through AC power supply 17 circulates through capacitor 3, switching element 5, reactor 13, AC power supply 17, and capacitor 3 in this order. Because current IA flows through the path passing through DC power supply 2, the power transmission is performed by current IA. Because current IB flows through the path passing through capacitor 3, the power transmission is also performed by current 1B.

(A-1-2) Dead Time Period

Subsequently, power conversion device 1 shifts to a dead time period.

Figure 5:
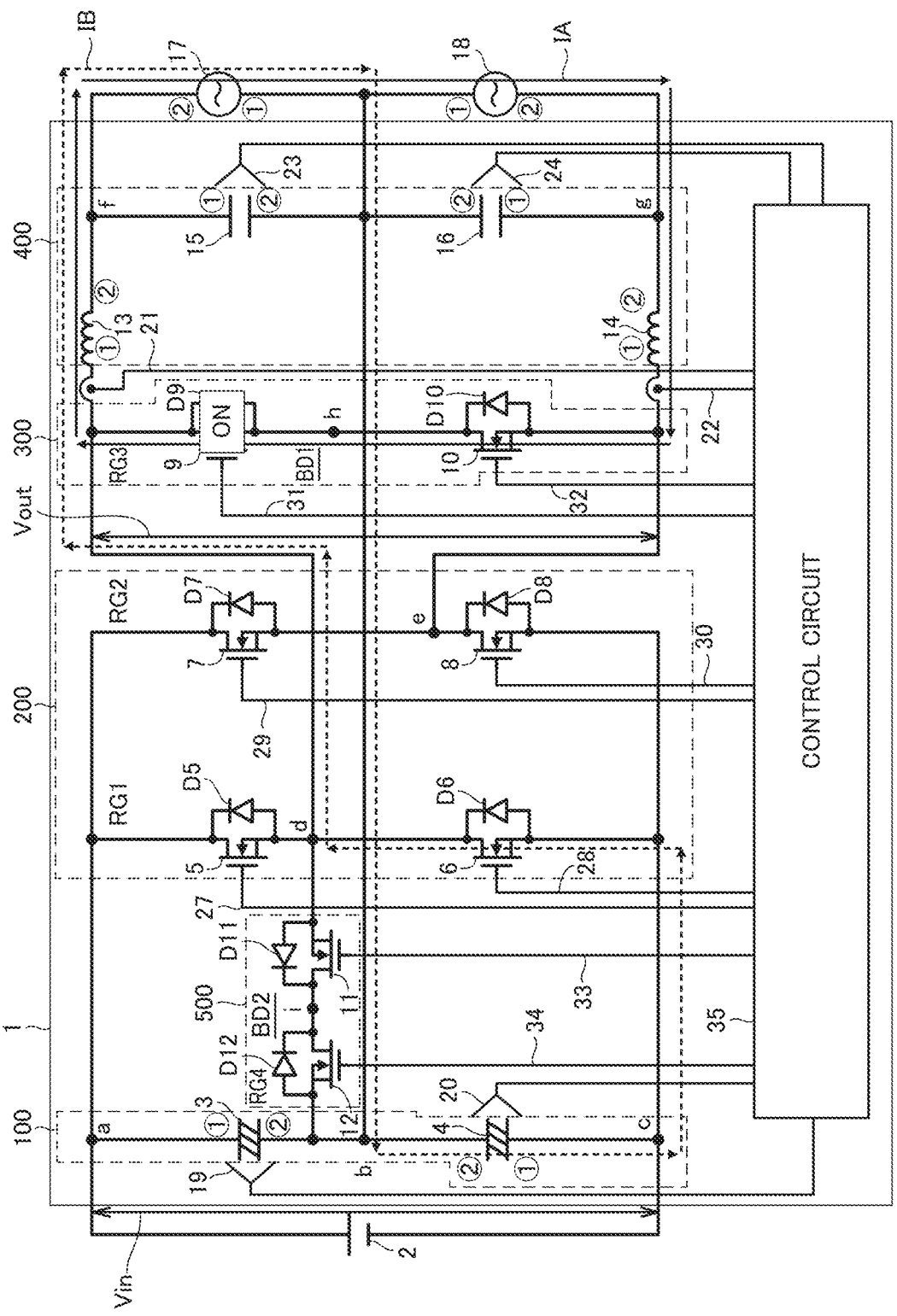
FIG. 5 is a view illustrating the current path during a dead time period when the AC voltage is positive, the AC current is positive, and the current flowing through the AC power supply 17 is larger than the current flowing through the AC power supply 18 in the single-phase three-wire operation when the switching elements 11, 12 are not used.

FIG. 5 is a view illustrating the current path during the dead time period when the AC voltage is positive, the AC current is positive, and the current flowing through AC power supply 17 is larger than the current flowing through AC power supply 18 in the single-phase three-wire operation when switching elements 11, 12 are not used.

In the dead time period, switching elements 5, 8 are switched from on to off by the switching, switching elements 6, 7 are always in an off-state, switching element 9 is always in the on-state, and switching element 10 is maintained in the off-state. That is, power conversion device 1 is set to the first dead time mode.

During the dead time period, current IA flows through reactor 13, AC power supply 17, AC power supply 18, reactor 14, diode D10, switching element 9, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, capacitor 4, switching element 6, and reactor 13 in this order. Current IA does not flow through the path passing through DC power supply 2, and current IA flows back. Because current IB flows through the path passing through capacitor 4, regeneration is performed by current IB.

The path of current IB includes capacitor 4, and capacitor 4 is charged by current IB. As a result, the voltage applied to both ends of reactor 13 increases by the voltage of capacitor 4 as compared with the case where only current IA flows back. Thus, a ripple of the current also increases, and a loss of the reactor increases. However, because the dead time period is about several microseconds, there is almost no influence of the loss of the reactor.

(A-1-3) Flow Back Period

Subsequently, power conversion device 1 shifts to the flow back period.

Figure 6:
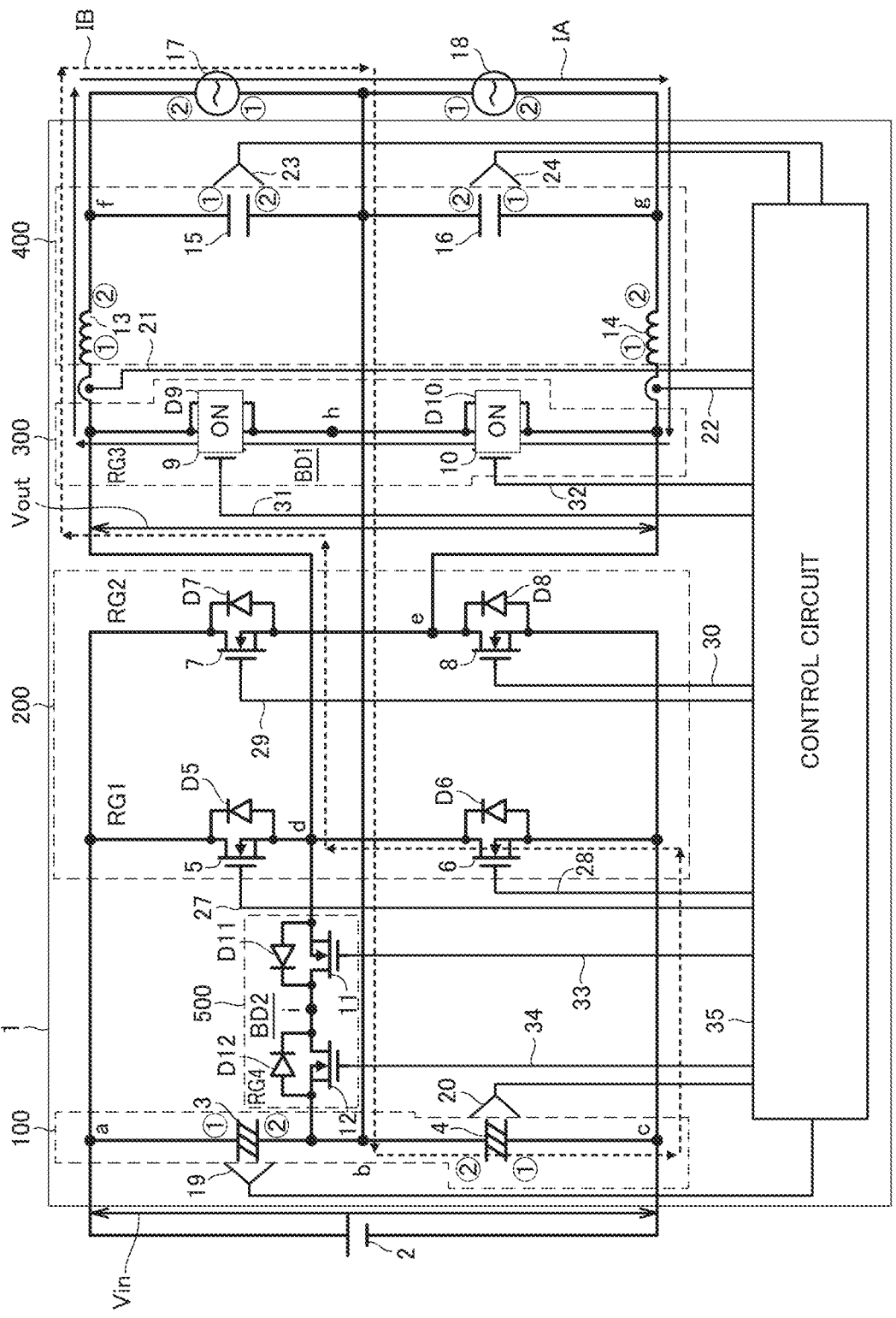
FIG. 6 is a view illustrating the current path during a flow back period when the AC voltage is positive, the AC current is positive, and the current flowing through the AC power supply 17 is larger than the current flowing through the AC power supply 18 in the single-phase three-wire operation when the switching elements 11, 12 are not used.

FIG. 6 is a view illustrating the current path during the reflux period when the AC voltage is positive, the AC current is positive, and the current flowing through AC power supply 17 is larger than the current flowing through AC power supply 18 in the single-phase three-wire operation when switching elements 11, 12 are not used.

During the flow back period, switching elements 5, 8 are maintained in the off-state, switching elements 6, 7 are always in the off-state, switching element 9 is always in the on-state, and switching element 10 is switched from off to on by the switching operation. That is, power conversion device 1 is set to the second switching mode.

During the flow back period, current IA flows through reactor 13, AC power supply 17, AC power supply 18, reactor 14, switching element 10, switching element 9, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, capacitor 4, diode D6, and reactor 13 in this order. Current IA does not flow through the path passing through DC power supply 2, and current IA flows back. Because current TB flows through the path passing through capacitor 4, the regeneration is performed by current IB.

Also during the flow back period, the path of current IB includes capacitor 4, capacitor 4 is charged by current IB. As a result, the voltage applied to both ends of reactor 13 is increased by the voltage of capacitor 4 as compared with the case where only current IA is flowing back. Thus, the ripple of the current also increases, and the loss of the reactor increases. Because the flow back period is longer than the dead time period, the influence of the loss of the reactor is large.

(A-1-4) Dead Time Period

Subsequently, power conversion device 1 shifts to the dead time period.

In the dead time period, switching element 10 is switched from on to off by the switching, switching elements 6, 7 are always in an off-state, switching element 9 is always in the on-state, and switching elements 5,8 are maintained in the off-state. That is, power conversion device 1 is set to the first dead time mode.

In the dead time period, power conversion device 1 operates similarly to the dead time period (A-1-2) described above.

(A-1-5) Power Transmission Period

Subsequently, power conversion device 1 returns to the power transmission period.

In the power transmission period, switching elements 5, 8 are switched from off to on by the switching. That is, power conversion device 1 is set to the first switching mode.

In the power transmission period, power conversion device 1 operates similarly to the power transmission period of (A-1-1) described above.

(A-2) Negative AC Voltage, Negative AC Current, and Power of AC Power Supply 17>Power of AC Power Supply 18

The operation when the power of AC power supply 17 is larger than the power of AC power supply 18 in the case of the negative AC voltage and the negative AC current will be described.

When the AC voltage is negative, the voltage at the first terminal of capacitor 15 is negative, the voltage at the second terminal of capacitor 15 is positive, the voltage at the first terminal of capacitor 16 is positive, and the voltage at the second terminal of capacitor 16 is negative.

When the alternating current is negative, the current flows from the second terminal to the first terminal of reactor 13. At this point, switching element 6, switching element 7, and switching element 9 perform the switching operations, switching element 5 and switching element 8 are always in the off-state, and switching element 10 is always in the on-state.

Because the power of AC power supply 17 is larger than the power of AC power supply 18, the current flowing through AC power supply 17 is larger than the current flowing through AC power supply 18.

(A-2-1) Power Transmission Period

First, power conversion device 1 starts the power transmission period.

Figure 7:
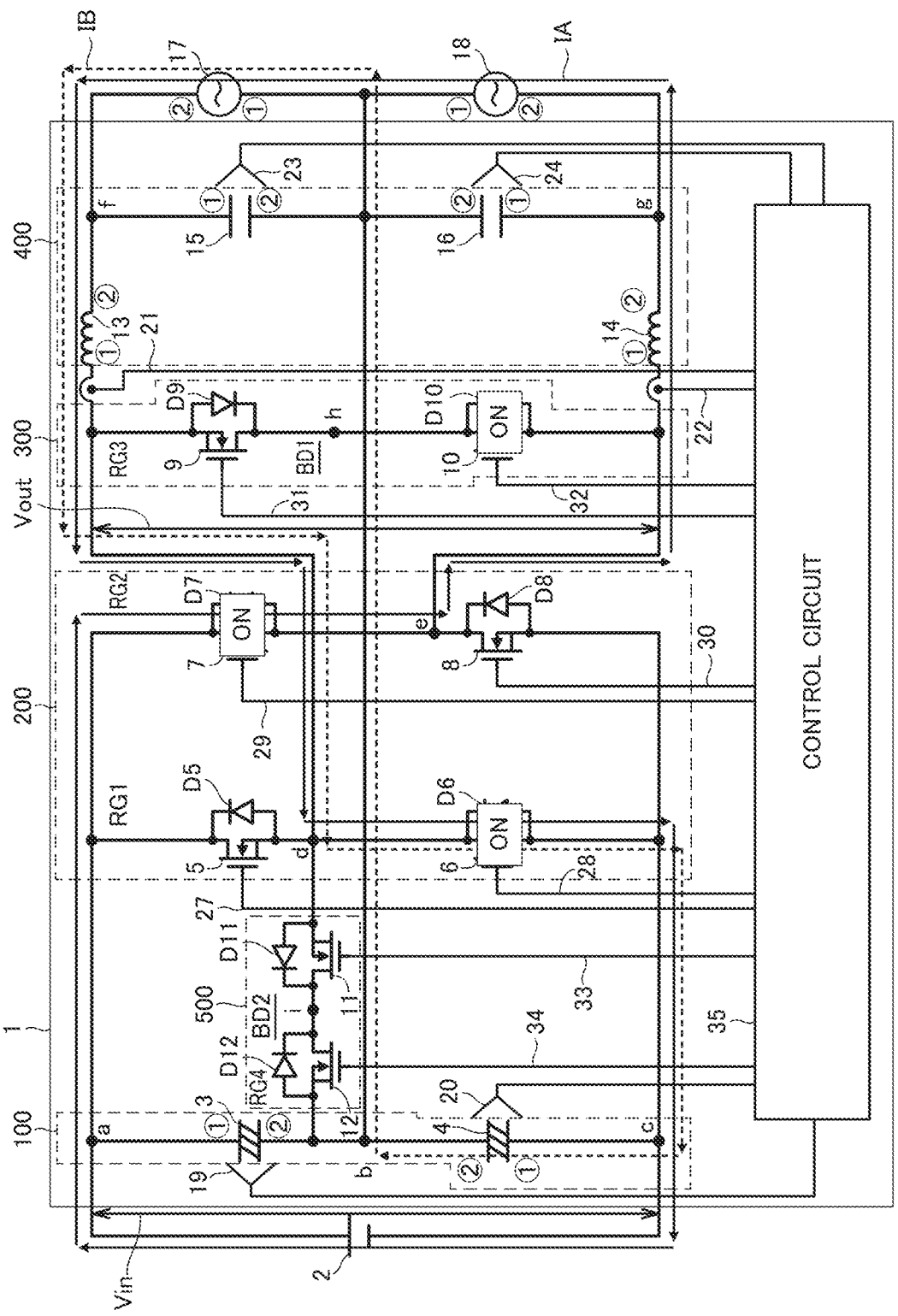
FIG. 7 is a view illustrating the current path during the power transmission period when the AC voltage is negative, the AC current is negative, and the current flowing through the AC power supply 17 is larger than the current flowing through the AC power supply 18 in the single-phase three-wire operation when the switching elements 11, 12 are not used.

FIG. 7 is a view illustrating the current path during the power transmission period when the AC voltage is negative, the AC current is negative, and the current flowing through AC power supply 17 is larger than the current flowing through AC power supply 18 in the single-phase three-wire operation when switching elements 11, 12 are not used.

In the power transmission period, switching elements 6, 7 are turned on by the switching, switching elements 5, 8 are always in the off-state, switching element 10 is always in the on-state, and switching element 9 is turned off by the switching. That is, power conversion device 1 is set to the third switching mode.

During the power transmission period, current IA flows through DC power supply 2, switching element 7, reactor 14, AC power supply 18, AC power supply 17, reactor 13, switching element 6, and DC power supply 2 in this order. Furthermore, because the current flowing through AC power supply 17 is larger than the current flowing through AC power supply 18, current IB obtained by subtracting the current flowing through AC power supply 18 from the current flowing through AC power supply 17 flows through capacitor 4, AC power supply 17, reactor 13, switching element 6, and capacitor 4 in this order. Because current IA flows through the path passing through DC power supply 2, the power transmission is performed by current IA. Because current IB flows through the path passing through capacitor 4, the power transmission is also performed by current IB.

(A-2-2) Dead Time Period

Subsequently, power conversion device 1 shifts to the dead time period.

Figure 8:
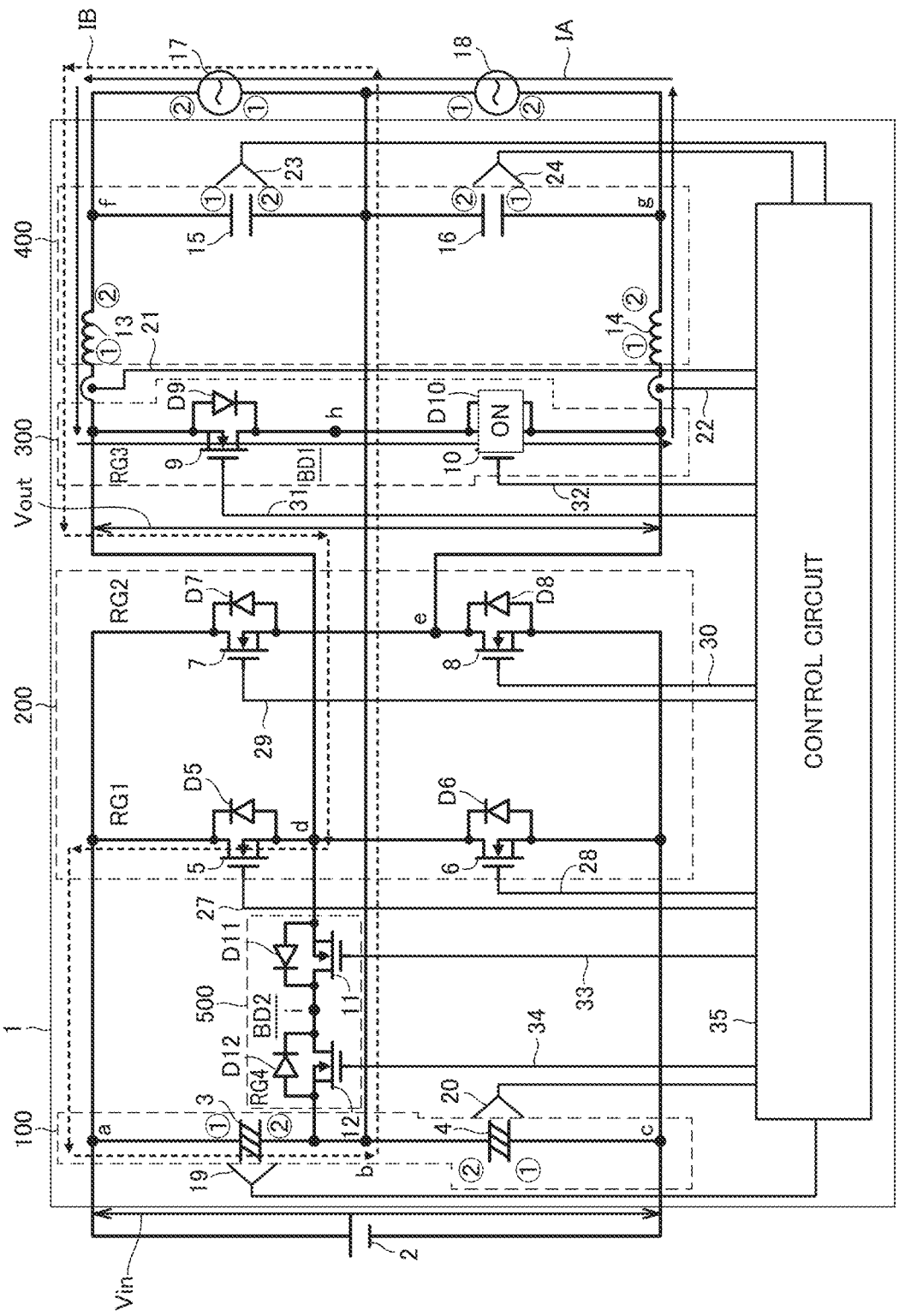
FIG. 8 is a view illustrating the current path during the dead time period when the AC voltage is negative, the AC current is negative, and the current flowing through the AC power supply 17 is larger than the current flowing through the AC power supply 18 in the single-phase three-wire operation when the switching elements 11, 12 are not used.

FIG. 8 is a view illustrating the current path during the dead time period when the AC voltage is negative, the AC current is negative, and the current flowing through AC power supply 17 is larger than the current flowing through AC power supply 18 in the single-phase three-wire operation when switching elements 11, 12 are not used.

In the dead time period, switching elements 6, 7 are switched from on to off by the switching, switching elements 5, 8 are always in the off-state, switching element 10 is always in the on-state, and switching element 9 is maintained in the off-state. That is, power conversion device 1 is set to the second dead time mode.

During the dead time period, current IA flows through reactor 14, AC power supply 18, AC power supply 17, reactor 13, diode D9, switching element 10, and reactor 14 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, diode D5, capacitor 3, AC power supply 17, and reactor 13 in this order. Current IA does not flow through the path passing through DC power supply 2, and current IA flows back. Because current IB flows through the path passing through capacitor 4, the regeneration is performed by current IB.

Because capacitor 3 is included in the path of current IB, the loss of the reactor is generated as described above. However, because the dead time period is about several microseconds, there is little influence of the dead time period.

(A-2-3) Flow Back Period

Subsequently, power conversion device 1 shifts to the flow back period.

Figure 9:
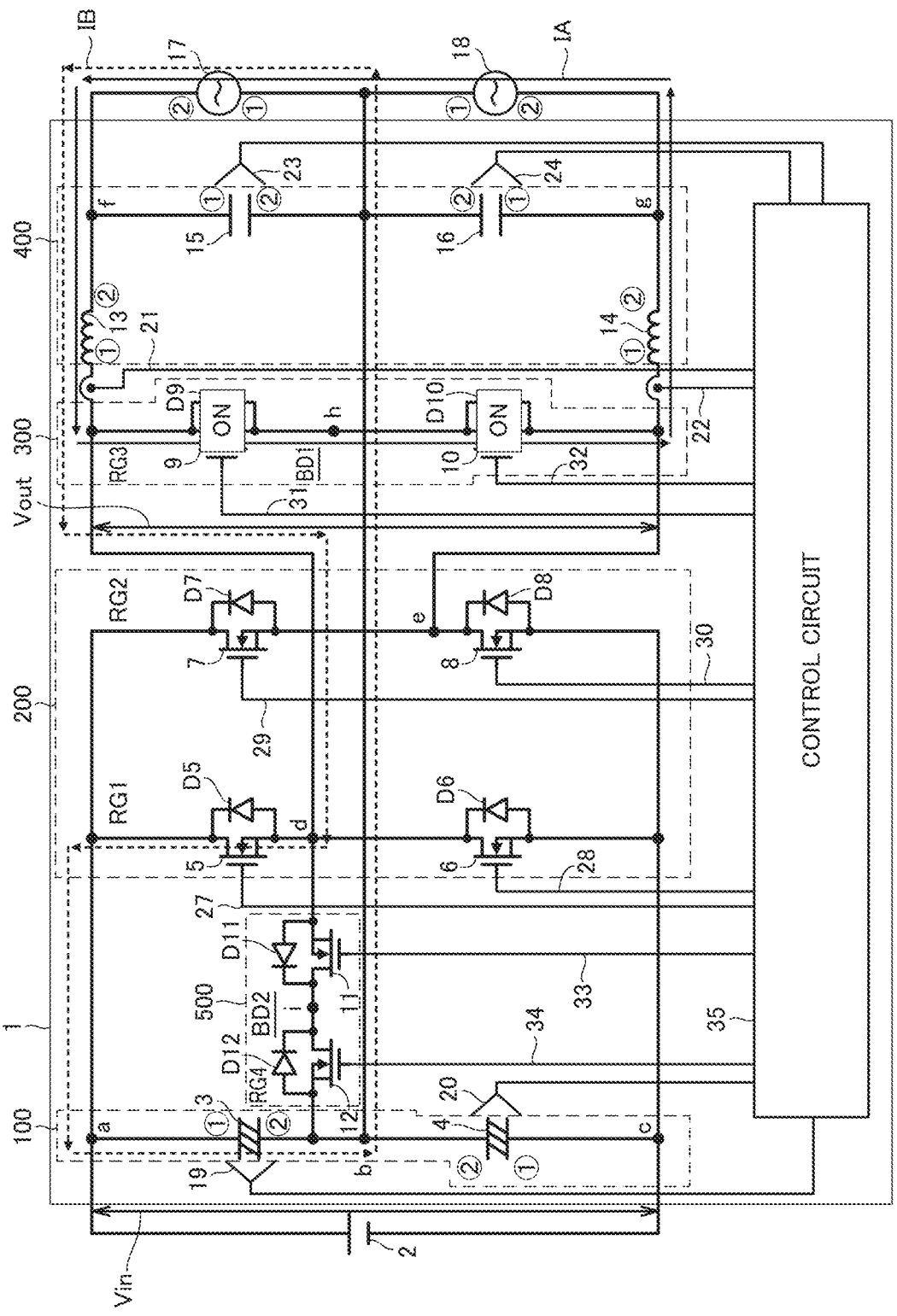
FIG. 9 is a view illustrating the current path during the flow back period when the AC voltage is negative, the AC current is negative, and the current flowing through the AC power supply 17 is larger than the current flowing through the AC power supply 18 in the single-phase three-wire operation when the switching elements 11, 12 are not used.

FIG. 9 is a view illustrating the current path during the reflux period when the AC voltage is negative, the AC current is negative, and the current flowing through AC power supply 17 is larger than the current flowing through AC power supply 18 in the single-phase three-wire operation when switching elements 11, 12 are not used.

During the flow back period, switching elements 6, 7 are maintained in the off-state, switching elements 5, 8 are always in the off-state, switching element 10 is always in the on-state, and switching element 9 is switched from off to on by the switching operation. That is, power conversion device 1 is set to the second switching mode.

During the flow back period, current IA flows through reactor 14, AC power supply 18, AC power supply 17, reactor 13, switching element 9, switching element 10, and reactor 14 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, diode D5, capacitor 3, AC power supply 17, and reactor 13 in this order. Current IA does not flow through the path passing through DC power supply 2, and current IA flows back. Because current IB flows through the path passing through capacitor 4, the regeneration is performed by current IB.

Since the capacitor 4 is included in the path of current IB, the loss of the reactor is generated as described above. Because the flow back period is longer than the dead time period, the influence of the loss of the reactor is large.

(A-2-4) Dead Time Period

Subsequently, power conversion device 1 shifts to the dead time period.

In the dead time period, switching element 9 is switched from on to off by the switching, switching elements 5, 8 are always in the off-state, switching element 10 is always in the on-state, and switching elements 6, 7 are maintained in the off-state. That is, power conversion device 1 is set to the second dead time mode.

In the dead time period, power conversion device 1 operates similarly to the dead time period (A-2-2) described above.

(A-2-5) Power Transmission Period

Subsequently, power conversion device 1 returns to the power transmission period.

In the power transmission period, switching elements 6, 7 are switched from off to on by the switching. That is, power conversion device 1 is set to the third switching mode.

In the power transmission period, power conversion device 1 operates similarly to the power transmission period of (A-2-1) described above.

As described above, in the three-level power conversion device including only the clamp circuit, when the power consumption of AC power supply 17 is different from the power consumption of AC power supply 18, the difference between the current flowing through AC power supply 17 and the current flowing through AC power supply 18 passes through capacitor 3 or 4, so that the loss of the reactor increases. Thus, when the current ripple increases, a noise component of the output current increases, so that inductance of reactor 13 needs to be increased in order to decrease the noise. In order to increase the inductance, a size of reactor 13 needs to be increased. When the power consumption of AC power supply 17 and the power consumption of AC power supply 18 are different from each other, current IB passes through capacitor 3 or 4 during the flow back of current IA. As a result, power conversion device 1 does not operate stably.

Although the operation and the problem when the power of AC power supply 17 is larger than the power of AC power supply 18 have been described above, there is a similar problem even when the power of AC power supply 17 is smaller than the power of AC power supply 18.

(B) The Case where Switching Element 11 and Switching Element 12 are Used

The case where switching element 11 and switching element 12 are used will be described below.

FIG. 10 is a view illustrating AC power command value 201 and drive signal 27 to 34 during the single-phase three-wire operation when switching elements 11, 12 of the power conversion device 1 of the first embodiment are used.

Similarly to FIG. 2, FIG. 10 illustrates AC power command value 201, drive signals 27 and 30 of switching elements 5, 8, drive signals 28, 29 of switching elements 6, 7, drive signal 31 of switching element 9, and drive signal 32 of switching element 10. FIG. 10 further illustrates drive signal 33 of switching element 11 and drive signal 34 of switching element 12.

The level of drive signal 31 and the level of drive signal 33 are the same. Accordingly, the switching states of switching element 9 and switching element 11 are the same, and are simultaneously turned on and off. The level of drive signal 32 and the level of drive signal 34 are the same. Accordingly, the switching states of switching element 10 and switching element 12 are the same, and are simultaneously turned on and off.

FIG. 11 is a view illustrating the relationship between the states of the switching elements included in bridge circuit 200 and clamp circuit 300 and output voltage VOUT and the operation mode of power conversion device 1 when switching elements 11, 12 are used.

Similarly to FIG. 3, FIG. 11 illustrates output voltage VOUT and the operation mode of power conversion device 1 with respect to the switching states of switching elements 5, 8, 6, 7, 9, 11.

In FIG. 11, the switching states of switching elements 11, 12 are further added. As described above, the switching states of switching element 9 and switching element 11 are the same, and the switching states of switching element 10 and switching element 12 are the same.

When switching elements 5, 8 are turned on, switching elements 6, 7 are turned off, switching elements 9, 11 are turned on, and switching elements 10, 12 are turned off, output voltage VOUT becomes the positive bias, and power conversion device 1 is set to the first switching mode.

When switching elements 5, 8 are turned off, switching elements 6, 7 are turned off, switching elements 9, 11 are turned on, and switching elements 10, 12 are turned off, output voltage VOUT becomes zero bias, and power conversion device 1 is set to a first dead time mode.

When switching elements 5, 8 are turned off, switching elements 6, 7 are turned off, switching elements 9, 11 are turned on, and switching elements 10, 12 are turned on, output voltage VOUT becomes the zero bias, and power conversion device 1 is set to the second switching mode.

When switching elements 5, 8 are turned off, switching elements 6, 7 are turned on, switching elements 9, 11 are turned off, and switching elements 10, 12 are turned on, output voltage VOUT becomes the negative bias, and power conversion device 1 is set to the third switching mode.

When switching elements 5, 8 are turned off, switching elements 6, 7 are turned off, switching elements 9, 11 are turned off, and switching elements 10, 12 are turned on, output voltage VOUT becomes the zero bias, and power conversion device 1 is set to the second dead time mode.

(B-1) Positive AC Voltage, Positive AC Current, and Power of AC Power Supply 17>Power of AC Power Supply 18

The operation when the power of AC power supply 17 is larger than the power of AC power supply 18 in the case of the positive AC voltage and the positive AC current will be described. It is assumed that the voltage of AC power supply 17 and the voltage of AC power supply 18 are controlled by control circuit 35 so as to become, for example, 100 [V]. In this case, AC power supply 17 and AC power supply 18 operate as AC loads, and the power consumed by AC power supply 17 is larger than the power consumed by AC power supply 18. Because the power of AC power supply 17 is larger than the power of AC power supply 18, the current flowing through AC power supply 17 is larger than the current flowing through AC power supply 18.

When the AC voltage is positive, the voltage at the first terminal of capacitor 15 is positive, the voltage at the second terminal of capacitor 15 is negative, the voltage at the second terminal of capacitor 16 is positive, and the voltage at the first terminal of capacitor 16 is negative.

(B-1-1) Power Transmission Period

First, power conversion device 1 starts the power transmission period.

Figure 12:
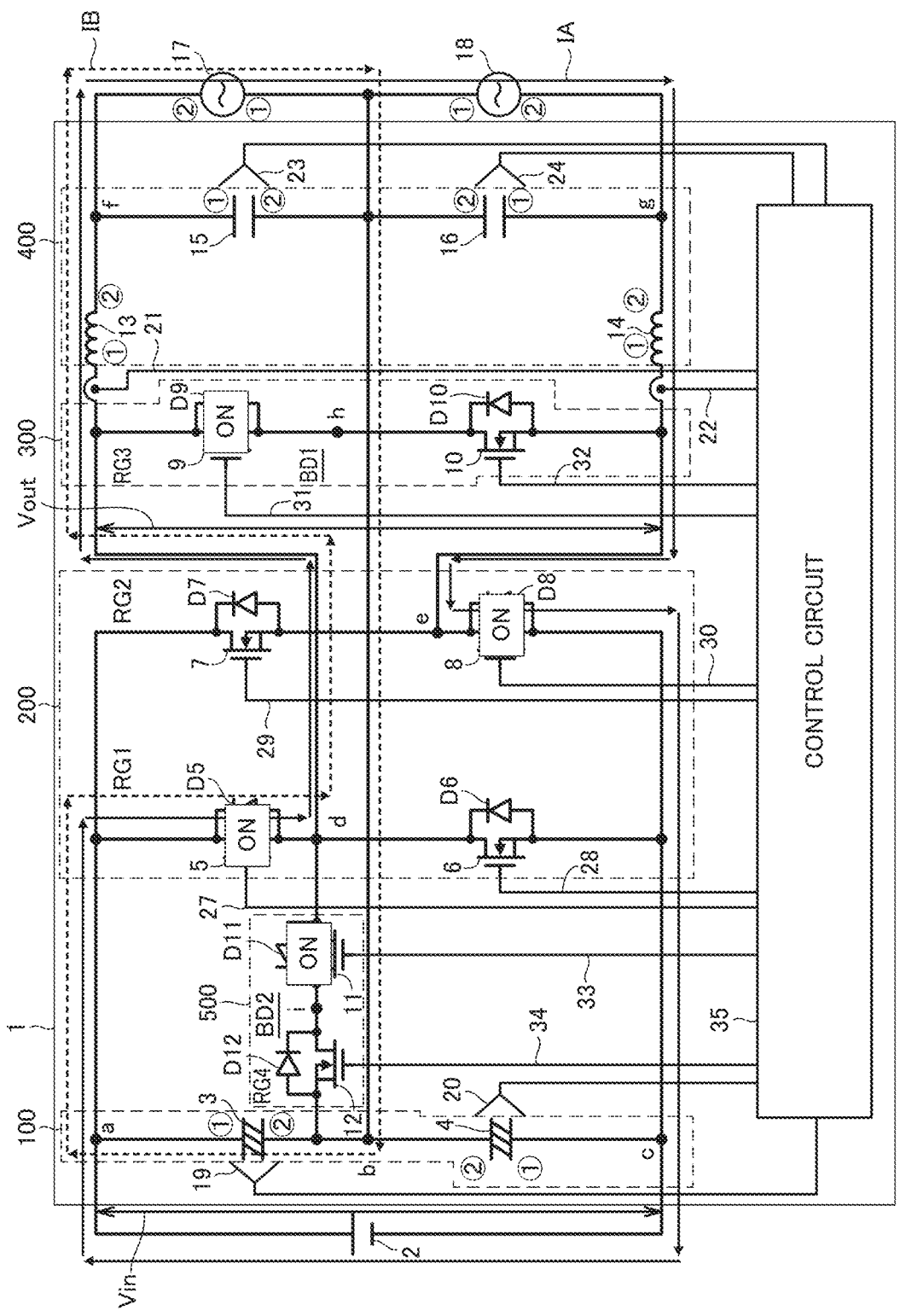
FIG. 12 is a view illustrating the current path during the power transmission period when the AC voltage is positive, the AC current is positive, and the current flowing through the AC power supply 17 is larger than the current flowing through the AC power supply 18 in the single-phase three-wire operation.

FIG. 12 is a view illustrating the current path during the power transmission period when the AC voltage is positive, the AC current is positive, and the current flowing through AC power supply 17 is larger than the current flowing through AC power supply 18 in the single-phase three-wire operation.

In the power transmission period, switching elements 5, 8 are turned on by the switching, switching elements 6, 7 are always in the off-state, switching elements 9, 11 are always in the on-state, and switching elements 10, 12 are turned off by the switching. That is, power conversion device 1 is set to the first switching mode.

During the power transmission period, current IA flows through DC power supply 2, switching element 5, reactor 13, AC power supply 17, AC power supply 18, reactor 14, switching element 8, and DC power supply 2 in this order. Furthermore, because the current flowing through AC power supply 17 is larger than the current flowing through AC power supply 18, current IB obtained by subtracting the current flowing through the AC power supply 18 from the current flowing through AC power supply 17 flows through capacitor 3, switching element 5, reactor 13, AC power supply 17, and capacitor 3 in this order. The reason why current IB does not flow through diode D12 and switching element 12 but flows through capacitor 3 and switching element 5 after passing through AC power supply 17 is that energy of capacitor 3 can be sent to AC power supply 17. Because current IA flows through the path passing through DC power supply 2, the power transmission is performed by current IA. Because current IB flows through the path passing through capacitor 3, the power transmission is also performed by current IB.

(B-1-2) Dead Time Period

Subsequently, power conversion device 1 shifts to the dead time period.

Figure 13:
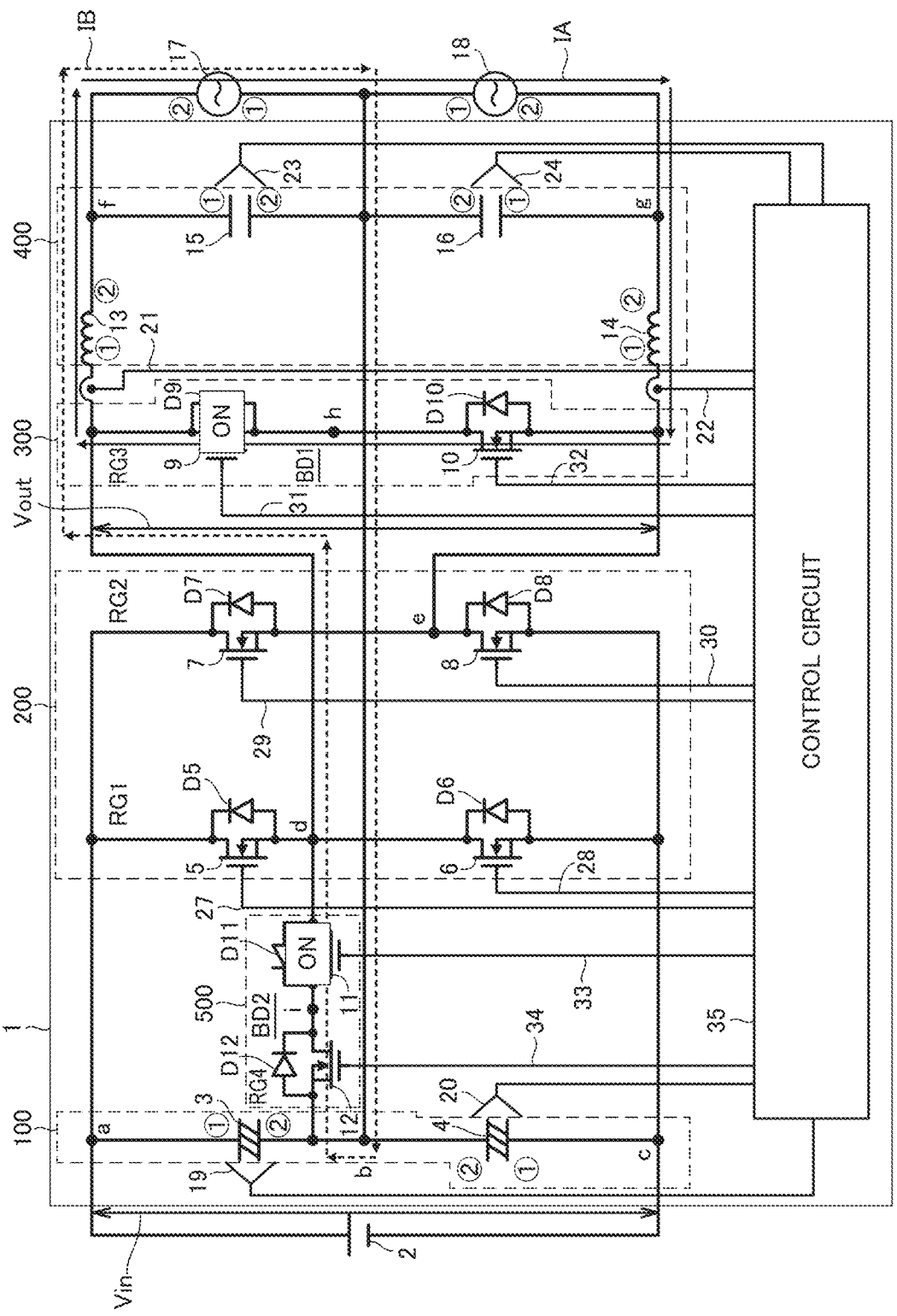
FIG. 13 is a view illustrating the current path during the dead time period when the AC voltage is positive, the AC current is positive, and the current flowing through the AC power supply 17 is larger than the current flowing through the AC power supply 18 in the single-phase three-wire operation.

FIG. 13 is a view illustrating the current path during the dead time period when the AC voltage is positive, the AC current is positive, and the current flowing through AC power supply 17 is larger than the current flowing through AC power supply 18 in the single-phase three-wire operation.

In the dead time period, switching elements 5, 8 are switched from on to off by the switching, switching elements 6, 7 are always in the off-state, switching elements 9, 11 are always in the on-state, and switching elements 10, 12 are maintained in the off-state. That is, power conversion device 1 is set to the first dead time mode.

During the dead time period, current IA flows through reactor 13, AC power supply 17, AC power supply 18, reactor 14, diode D10, switching element 9, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, diode D12, switching element 11, and reactor 13 in this order. Current IA does not flow through the path passing through DC power supply 2, and current IA flows back. Because current IB also does not flow through the path passing through capacitor 3, current IB flows back. The path of current IB is different from the path when switching element 11 and switching element 12 in FIG. 5 are not used, and does not include capacitor 4, so that the loss of the reactor can be decreased.

(B-1-3) Flow Back Period

Subsequently, power conversion device 1 shifts to the flow back period.

Figure 14:
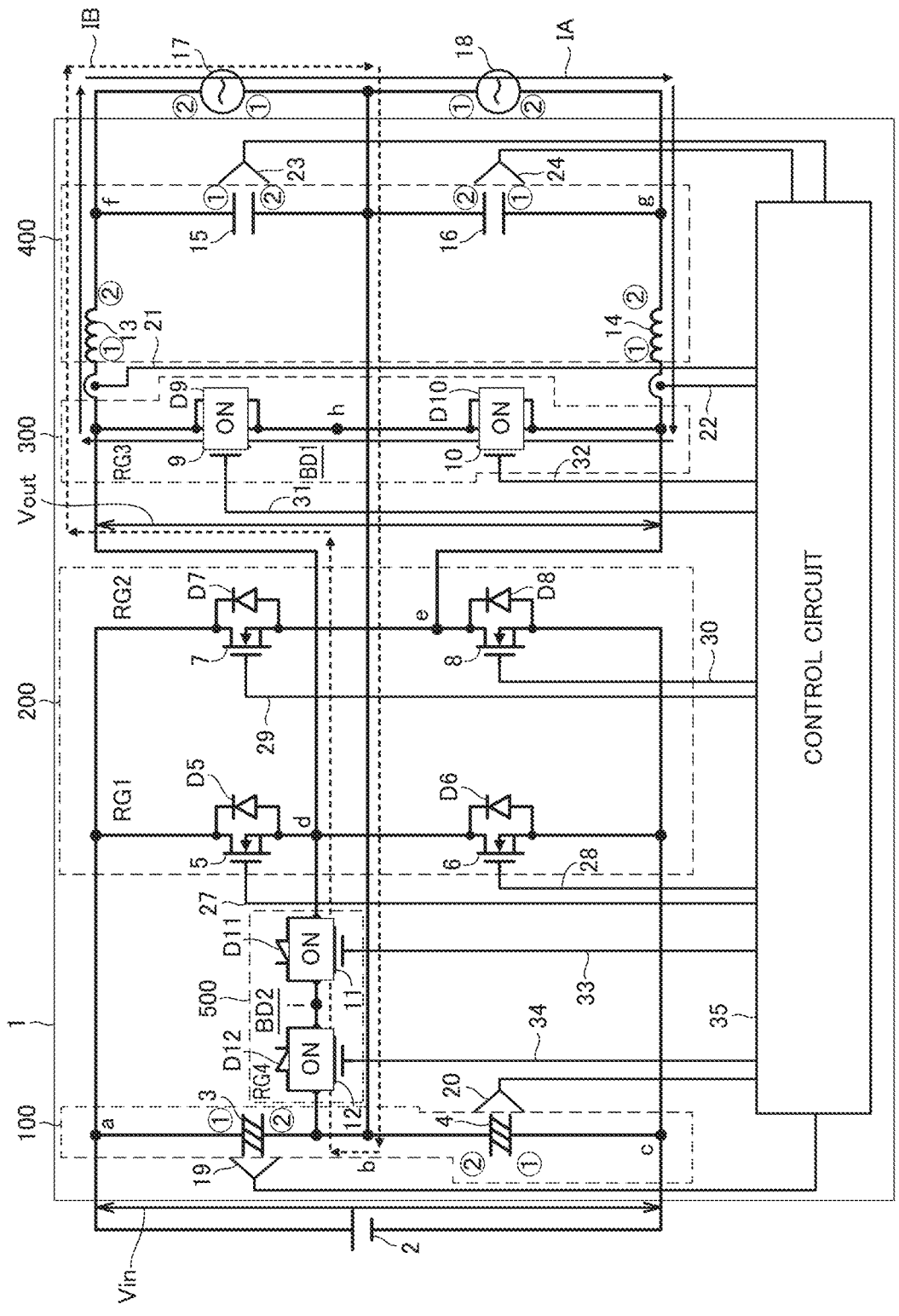
FIG. 14 is a view illustrating the current path during the flow back period when the AC voltage is positive, the AC current is positive, and the current flowing through the AC power supply 17 is larger than the current flowing through the AC power supply 18 in the single-phase three-wire operation.

FIG. 14 is a view illustrating the current path during the flow back period when the AC voltage is positive, the AC current is positive, and the current flowing through AC power supply 17 is larger than the current flowing through AC power supply 18 in the single-phase three-wire operation.

During the flow back period, switching elements 5, 8 are maintained in the off-state, switching elements 6, 7 are always in the off-state, switching elements 9, 11 are always in the on-state, and switching elements 10, 12 switched from off to on by the switching operation. That is, power conversion device 1 is set to the second switching mode.

During the flow back period, current IA flows through reactor 13, AC power supply 17, AC power supply 18, reactor 14, switching element 10, switching element 9, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, switching element 12, switching element 11, and reactor 13 in this order. Current IA does not flow through the path passing through DC power supply 2, and current IA flows back. Because current IB also does not flow through the path passing through capacitor 3, current IB flows back. The path of current IB is different from the path when switching element 11 and switching element 12 in FIG. 6 are not used, and does not include capacitor 4, so that the loss of the reactor can be decreased.

(B-1-4) Dead Time Period

Subsequently, power conversion device 1 shifts to the dead time period.

In the dead time period, switching elements 10, 12 are switched from on to off by the switching, switching elements 6, 7 are always in the off-state, switching elements 9, 11 are always in the on-state, and switching elements 5, 8 are maintained in the off-state. That is, power conversion device 1 is set to the first dead time mode.

In the dead time period, power conversion device 1 operates similarly to the dead time period (B-1-2) described above.

(B-1-5) Power Transmission Period

Subsequently, power conversion device 1 returns to the power transmission period.

In the power transmission period, switching elements 5, 8 are switched from off to on by the switching. That is, power conversion device 1 is set to the first switching mode.

In the power transmission period, power conversion device 1 operates similarly to the power transmission period of (B-1-1) described above.

(B-2) Negative AC Voltage, Negative AC Current, and Power of AC Power Supply 17>Power of AC Power Supply 18

The operation when the power of AC power supply 17 is larger than the power of AC power supply 18 in the case of the negative AC voltage and the negative AC current will be described. Because the power of AC power supply 17 is larger than the power of AC power supply 18, the current flowing through AC power supply 17 is larger than the current flowing through AC power supply 18.

When the AC voltage is negative, the voltage at the first terminal of capacitor 15 is negative, the voltage at the second terminal of capacitor 15 is positive, the voltage at the second terminal of capacitor 16 is negative, and the voltage at the first terminal of capacitor 16 is positive.

(B-2-1) Power Transmission Period First, power conversion device 1 starts the power transmission period.

Figure 15:
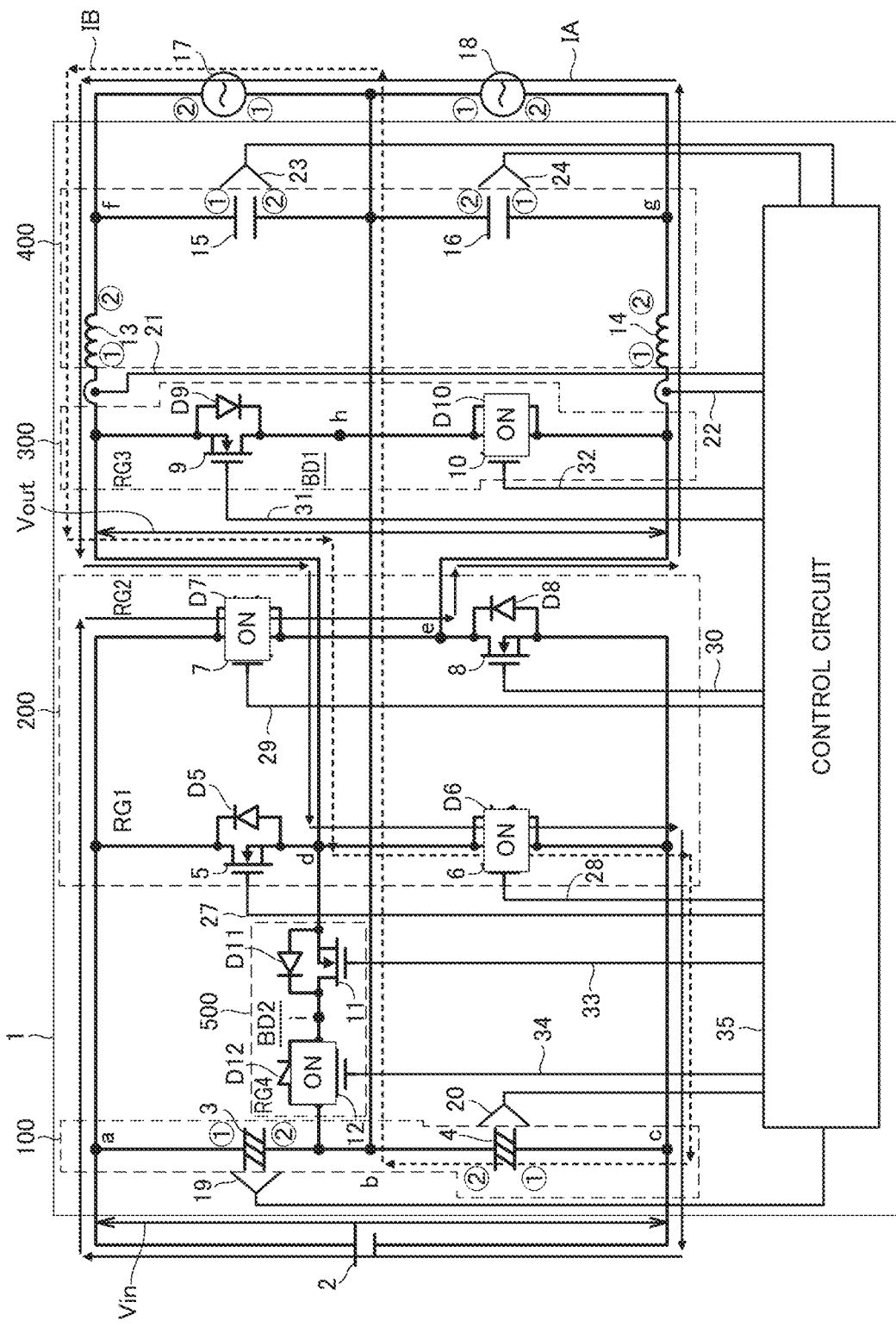
FIG. 15 is a view illustrating the current path during the power transmission period when the AC voltage is negative, the AC current is negative, and the current flowing through the AC power supply 17 is larger than the current flowing through the AC power supply 18 in the single-phase three-wire operation.

FIG. 15 is a view illustrating the current path during the power transmission period when the AC voltage is negative, the AC current is negative, and the current flowing through AC power supply 17 is larger than the current flowing through AC power supply 18 in the single-phase three-wire operation.

In the power transmission period, switching elements 6, 7 are turned on by the switching, switching elements 5, 8 are always in the off-state, switching elements 10, 12 are always in the on-state, and switching elements 9, 11 are turned off by the switching. That is, power conversion device 1 is set to the second switching mode.

During the power transmission period, current IA flows through DC power supply 2, switching element 7, reactor 14, AC power supply 18, AC power supply 17, reactor 13, switching element 6, and DC power supply 2 in this order. Furthermore, because the current flowing through AC power supply 17 is larger than the current flowing through AC power supply 18, current IB obtained by subtracting the current flowing through AC power supply 18 from the current flowing through AC power supply 17 flows through capacitor 4, AC power supply 17, reactor 13, switching element 6, and capacitor 4 in this order. The reason why current IB does not flow through diode D11 and switching element 12 but flows through switching element 6 and capacitor 4 after passing through reactor 13 is that the energy of capacitor 4 can be sent to AC power supply 17. Because current IA flows through the path passing through DC power supply 2, the power transmission is performed by current IA. Because current IB flows through the path passing through capacitor 4, the power transmission is also performed by current IB.

(B-2-2) Dead Time Period

Subsequently, power conversion device 1 shifts to the dead time period.

Figure 16:
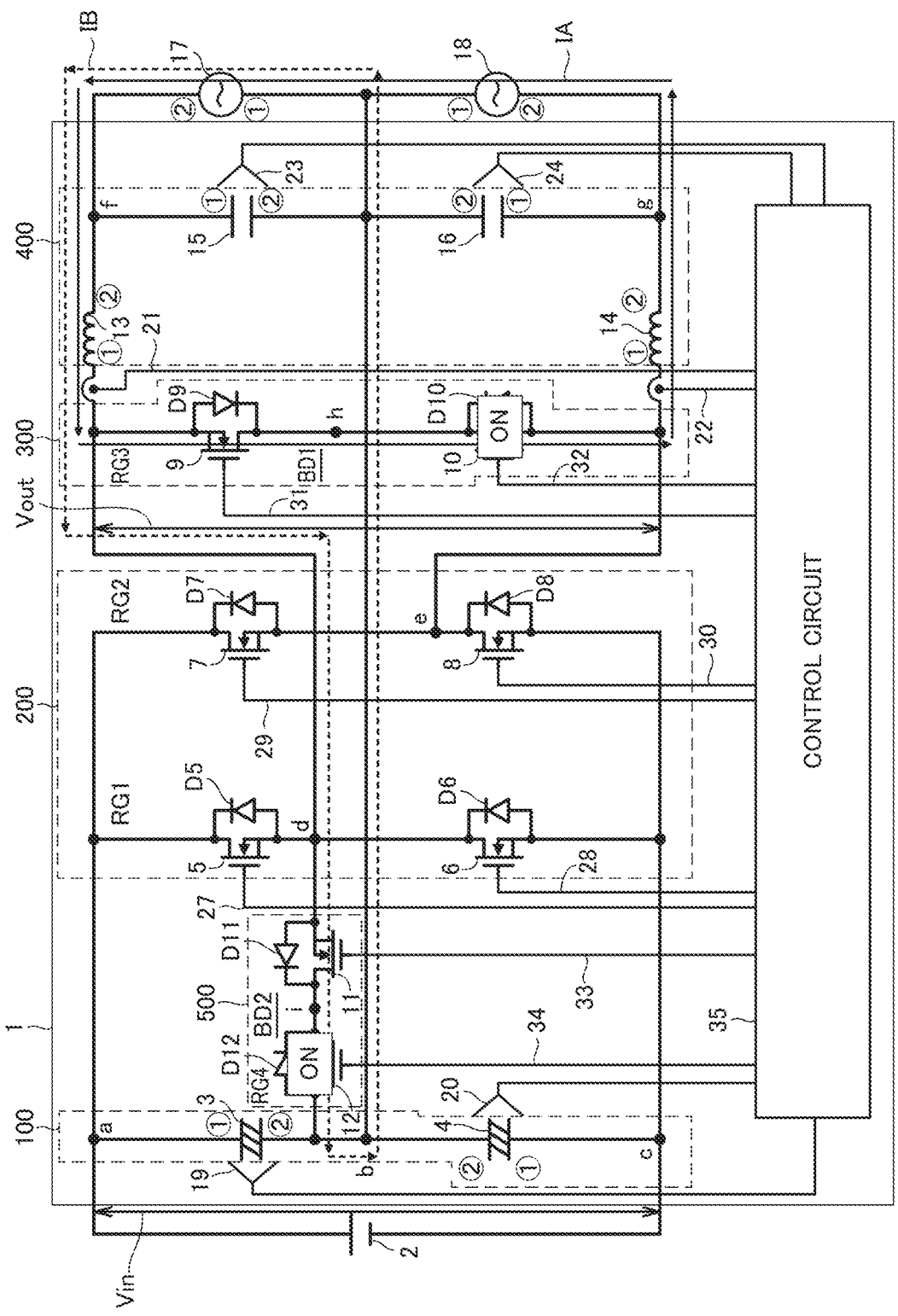
FIG. 16 is a view illustrating the current path during the dead time period when the AC voltage is negative, the AC current is negative, and the current flowing through the AC power supply 17 is larger than the current flowing through the AC power supply 18 in the single-phase three-wire operation.

FIG. 16 is a view illustrating the current path during the dead time period when the AC voltage is negative, the AC current is negative, and the current flowing through AC power supply 17 is larger than the current flowing through AC power supply 18 in the single-phase three-wire operation.

In the dead time period, switching elements 6, 7 are switched from on to off by the switching, switching elements 5, 8 are always in the off-state, switching elements 10, 12 are always in the on-state, and switching elements 9, 11 are maintained in the off-state. That is, power conversion device 1 is set to the second dead time mode.

During the dead time period, current IA flows through reactor 14, AC power supply 18, AC power supply 17, reactor 13, diode D9, switching element 10, and reactor 14 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, diode D11, switching element 12, AC power supply 17, and reactor 13 in this order. Current IA does not flow through the path passing through DC power supply 2, and current IA flows back. Because current IB also does not flow through the path passing through capacitor 3, current IB flows back. The path of current IB is different from the path when switching element 11 and switching element 12 in FIG. 8 are not used, and does not include capacitor 3, so that the loss of the reactor can be decreased.

(B-2-3) Flow Back Period

Subsequently, power conversion device 1 shifts to the flow back period.

Figure 17:
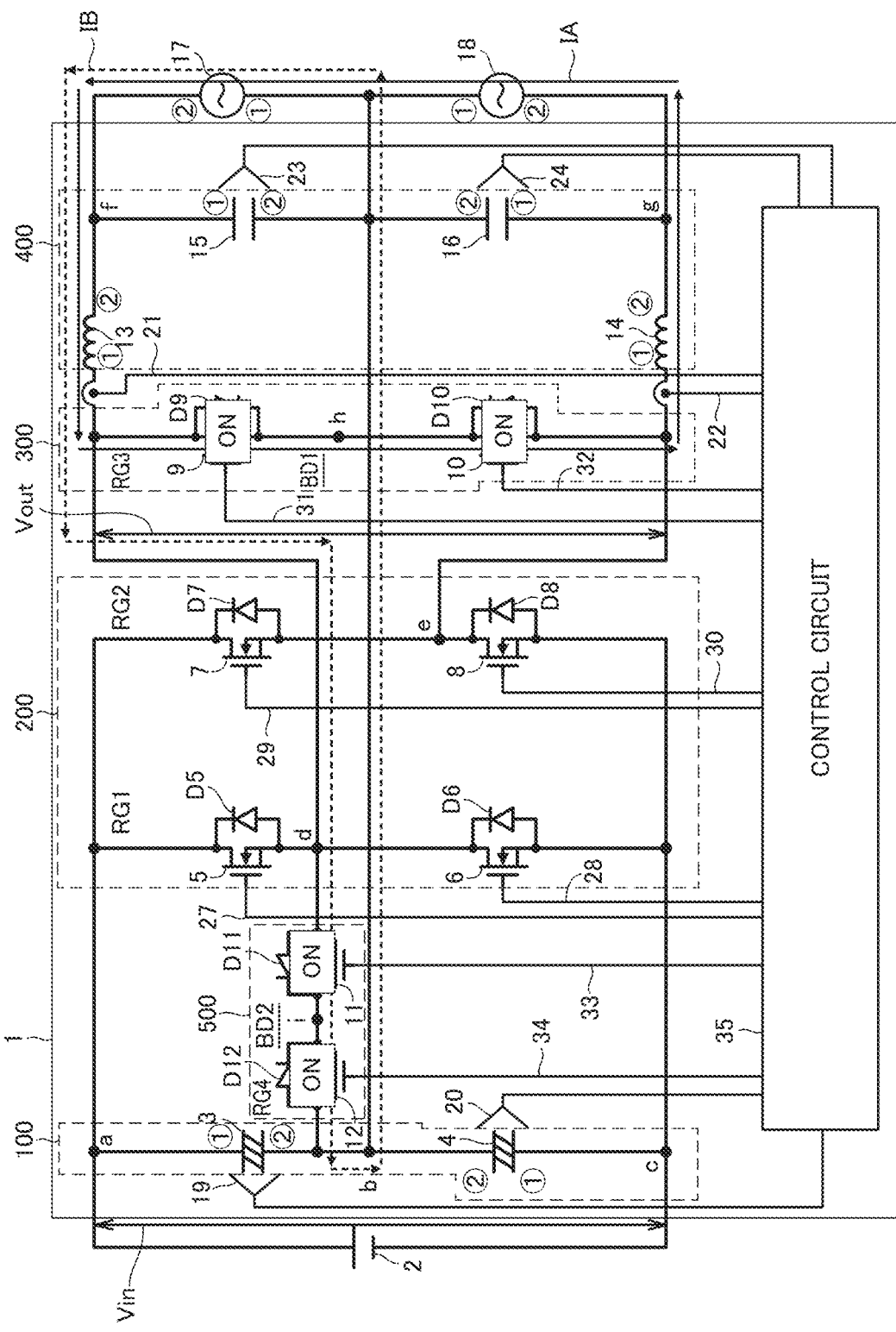
FIG. 17 is a view illustrating the current path during the flow back period when the AC voltage is negative, the AC current is negative, and the current flowing through the AC power supply 17 is larger than the current flowing through the AC power supply 18 in the single-phase three-wire operation.

FIG. 17 is a view illustrating the current path during the flow back period when the AC voltage is negative, the AC current is negative, and the current flowing through AC power supply 17 is larger than the current flowing through AC power supply 18 in the single-phase three-wire operation.

During the flow back period, switching elements 6, 7 are maintained in the off-state, switching elements 5, 8 are always in the off-state, switching elements 10, 12 are always in the on-state, and switching elements 9, 11 switched from off to on by the switching operation. That is, power conversion device 1 is set to the second switching mode.

During the flow back period, current IA flows through reactor 14, AC power supply 18, AC power supply 17, reactor 13, switching element 9, switching element 10, and reactor 14 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, switching element 11, switching element 12, AC power supply 17, and reactor 13 in this order. Current IA does not flow through the path passing through DC power supply 2, and current IA flows back. Because current IB also does not flow through the path passing through capacitor 3, current IB flows back. The path of current IB is different from the path when switching element 11 and switching element 12 in FIG. 9 are not used, and does not include capacitor 3, so that the loss of the reactor can be decreased.

(B-2-4) Dead Time Period

Subsequently, power conversion device 1 shifts to the dead time period.

In the dead time period, switching elements 9, 11 are switched from on to off by the switching operation, switching elements 5, 8 are always in the off-state, switching elements 10, 12 are always in the on-state, and switching elements 6, 7 are maintained in the off-state. That is, power conversion device 1 is set to the second dead time mode.

In the dead time period, power conversion device 1 operates similarly to the dead time period (B-2-2) described above.

(B-2-5) Power Transmission Period

Subsequently, power conversion device 1 returns to the power transmission period.

In the power transmission period, switching elements 6, 7 are switched from off to on by the switching. That is, power conversion device 1 is set to the second switching mode.

In the power transmission period, power conversion device 1 operates similarly to the power transmission period of (B-2-1) described above.

(B-3) Positive AC Voltage, Positive AC Current, and Power of AC Power Supply 17<Power of AC Power Supply 18

The operation when the power of AC power supply 17 is smaller than the power of AC power supply 18 in the case of the positive AC voltage and the positive AC current will be described. Because the power of AC power supply 17 is smaller than the power of AC power supply 18, the current flowing through AC power supply 17 is smaller than the current flowing through AC power supply 18.

When the AC voltage is positive, the voltage at the first terminal of capacitor 15 is positive, the voltage at the second terminal of capacitor 15 is negative, the voltage at the second terminal of capacitor 16 is positive, and the voltage at the first terminal of capacitor 16 is negative.

(B-3-1) Power Transmission Period

First, power conversion device 1 starts the power transmission period.

Figure 18:
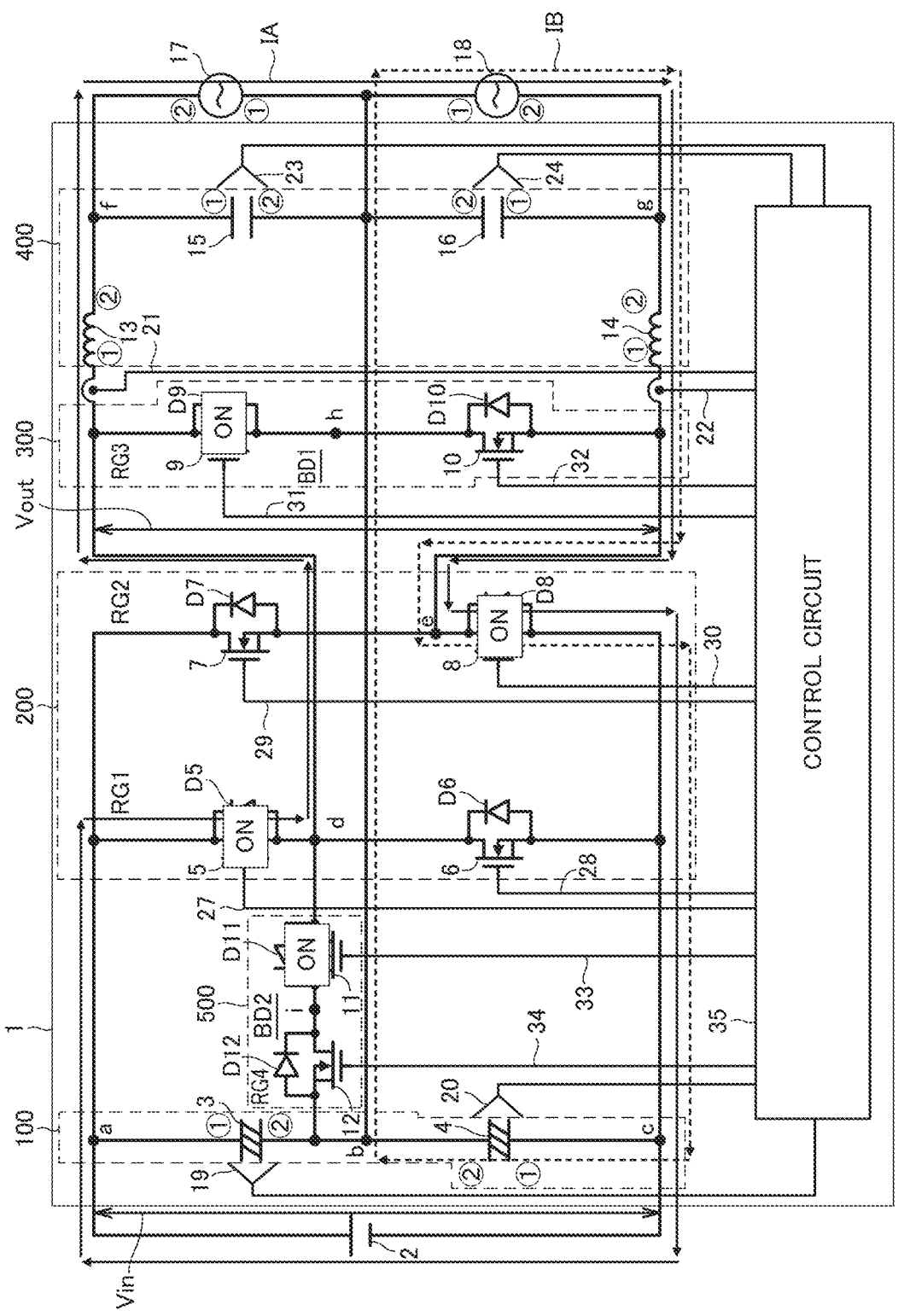
FIG. 18 is a view illustrating the current path during the power transmission period when the AC voltage is positive, the AC current is positive, and the current flowing through the AC power supply 17 is smaller than the current flowing through the AC power supply 18 in the single-phase three-wire operation.

FIG. 18 is a view illustrating the current path during the power transmission period when the AC voltage is positive, the AC current is positive, and the current flowing through AC power supply 17 is smaller than the current flowing through AC power supply 18 in the single-phase three-wire operation.

In the power transmission period, switching elements 5, 8 are turned on by the switching, switching elements 6, 7 are always in the off-state, switching elements 9, 11 are always in the on-state, and switching elements 10, 12 are turned off by the switching. That is, power conversion device 1 is set to the first switching mode.

During the power transmission period, current IA flows through DC power supply 2, switching element 5, reactor 13, AC power supply 17, AC power supply 18, reactor 14, switching element 8, and DC power supply 2 in this order. Furthermore, because the current flowing through AC power supply 17 is smaller than the current flowing through AC power supply 18, current IB obtained by subtracting the current flowing through AC power supply 17 from the current flowing through AC power supply 18 flows through capacitor 4, AC power supply 18, reactor 14, switching element 8, and capacitor 4 in this order. Because current IA flows through the path passing through DC power supply 2, the power transmission is performed by current IA. Because current IB flows through the path passing through capacitor 4, the power transmission is also performed by current IB.

(B-3-2) Dead Time Period

Subsequently, power conversion device 1 shifts to the dead time period.

Figure 19:
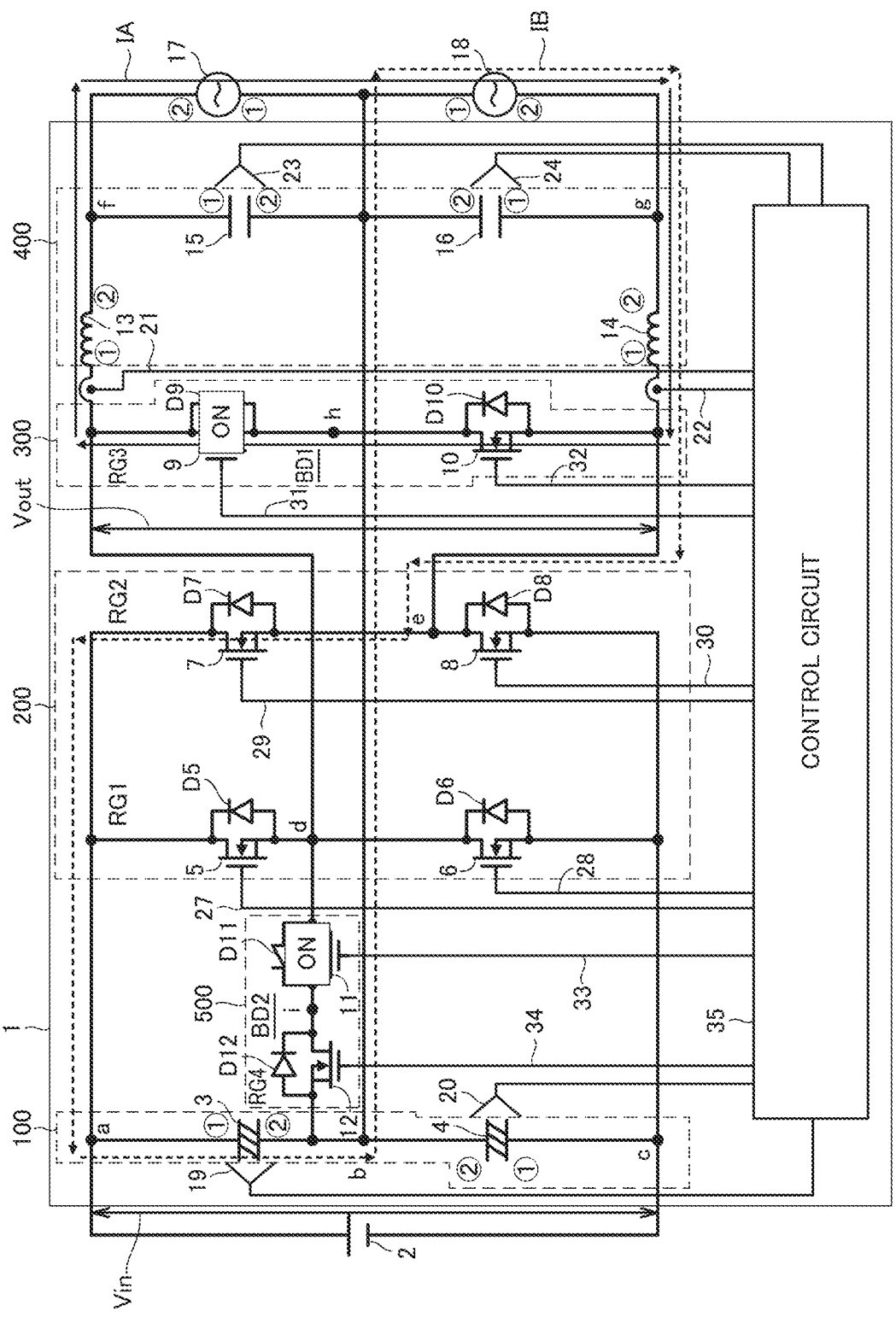
FIG. 19 is a view illustrating the current path during the dead time period when the AC voltage is positive, the AC current is positive, and the current flowing through the AC power supply 17 is smaller than the current flowing through the AC power supply 18 in the single-phase three-wire operation.

FIG. 19 is a view illustrating the current path during the dead time period when the AC voltage is positive, the AC current is positive, and the current flowing through AC power supply 17 is smaller than the current flowing through AC power supply 18 in the single-phase three-wire operation.

In the dead time period, switching elements 5, 8 are switched from on to off by the switching, switching elements 6, 7 are always in the off-state, switching elements 9, 11 are always in the on-state, and switching elements 10, 12 are maintained in the off-state. That is, power conversion device 1 is set to the first dead time.

During the dead time period, current IA flows through reactor 13, AC power supply 17, AC power supply 18, reactor 14, diode D10, switching element 9, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through AC power supply 18, reactor 14, diode D7, capacitor 3, and AC power supply 18 in this order.

Current IA does not flow through the path passing through DC power supply 2, and current IA flows back. The path of current IB includes capacitor 3, and capacitor 3 is charged by current IB. As a result, the voltage applied to both ends of reactor 14 increases by the voltage of capacitor 3 as compared with the case where only current IA flows back. Thus, the ripple of the current also increases, and the loss of the reactor increases. However, because the dead time period is about several microseconds, there is almost no influence of the loss of the reactor.

(B-3-3) Flow Back Period

Subsequently, power conversion device 1 shifts to the flow back period.

Figure 20:
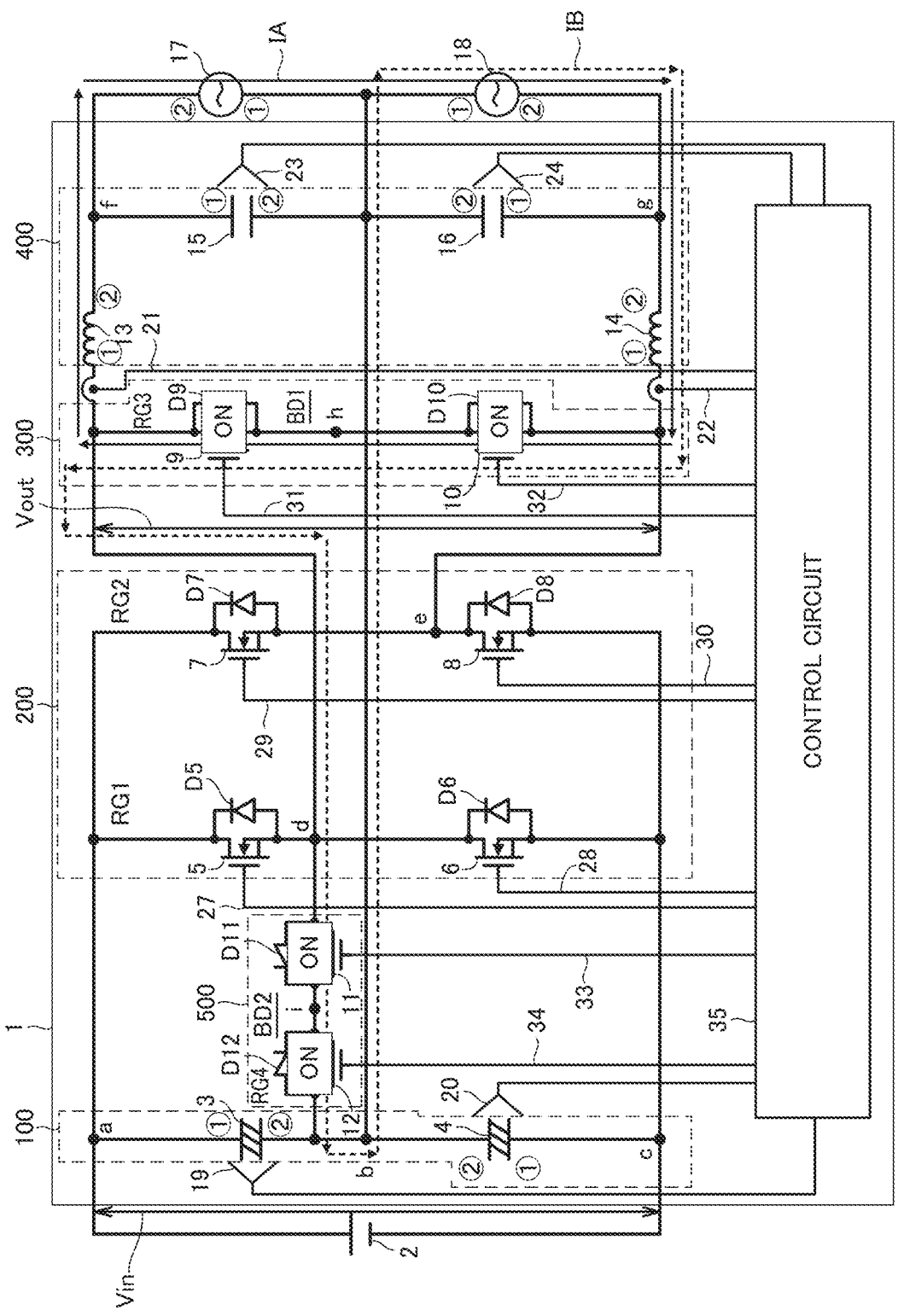
FIG. 20 is a view illustrating the current path during the flow back period when the AC voltage is positive, the AC current is positive, and the current flowing through the AC power supply 17 is smaller than the current flowing through the AC power supply 18 in the single-phase three-wire operation.

FIG. 20 is a view illustrating the current path during the flow back period when the AC voltage is positive, the AC current is positive, and the current flowing through AC power supply 17 is smaller than the current flowing through AC power supply 18 in the single-phase three-wire operation.

During the flow back period, switching elements 5, 8 are maintained in the off-state, switching elements 6, 7 are always in the off-state, switching elements 9, 11 are always in the on-state, and switching elements 10, 12 switched from off to on by the switching operation. That is, power conversion device 1 is set to the second switching mode.

During the flow back period, current IA flows through reactor 13, AC power supply 17, AC power supply 18, reactor 14, switching element 10, switching element 9, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, switching element 10, switching element 9, switching element 11, switching element 12, AC power supply 18, and reactor 14 in this order. Current IA does not flow through the path passing through DC power supply 2, and current IA flows back. Because current IB also does not flow through the path passing through capacitors 3, 4, current IB flows back. Because the path of current IB does not include capacitors 3, 4, the loss of the reactor can be decreased.

(B-3-4) Dead Time Period

Subsequently, power conversion device 1 shifts to the dead time period.

In the dead time period, switching elements 10, 12 are switched from on to off by the switching, switching elements 6, 7 are always in the off-state, switching elements 9, 11 are always in the on-state, and switching elements 5, 8 are maintained in the off-state. That is, power conversion device 1 is set to the first dead time.

In the dead time period, power conversion device 1 operates similarly to the dead time period (B-3-2) described above.

(B-3-5) Power Transmission Period

Subsequently, power conversion device 1 returns to the power transmission period.

In the power transmission period, switching elements 5, 8 are switched from off to on by the switching. That is, power conversion device 1 is set to the first switching mode.

In the power transmission period, power conversion device 1 operates similarly to the power transmission period of (B-3-1) described above.

(B-4) Negative AC Voltage, Negative AC Current, and Power of AC Power Supply 17<Power of AC Power Supply 18

The operation when the power of AC power supply 17 is smaller than the power of AC power supply 18 in the case of the negative AC voltage and the negative AC current will be described. Because the power of AC power supply 17 is smaller than the power of AC power supply 18, the current flowing through AC power supply 17 is smaller than the current flowing through AC power supply 18.

When the AC voltage is negative, the voltage at the first terminal of capacitor 15 is negative, the voltage at the second terminal of capacitor 15 is positive, the voltage at the second terminal of capacitor 16 is negative, and the voltage at the first terminal of capacitor 16 is positive.

(B-4-1) Power Transmission Period

First, power conversion device 1 starts the power transmission period.

Figure 21:
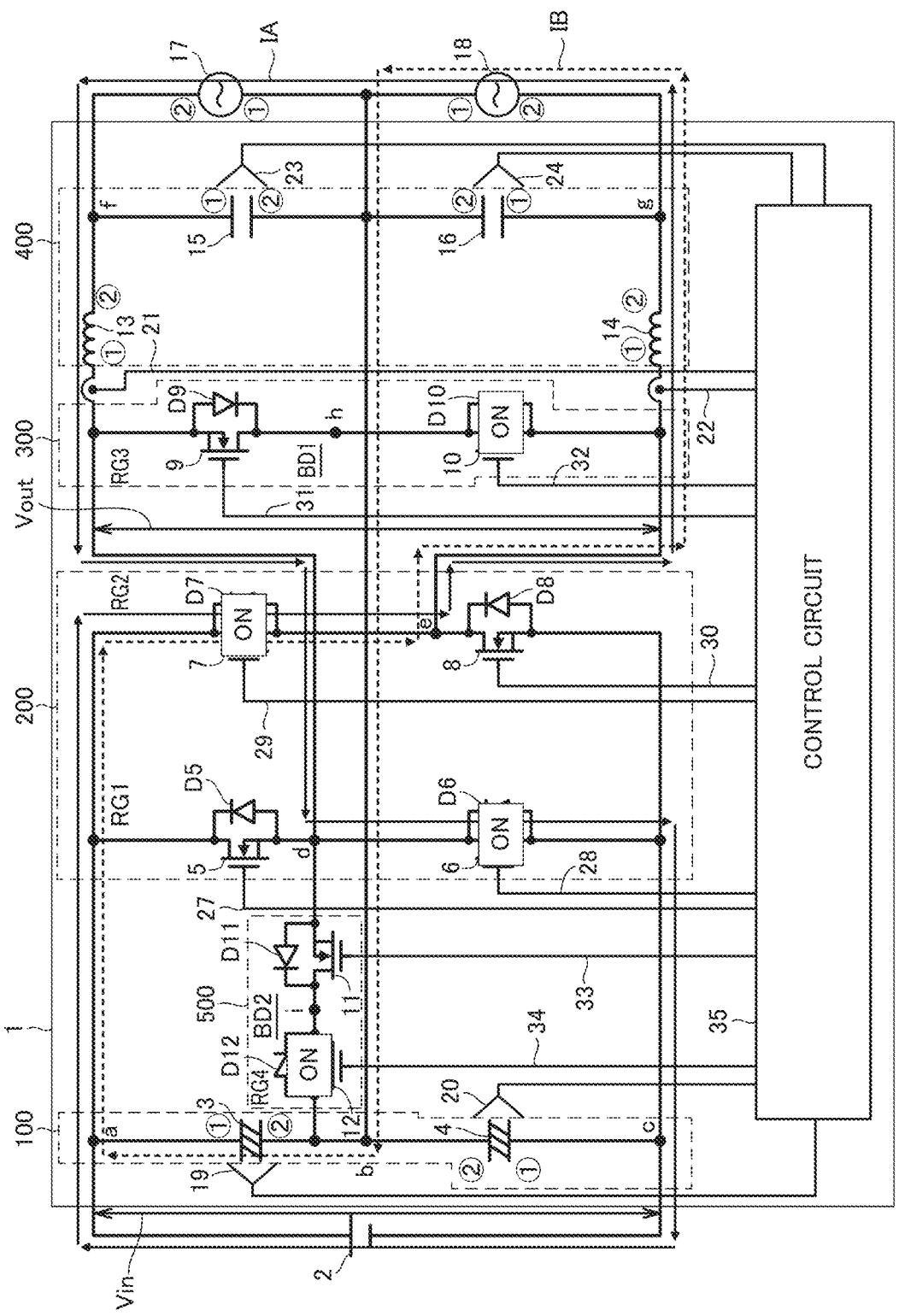
FIG. 21 is a view illustrating the current path during the power transmission period when the AC voltage is negative, the AC current is negative, and the current flowing through the AC power supply 17 is smaller than the current flowing through the AC power supply 18 in the single-phase three-wire operation.

FIG. 21 is a view illustrating the current path during the power transmission period when the AC voltage is negative, the AC current is negative, and the current flowing through AC power supply 17 is smaller than the current flowing through AC power supply 18 in the single-phase three-wire operation.

In the power transmission period, switching elements 6, 7 are turned on by the switching, switching elements 5, 8 are always in the off-state, switching elements 10, 12 are always in the on-state, and switching elements 9, 11 are turned off by the switching. That is, power conversion device 1 is set to the third switching mode.

During the power transmission period, current IA flows through DC power supply 2, switching element 7, reactor 14, AC power supply 18, AC power supply 17, reactor 13, switching element 6, and DC power supply 2 in this order. Furthermore, because the current flowing through AC power supply 17 is smaller than the current flowing through AC power supply 18, current IB obtained by subtracting the current flowing through AC power supply 17 from the current flowing through AC power supply 18 flows through capacitor 3, switching element 7, reactor 14, AC power supply 18, and capacitor 3 in this order. Because current IA flows through the path passing through DC power supply 2, the power transmission is performed by current IA. Because current IB flows through the path passing through capacitor 3, the power transmission is also performed by current IB.

(B-4-2) Dead Time Period

Subsequently, power conversion device 1 shifts to the dead time period.

Figure 22:
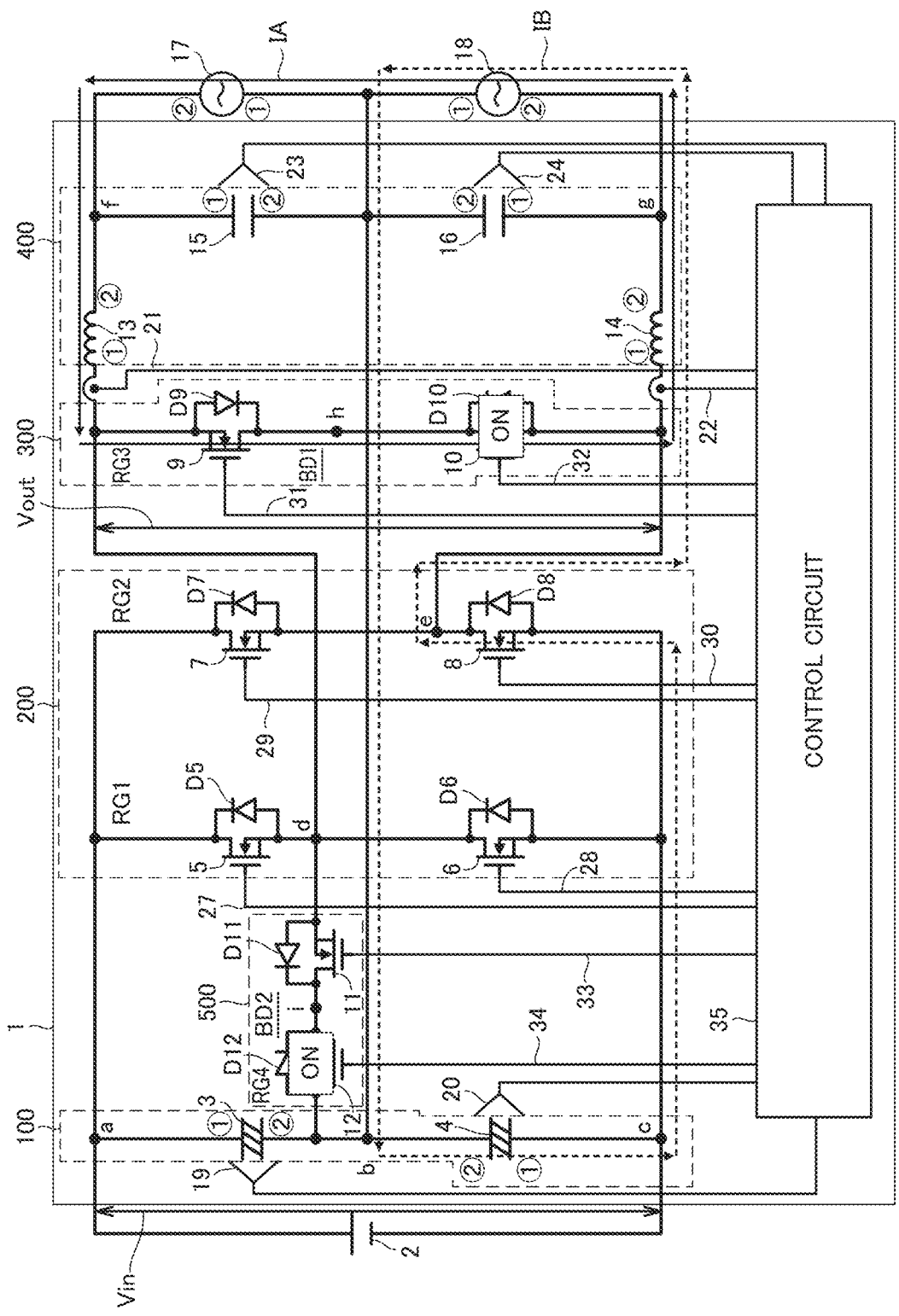
FIG. 22 is a view illustrating the current path during the dead time period when the AC voltage is negative, the AC current is negative, and the current flowing through the AC power supply 17 is smaller than the current flowing through the AC power supply 18 in the single-phase three-wire operation.

FIG. 22 is a view illustrating the current path during the dead time period when the AC voltage is negative, the AC current is negative, and the current flowing through AC power supply 17 is smaller than the current flowing through AC power supply 18 in the single-phase three-wire operation.

In the dead time period, switching elements 6, 7 are switched from on to off by the switching, switching elements 5, 8 are always in the off-state, switching elements 10, 12 are always in the on-state, and switching elements 9, 11 are maintained in the off-state. That is, power conversion device 1 is set to the second dead time.

During the dead time period, current IA flows through reactor 14, AC power supply 18, AC power supply 17, reactor 13, diode D9, switching element 10, and reactor 14 in this order. Furthermore, because the current flowing through AC power supply 17 is smaller than the current flowing through AC power supply 18, current IB obtained by subtracting the current flowing through. AC power supply 17 from the current flowing through AC power supply 18 flows through reactor 14, AC power supply 18, capacitor 4, diode D8, and reactor 14 in this order. Current IA does not flow through the path passing through DC power supply 2, and current IA flows back. The path of current IB includes capacitor 4, and capacitor 4 is charged by current IB. As a result, the voltage applied to both ends of reactor 14 increases by the voltage of capacitor 4 as compared with the case where only current IA flows back. Thus, the ripple of the current also increases, and the loss of the reactor increases. However, because the dead time period is about several microseconds, there is almost no influence of the loss of the reactor.

(B-4-3) Flow Back Period

Subsequently, power conversion device 1 shifts to the flow back period.

Figure 23:
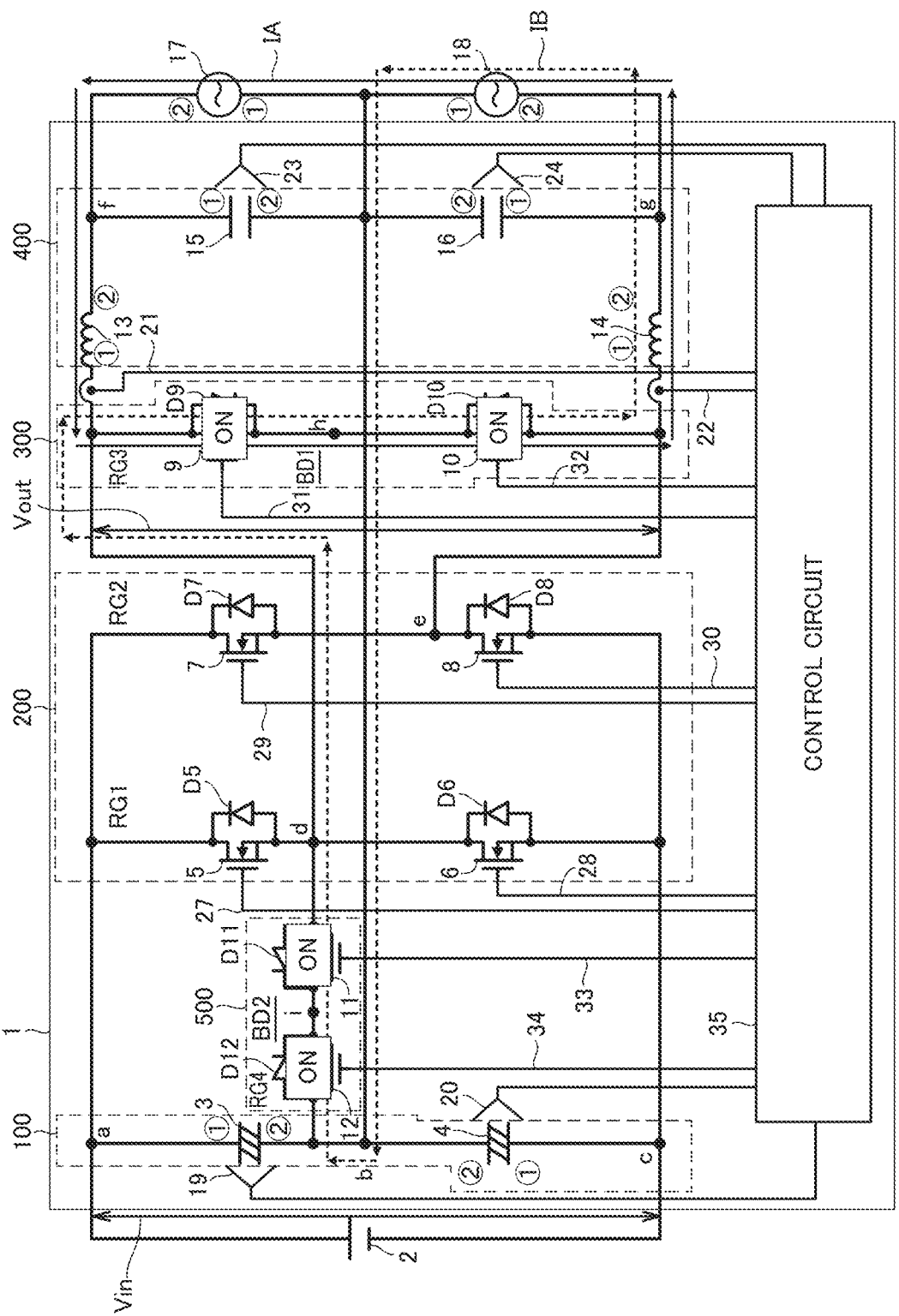
FIG. 23 is a view illustrating the current path during the flow back period when the AC voltage is negative, the AC current is negative, and the current flowing through the AC power supply 17 is smaller than the current flowing through the AC power supply 18 in the single-phase three-wire operation.

FIG. 23 is a view illustrating the current path during the flow back period when the AC voltage is negative, the AC current is negative, and the current flowing through AC power supply 17 is smaller than the current flowing through AC power supply 18 in the single-phase three-wire operation.

During the flow back period, switching elements 6, 7 are maintained in the off-state, switching elements 5, 8 are always in the off-state, switching elements 10, 12 are always in the on-state, and switching elements 9, 11 switched from off to on by the switching operation. That is, power conversion device 1 is set to the second switching mode.

During the flow back period, current IA flows through reactor 14, AC power supply 18, AC power supply 17, reactor 13, switching element 9, switching element 10, and reactor 14 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, AC power supply 18, switching element 12, switching element 11, switching element 9, switching element 10, and reactor 14 in this order. Current IA does not flow through the path passing through DC power supply 2, and current IA flows back. Because current IB also does not flow through the path passing through capacitors 3, 4, the loss of reactor 14 can be decreased.

(B-4-4) Dead Time Period

Subsequently, power conversion device 1 shifts to the dead time period.

In the dead time period, switching elements 9, 11 are switched from on to off by the switching operation, switching elements 5, 8 are always in the off-state, switching elements 10, 12 are always in the on-state, and switching elements 6, 7 are maintained in the off-state. That is, power conversion device 1 is set to the second dead time.

In the dead time period, power conversion device 1 operates similarly to the dead time period (B-4-2) described above.

(B-4-5) Power Transmission Period

Subsequently, power conversion device 1 returns to the power transmission period.

In the power transmission period, switching elements 6, 7 are switched from off to on by the switching. That is, power conversion device 1 is set to the third switching mode.

In the power transmission period, power conversion device 1 operates similarly to the power transmission period of (B-4-1) described above.

As described above, according to the first embodiment, the power conversion device includes switching element 11 and switching element 12, so that current IB can flow through a path other than the path passing through the power supply (DC power supply 2, capacitor 3, capacitor 4) when the power consumption of AC power supply 17 and the power consumption of AC power supply 18 are different from each other during the single-phase three-wire operation.

Thus, when current IA does not pass through the power source (DC power supply 2, capacitor 3, capacitor 4) and flows back except for the short dead time period, current IB also does not pass through the power source (DC power supply 2, capacitor 3, capacitor 4). As a result, power conversion device 1 operates stably. In addition, because the voltage applied to both ends of the reactor does not increase by the voltage of the capacitor, the loss of the reactor can be decreased.

Furthermore, according to the first embodiment, the level of drive signal 31 controlling switching element 9 and the level of drive signal 33 controlling switching element 11 are the same, and the level of drive signal 32 controlling switching element 10 and the level of drive signal 34 controlling switching element 12 are the same. Drive signal 33 obtained by duplicating the drive signal 31 is supplied to switching element 11 and drive signal 34 obtained by duplicating drive signal 32 is supplied to switching element 12, so that the circuit generating drive signals 33, 34 does not need to be provided.

Second Embodiment

Figure 24:
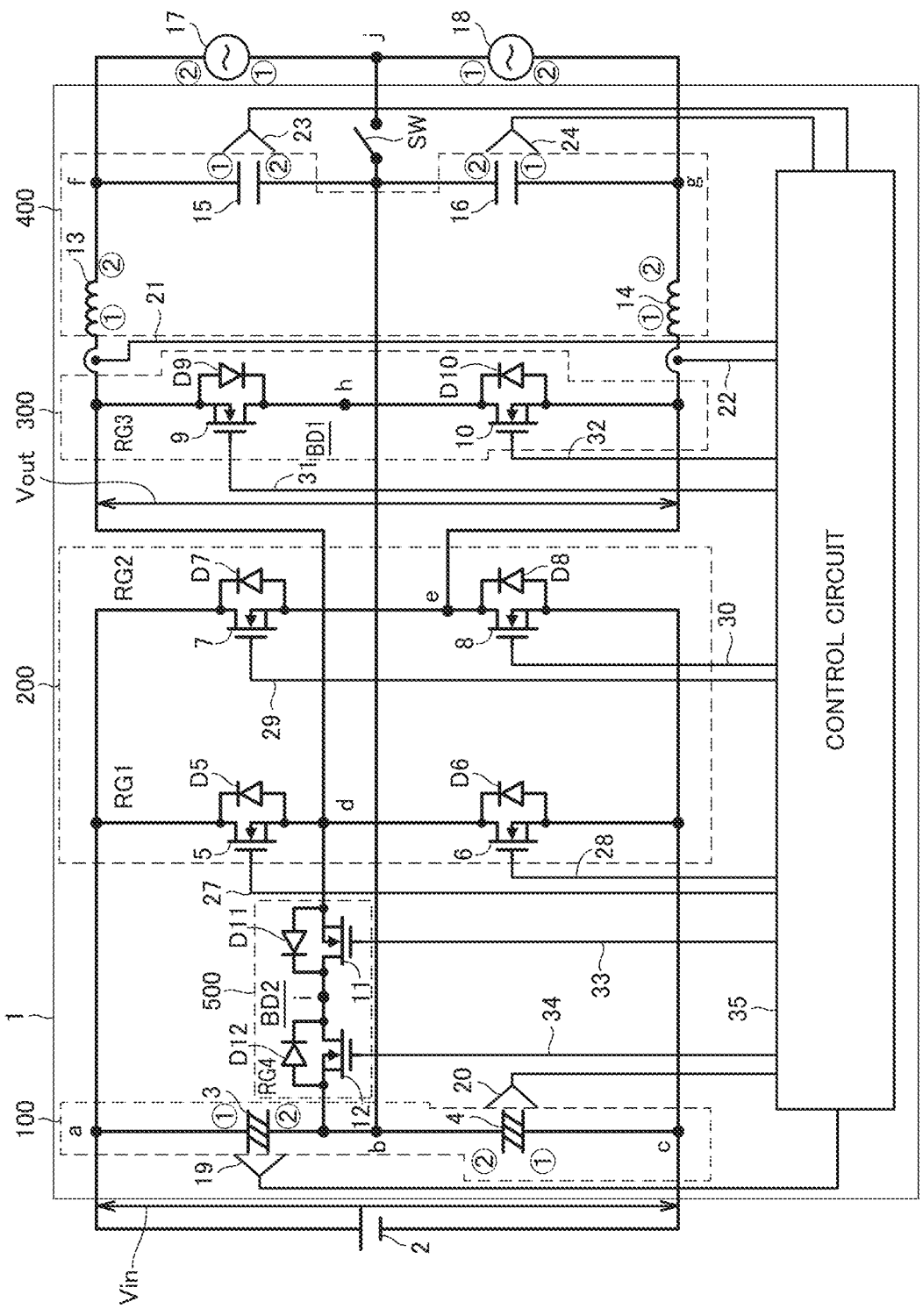
FIG. 24 is a view illustrating a configuration of a power conversion device 1 according to a second embodiment.

FIG. 24 is a view illustrating a configuration of a power conversion device 1 according to a second embodiment.

Power conversion device 1 of the second embodiment is different from power conversion device 1 of the first embodiment in that power conversion device 1 of the second embodiment includes a changeover switch SW.

In the second embodiment, AC power supply 17 is disposed between node f and a node j (tenth node), and AC power supply 18 is disposed between node j and node g. That is, the first terminal of AC power supply 17 and the first terminal of AC power supply 18 are connected at node j. The second terminal of AC power supply 17 is connected to node f. The second terminal of AC power supply 18 is connected to node g.

Changeover switch SW is disposed between node b and node j. Changeover switch SW is a mechanical switch or a semiconductor switch.

Control circuit 35 turns on changeover switch SW during the single-phase three-wire operation, and turns off changeover switch SW during the single-phase two-wire operation.

The single-phase three-wire operation of power conversion device 1 of the second embodiment is similar to that of the first embodiment. The single-phase two-wire operation of the power conversion device 1 will be described.

When power conversion device 1 performs the single-phase two-wire operation, control circuit 35 always turns off second bidirectional switch BD2. That is, control circuit 35 does not drive switching element 11 and switching element 12, and switching element 11 and switching element 12 are always in the off-state.

Figure 25:
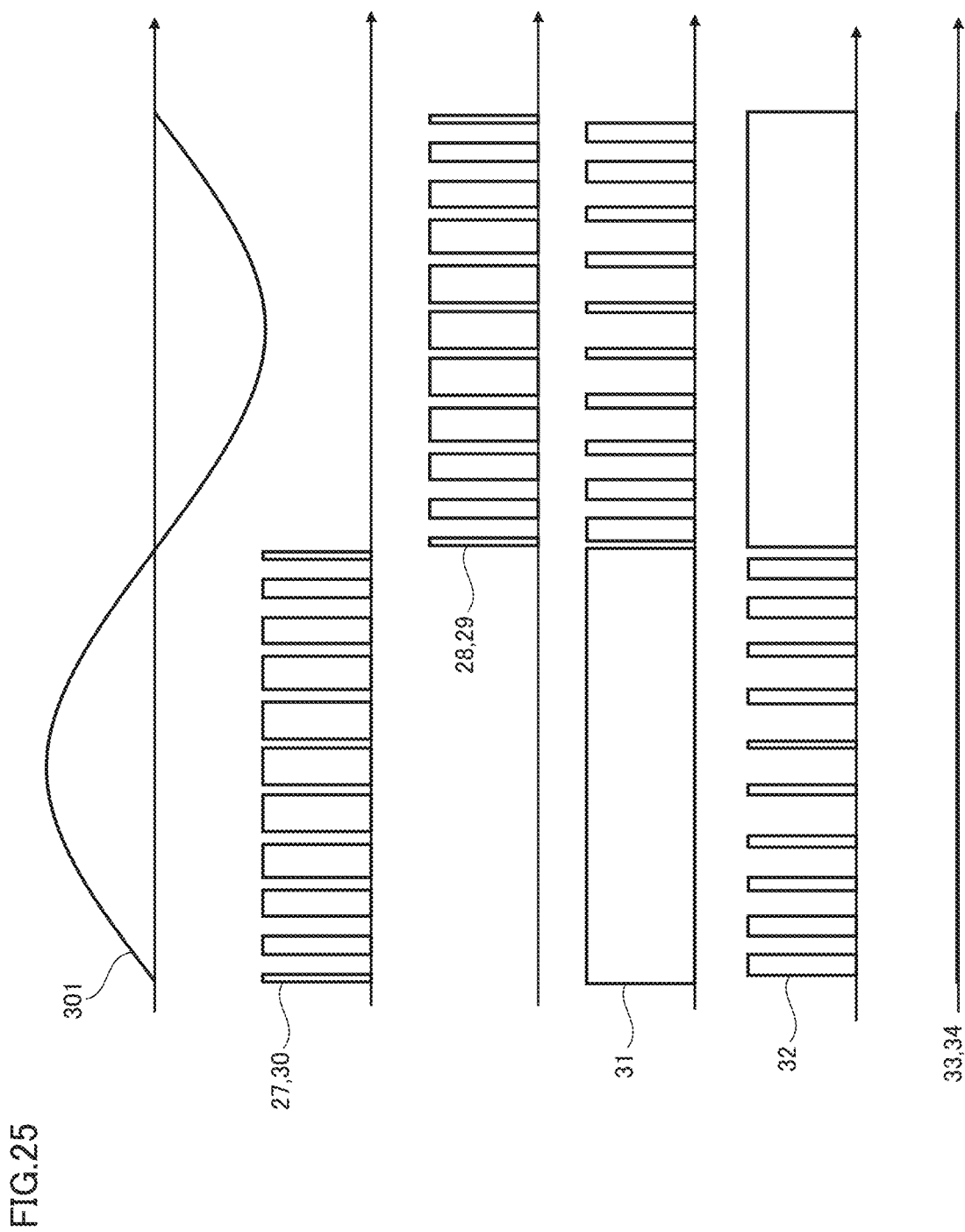
FIG. 25 is a view illustrating an AC power command value 301 and drive signal 27 to 32 during single-phase two-wire operation of the power conversion device 1 of the second embodiment.

FIG. 25 is a view illustrating an AC power command value 301 and drive signal 27 to 32 during the single-phase two-wire operation of power conversion device 1 of the second embodiment.

FIG. 25 illustrates AC power command value 301, drive signals 27, 30 of switching elements 5, 8, drive signals 28, 29 of switching elements 6, 7, drive signal 31 of switching element 9, drive signal 32 of switching element 10, and drive signals 33, 34 of switching elements 11, 12.

Drive signals 27 to 32 are a binary of the high level or the low level. Drive signals 33, 34 are always at the low level.

When AC power command value 301 is positive, the operation is as follows.

Switching elements 5, 8, 10 perform the switching. At this point, the switching operation of switching element 10 is complementary to the switching operation of switching elements 5, 8. Switching elements 6, 7 are always in the off-state. Switching element 9 is always in an on-state.

When AC power command value 301 is negative, the operation is as follows.

Switching elements 6, 7, 9 perform the switching. At this point, the switching operation of switching element 9 is complementary to the switching operation of switching elements 6, 7. Switching elements 5, 8 are always in the off-state. Switching element 10 is always in the on-state.

In the above-described complementary operation, on-timing of one switching element and off-timing of the other switching element are set so as not to be completely the same. This is to avoid generation of the short-circuit state of DC power supply 2.

(C-1) Positive AC Voltage and Positive AC Current

When the AC voltage is positive, the voltage at the first terminal of capacitor 15 is positive, the voltage at the second terminal of capacitor 15 is negative, the voltage at the first terminal of capacitor 16 is negative, and the voltage at the second terminal of capacitor 16 is positive.

When the alternating current is positive, the current flows from the first terminal to the second terminal of reactor 13. At this point, switching elements 5, 8, 10 perform the switching operation, switching elements 6, 7 are always in the off-state, and switching element 9 is always in the on-state.

(C-1-1) Power Transmission Period

First, power conversion device 1 starts the power transmission period.

Figure 26:
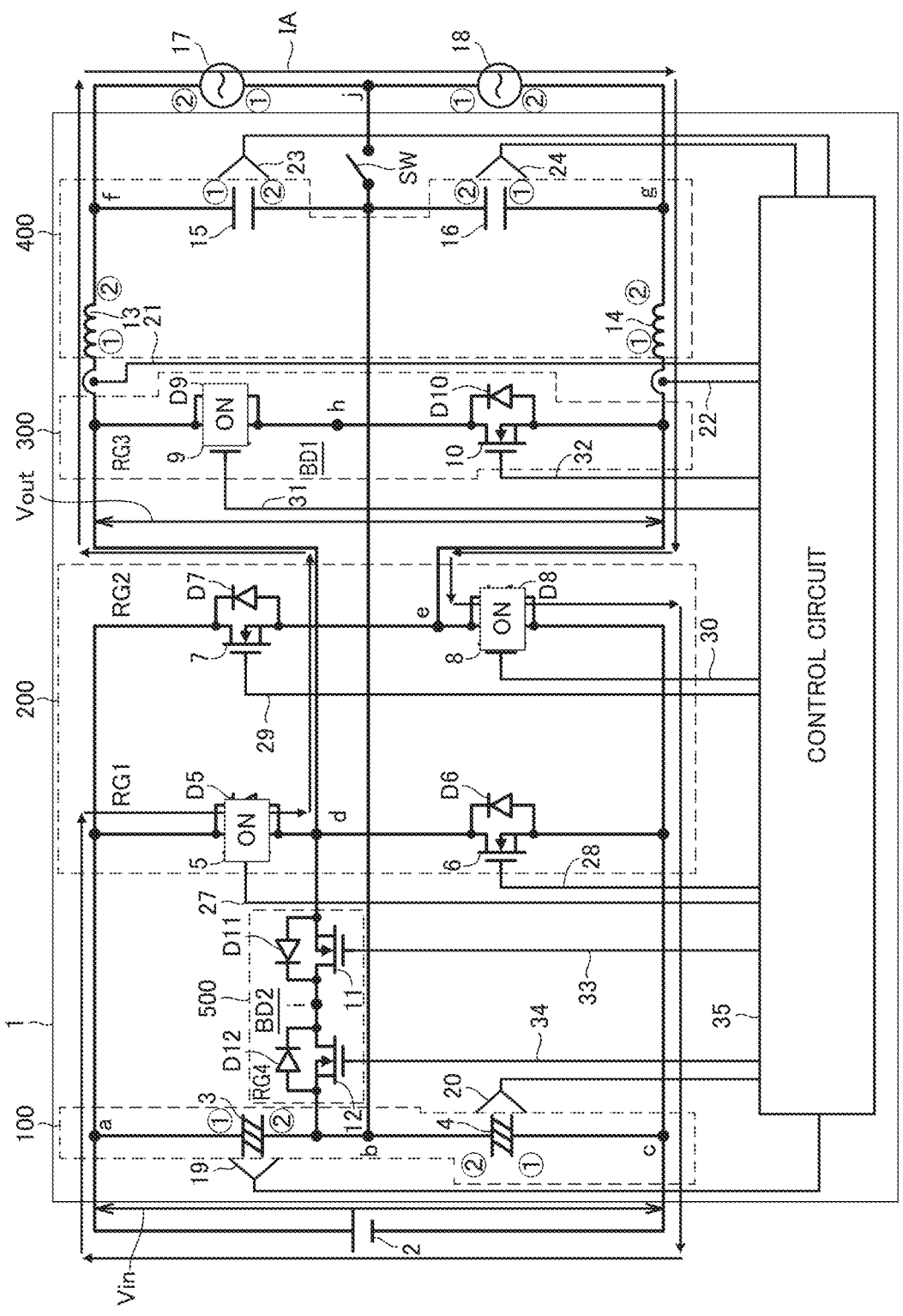
FIG. 26 is a view illustrating the current path during the power transmission period when the AC voltage is positive and the AC current is positive in the single-phase two-wire operation.

FIG. 26 is a view illustrating the current path during the power transmission period when the AC voltage is positive and the AC current is positive in the single-phase two-wire operation.

In the power transmission period, switching elements 5, 8 are turned on by the switching, switching elements 6, 7 are always in the off-state, switching element 9 is always in the on-state, and switching element 10 is turned off by the switching.

In the power transmission period, current IA flows through DC power supply 2, switching element 5, reactor 13, AC power supply 17, AC power supply 18, reactor 14, switching element 8, and DC power supply 2 in this order. Current IA passes through DC power supply 2, and there is also current passing through capacitor 3 and capacitor 4. Current IA passes through AC power supply 17 and AC power supply 18, and there is also current passing through capacitor 15 and capacitor 16. The same applies to the following.

(C-1-2) Dead Time Period

Subsequently, power conversion device 1 shifts to the dead time period.

Figure 27:
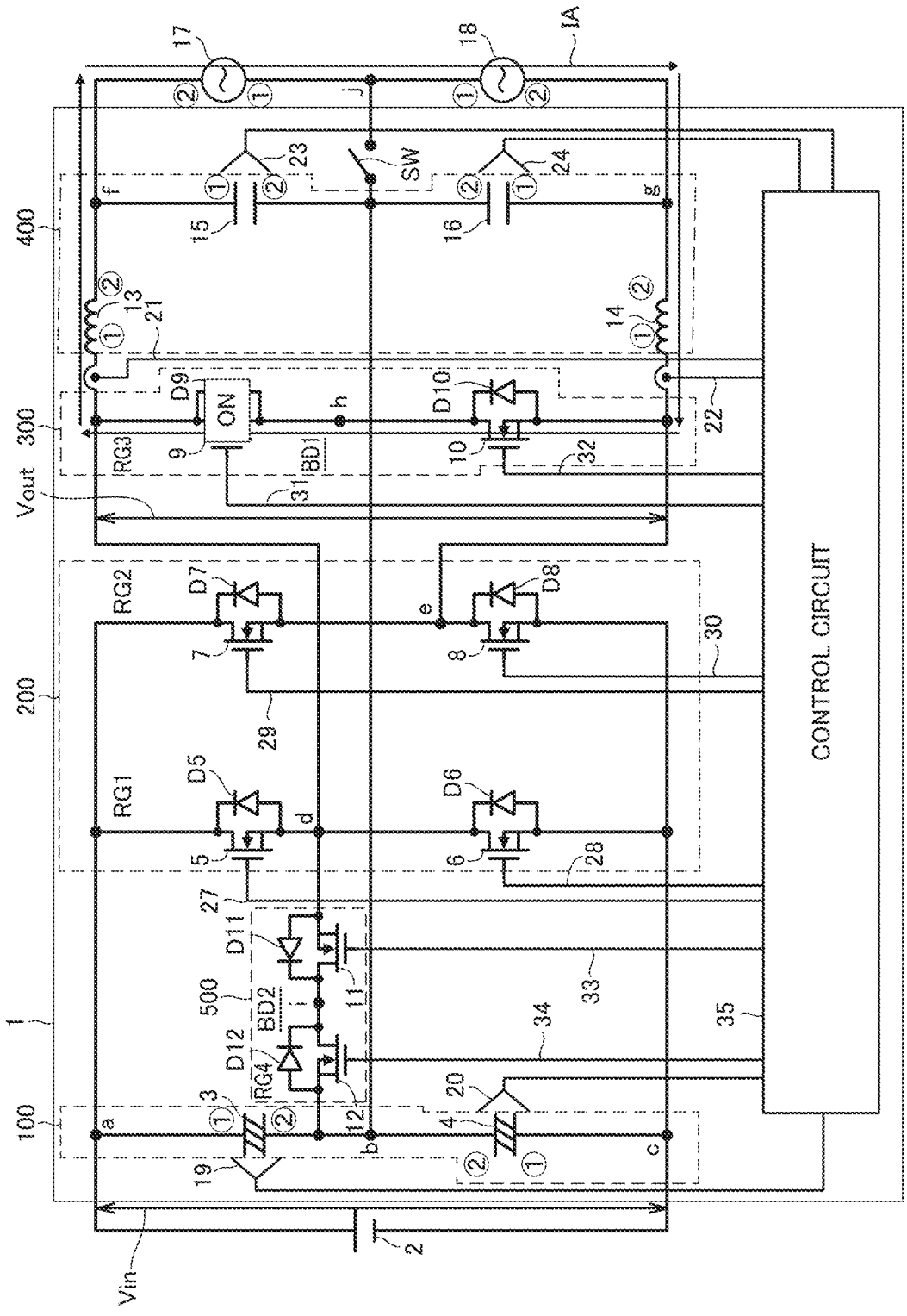
FIG. 27 is a view illustrating the current path during the dead time period when the AC voltage is positive and the AC current is positive in the single-phase two-wire operation.

FIG. 27 is a view illustrating the current path during the dead time period when the AC voltage is positive and the AC current is positive in the single-phase two-wire operation.

In the dead time period, switching elements 5, 8 are switched from on to off by the switching, switching elements 6, 7 are always in the off-state, switching element 9 is always in the on-state, and switching element 10 is maintained in the off-state.

During the dead time period, current IA flows through reactor 13, AC power supply 17, AC power supply 18, reactor 14, diode D10, switching element 9, and reactor 13 in this order.

(C-1-3) Flow Back Period Subsequently, power conversion device 1 shifts to the flow back period.

Figure 28:
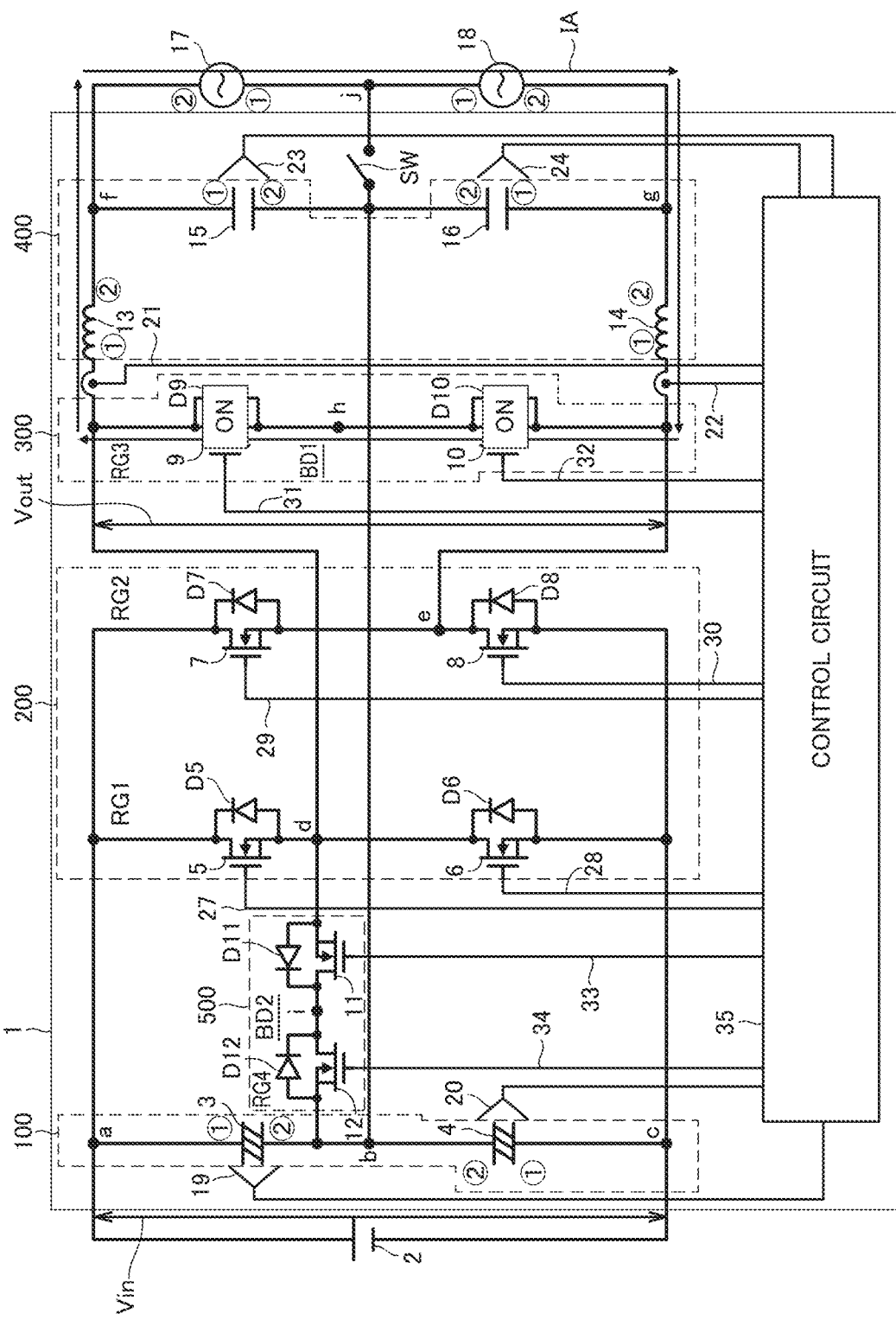
FIG. 28 is a view illustrating the current path during the flow back period when the AC voltage is positive and the AC current is positive in the single-phase two-wire operation.

FIG. 28 is a view illustrating the current path during the flow back period when the AC voltage is positive and the AC current is positive in the single-phase two-wire operation.

During the flow back period, switching elements 5, 8 are maintained in the off-state, switching elements 6, 7 are always in the off-state, switching element 9 is always in the on-state, and switching element 10 is switched from off to on by the switching operation.

During the flow back period, current IA flows through reactor 13, AC power supply 17, AC power supply 18, reactor 14, switching element 10, switching element 9, and reactor 13 in this order.

The current path in the flow back period is the same as the current path in the dead time period, and the following characteristic is obtained when the switching element is the MOSFET. When switching element 10 is switched from off to on, a current flowing portion is changed from the diode to the MOSFET. When the voltage drop during passing through the MOSFET is smaller than the voltage drop during passing through the diode, the power loss in the flow back period is smaller than the power loss in the dead time period.

(C-1-4) Dead Time Period

Subsequently, power conversion device 1 shifts to the dead time period.

In the dead time period, switching element 10 is switched from on to off by the switching, switching elements 6, 7 are always in the off-state, switching element 9 is always in the on-state, and switching elements 5, 8 are maintained in the off-state.

In the dead time period, power conversion device 1 operates similarly to the dead time period (C-1-2) described above.

(C-1-5) Power Transmission Period

Subsequently, power conversion device 1 returns to the power transmission period.

In the power transmission period, switching elements 5, 8 are switched from off to on by the switching.

In the power transmission period, power conversion device 1 operates similarly to the power transmission period (C-1-1) described above.

In this way, it can be seen that only two switching elements pass through the current path. In a neutral point grounding three-level power conversion device, four switching elements are passed through in the flow back period during which the power transmission is not performed, whereas in the second embodiment, the number of passing elements of the switching elements is small.

(C-2) Negative AC Voltage and Negative AC Current

When the AC voltage is negative, the voltage at the first terminal of capacitor 15 is negative, the voltage at the second terminal of capacitor 15 is positive, the voltage at the first terminal of capacitor 16 is positive, and the voltage at the second terminal of capacitor 16 is negative.

When the alternating current is negative, the current flows from the second terminal to the first terminal of reactor 13. At this point, switching elements 6, 7, 9 perform switching operations, switching elements 5, 8 are always in the off-state, and switching element 10 is always in the on-state.

(C-2-1) Power Transmission Period

First, power conversion device 1 starts the power transmission period.

Figure 29:
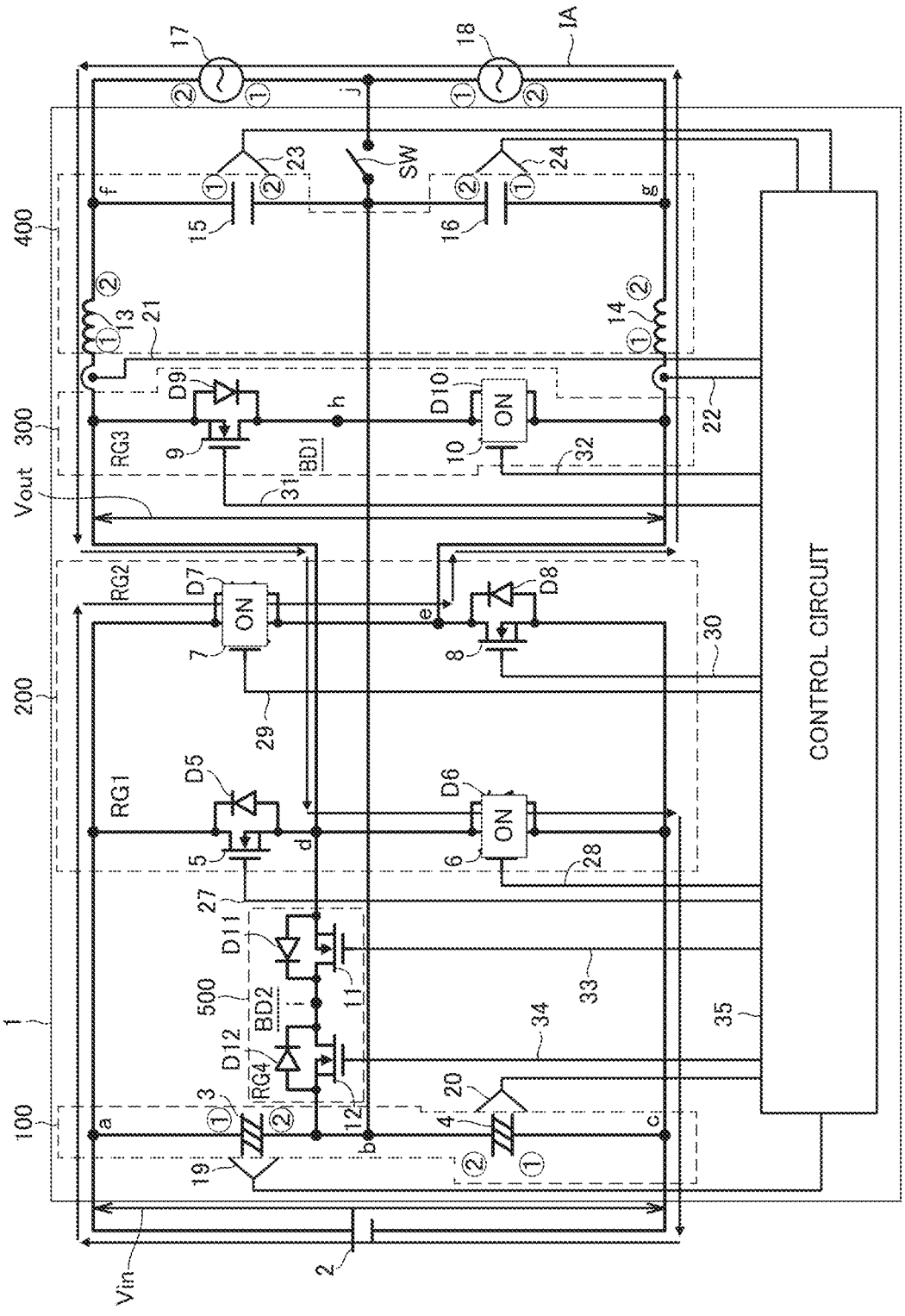
FIG. 29 is a view illustrating the current path during the power transmission period when the AC voltage is negative and the AC current is negative in the single-phase two-wire operation.

FIG. 29 is a view illustrating the current path during the power transmission period when the AC voltage is negative and the AC current is negative in the single-phase two-wire operation.

In the power transmission period, switching elements 6, 7 are turned on by the switching, switching elements 5, 8 are always in the off-state, switching element 10 is always in the on-state, and switching element 9 is turned off by the switching.

In the power transmission period, current IA flows through DC power supply 2, switching element 7, reactor 14, AC power supply 18, AC power supply 17, reactor 13, switching element 6, and DC power supply 2 in this order.

(C-2-2) Dead Time Period

Subsequently, power conversion device 1 shifts to the dead time period.

Figure 30:
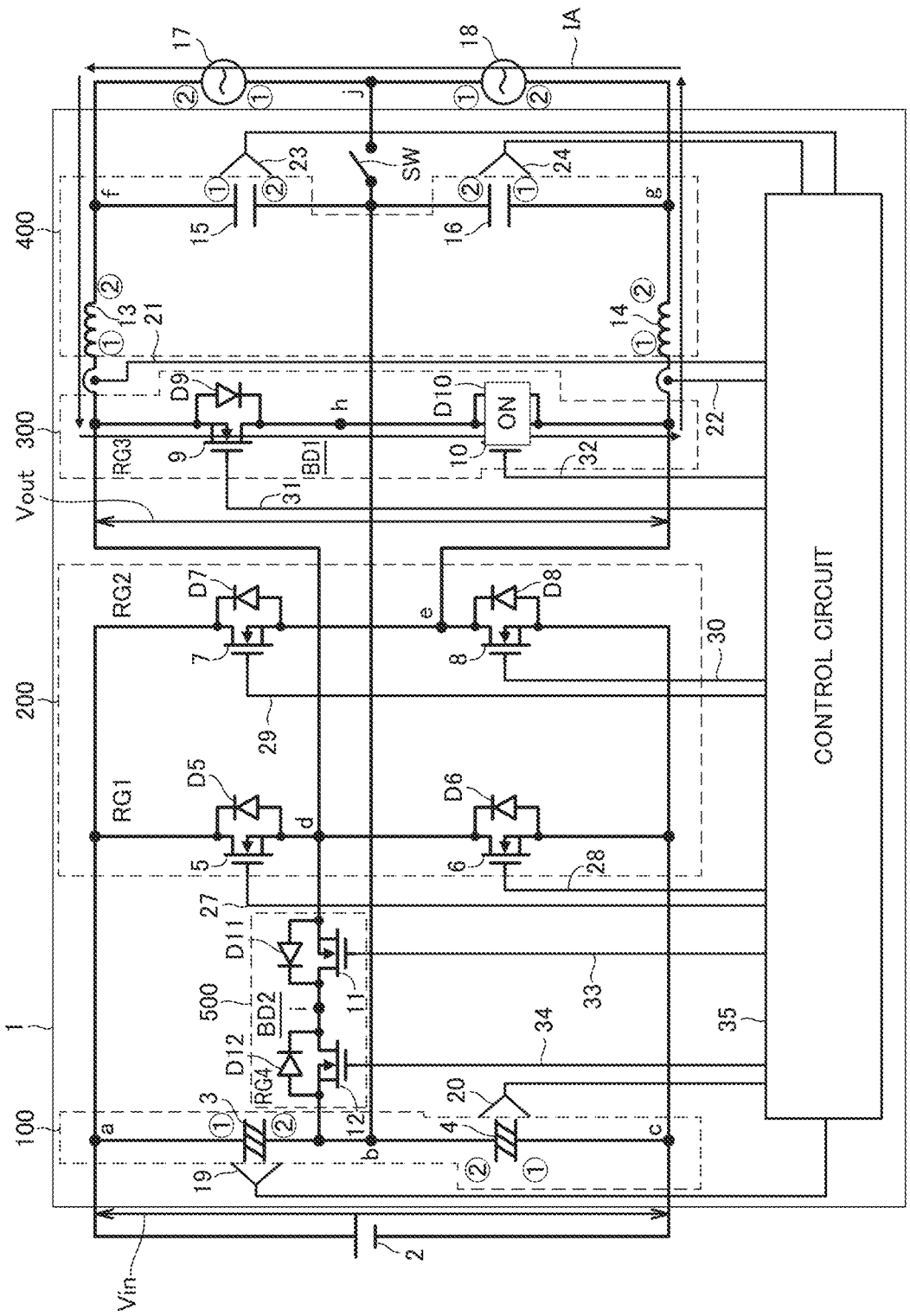
FIG. 30 is a view illustrating the current path during the dead time period when the AC voltage is negative and the AC current is negative in the single-phase two-wire operation.

FIG. 30 is a view illustrating the current path during the dead time period when the AC voltage is negative and the AC current is negative in the single-phase two-wire operation.

In the dead time period, switching elements 6, 7 are switched from on to off by the switching, switching elements 5, 8 are always in the off-state, switching element 10 is always in the on-state, and switching element 9 is maintained in the off-state.

During the dead time period, current IA flows through reactor 14, AC power supply 18, AC power supply 17, reactor 13, diode D9, switching element 10, and reactor 14 in this order.

(C-2-3) Flow Back Period

Subsequently, power conversion device 1 shifts to the flow back period.

Figure 31:
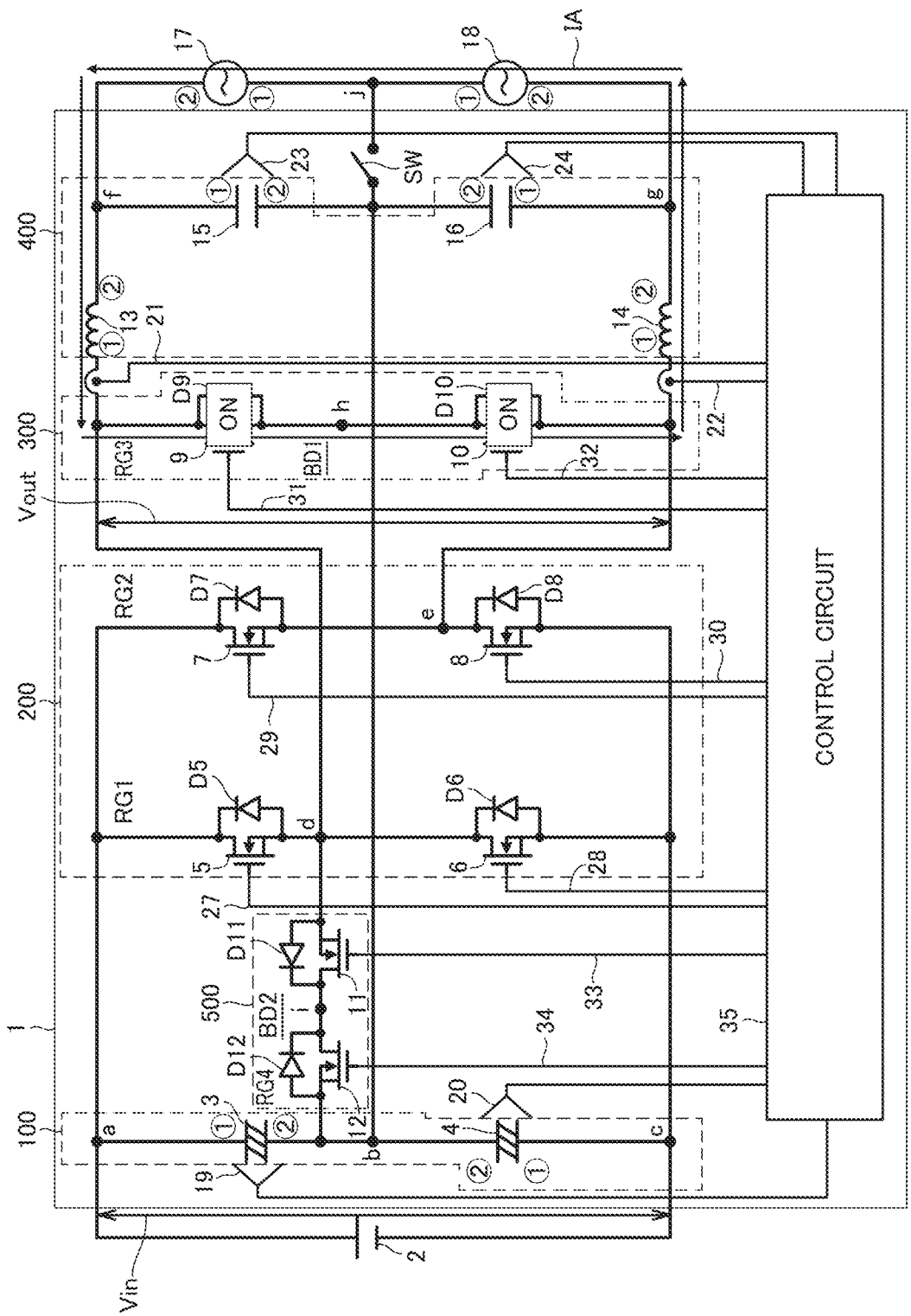
FIG. 31 is a view illustrating the current path during the flow back period when the AC voltage is negative and the AC current is negative in the single-phase two-wire operation.

FIG. 31 is a view illustrating the current path during the flow back period when the AC voltage is negative and the AC current is negative in the single-phase two-wire operation.

During the flow back period, switching elements 6, 7 are maintained in the off-state, switching elements 5, 8 are always in the off-state, switching element 10 is always in the on-state, and switching element 9 is switched from off to on by the switching operation.

During the flow back period, current IA flows through reactor 14, AC power supply 18, AC power supply 17, reactor 13, switching element 9, switching element 10, and reactor 14 in this order.

(C-2-4) Dead Time Period

Subsequently, power conversion device 1 shifts to the dead time period.

In the dead time period, switching element 9 is switched from on to off by the switching, switching elements 5, 8 are always in the off-state, switching element 10 is always in the on-state, and switching elements 6, 7 are maintained in the off-state.

In the dead time period, power conversion device 1 operates similarly to the dead time period (C-2-2) described above.

(C-2-5) Power Transmission Period

Subsequently, power conversion device 1 returns to the power transmission period.

In the power transmission period, switching elements 6, 7 are switched from off to on by the switching.

In the power transmission period, power conversion device 1 operates similarly to the power transmission period (C-2-1) described above.

As described above, according to the second embodiment, the single-phase two-wire operation can be executed in addition to the single-phase three-wire operation similar to that of the first embodiment.

Third Embodiment

Figure 32:
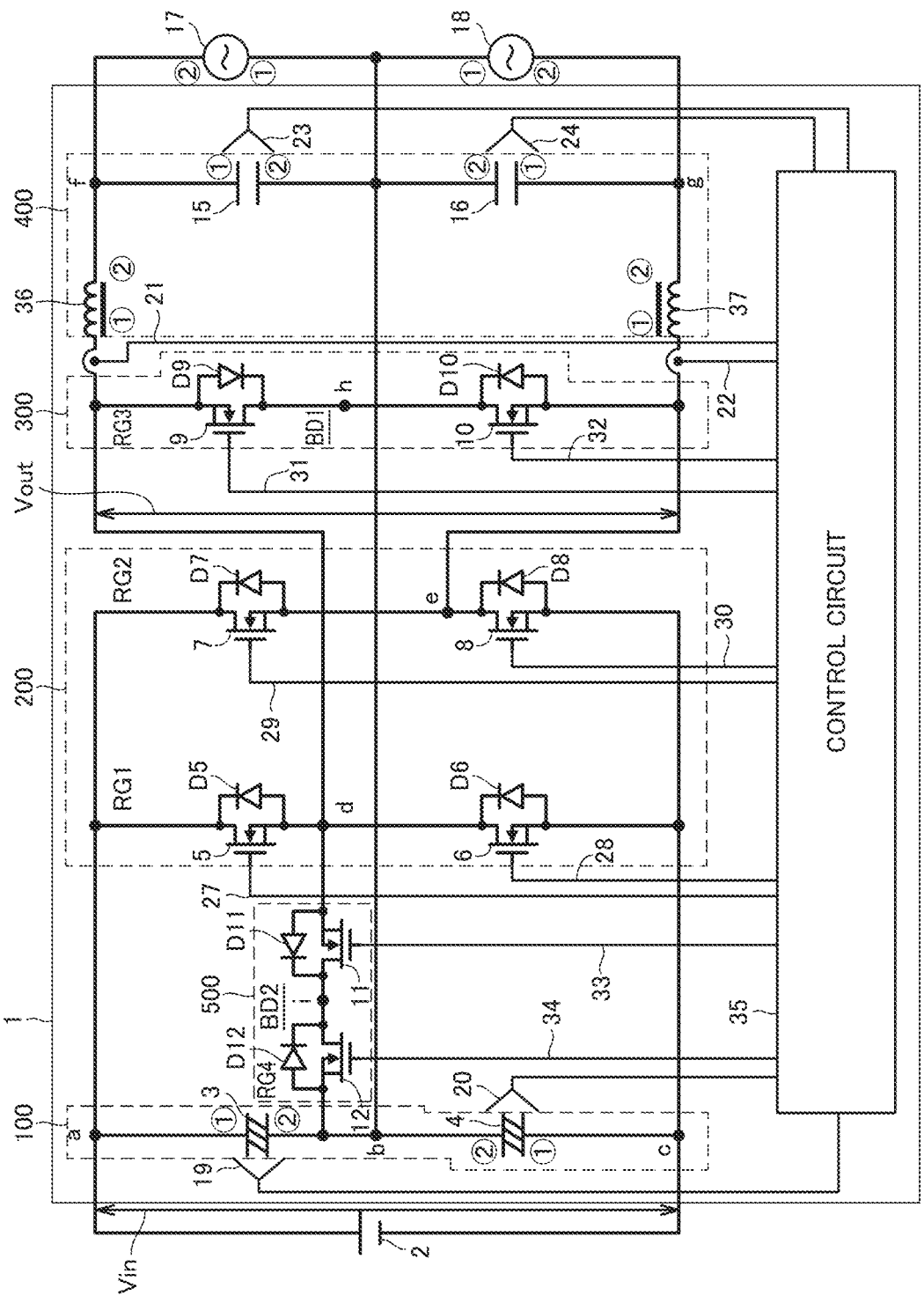
FIG. 32 is a view illustrating a configuration of a power conversion device 1 according to a third embodiment.

FIG. 32 is a view illustrating a configuration of a power conversion device 1 according to a third embodiment.

Power conversion device 1 of the third embodiment is different from power conversion device 1 of the first embodiment in that the power conversion device of the third embodiment includes reactors 36, 37 instead of reactors 13, 14.

Reactor 36 and reactor 37 are magnetically coupled, and one coupled reactor is formed by reactor 36 and reactor 37. Thus, because it is sufficient to produce one coupled reactor, it is easy to dispose reactor 36 and reactor 37 in power conversion device 1.

Fourth Embodiment

Figure 33:
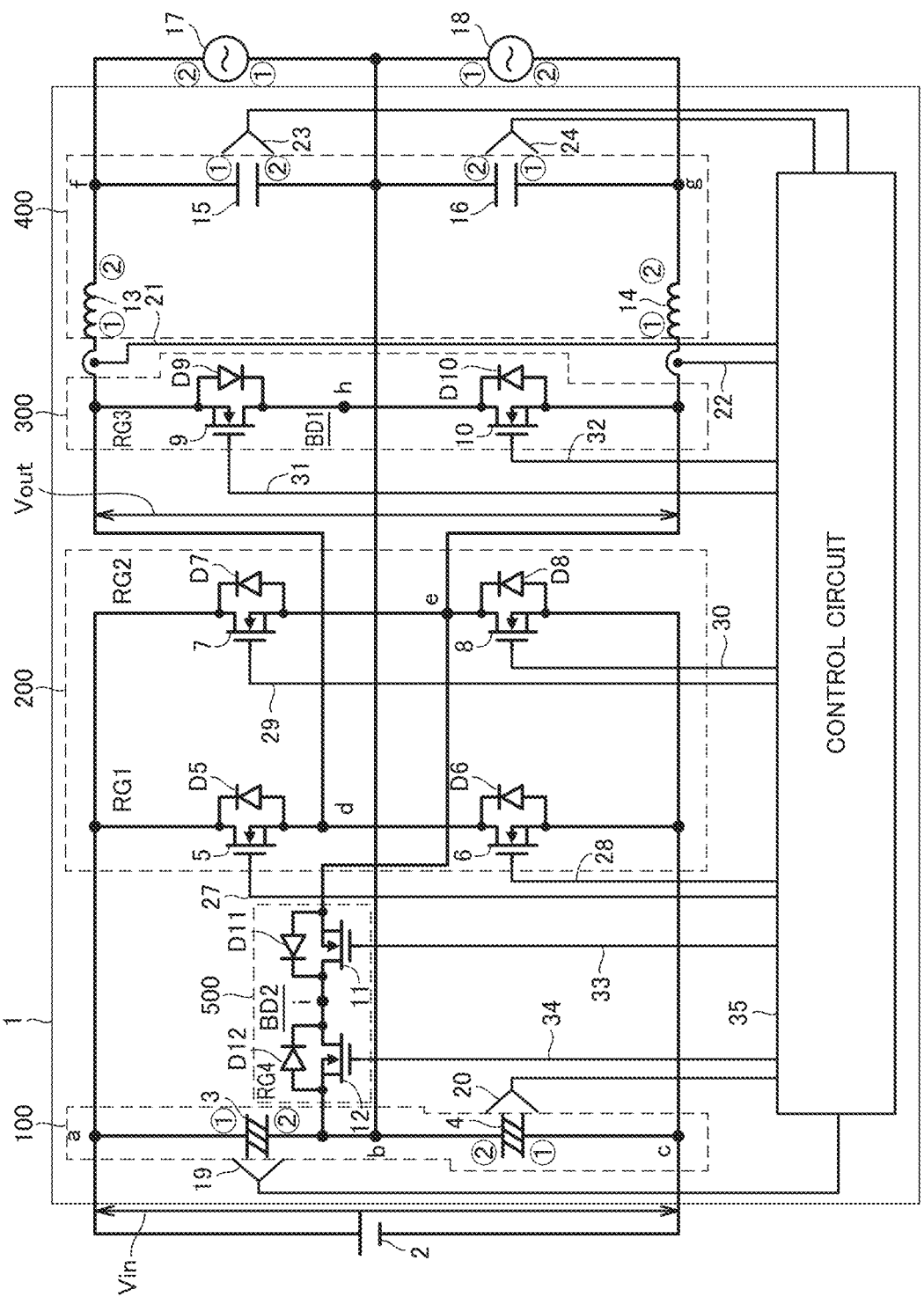
FIG. 33 is a view illustrating a configuration of a power conversion device 1 according to a fourth embodiment.

FIG. 33 is a view illustrating a configuration of a power conversion device 1 according to a fourth embodiment.

Power conversion device 1 of the fourth embodiment is different from power conversion device 1 of the first embodiment in the disposition of second bidirectional switch BD2 constituting fourth leg RG4.

Second bidirectional switch BD2 is disposed between node b and node e.

Second bidirectional switch BD2 includes a switching element 11 (eighth switching element), a switching element 12 (seventh switching element), a diode D11 (eighth diode), and a diode D12 (seventh diode).

Switching element 12 is disposed between node b and node i. Switching element 11 is disposed between node i and node e. The negative electrode of switching element 11 is connected to node e. The negative electrode of switching element 12 is connected to node b. The positive electrode of switching element 12 and the positive electrode of switching element 11 are connected to node i.

Diode D12 is connected in antiparallel to switching element 12. Diode D11 is connected in antiparallel to switching element 11.

Also in the fourth embodiment, the effects similar to those of the first embodiment can be obtained.

Fifth Embodiment

Figure 34:
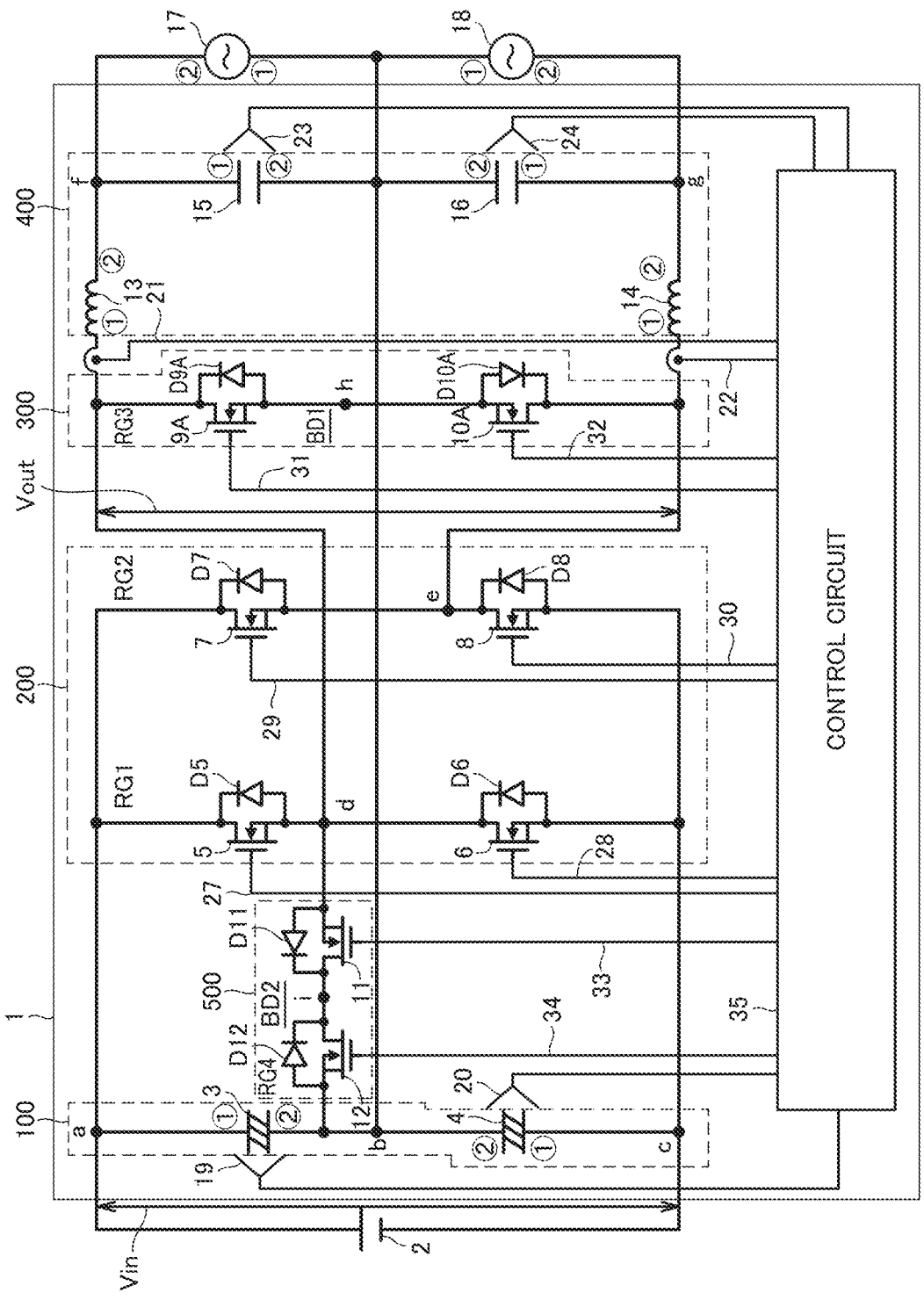
FIG. 34 is a view illustrating a configuration of a power conversion device 1 according to a fifth embodiment.

FIG. 34 is a view illustrating a configuration of a power conversion device 1 according to a fifth embodiment.

Power conversion device 1 of the fifth embodiment is different from power conversion device 1 of the first embodiment in clamp circuit 300.

Clamp circuit 300 includes third leg RG3 including first bidirectional switch BD1 disposed between node d and node e.

First bidirectional switch BD1 includes a switching element 9A (fifth switching element), a switching element 10A (sixth switching element), a diode D9A (fifth diode), and a diode D10A (sixth diode). Switching element 9A is disposed between node d and a node h (eighth node). Switching element 10A is disposed between node h and node e. The positive electrode of switching element 9A is connected to node d. The positive electrode of switching element 10A is connected to node e. The negative electrode of switching element 9A and the negative electrode of switching element 10A are connected to node h. Diode D9A is connected in antiparallel to switching element 9A. Diode D10A is connected in antiparallel to switching element 10A.

Switching elements 9A, 10A are configured by MOSFETs or IGBTs. When switching elements 9A, 10A are configured by IGBTs, the positive electrodes of switching elements 9A, 10A correspond to collectors, the negative electrodes correspond to emitters, and the control electrodes correspond to gates. When switching elements 9A, 10A are configured by MOSFETs, diodes D9A, D10A can use parasitic diodes formed in the direction from the source to the drain of the MOSFET.

Also in the fifth embodiment, the effects similar to those of the first embodiment can be obtained.

Sixth Embodiment

Figure 35:
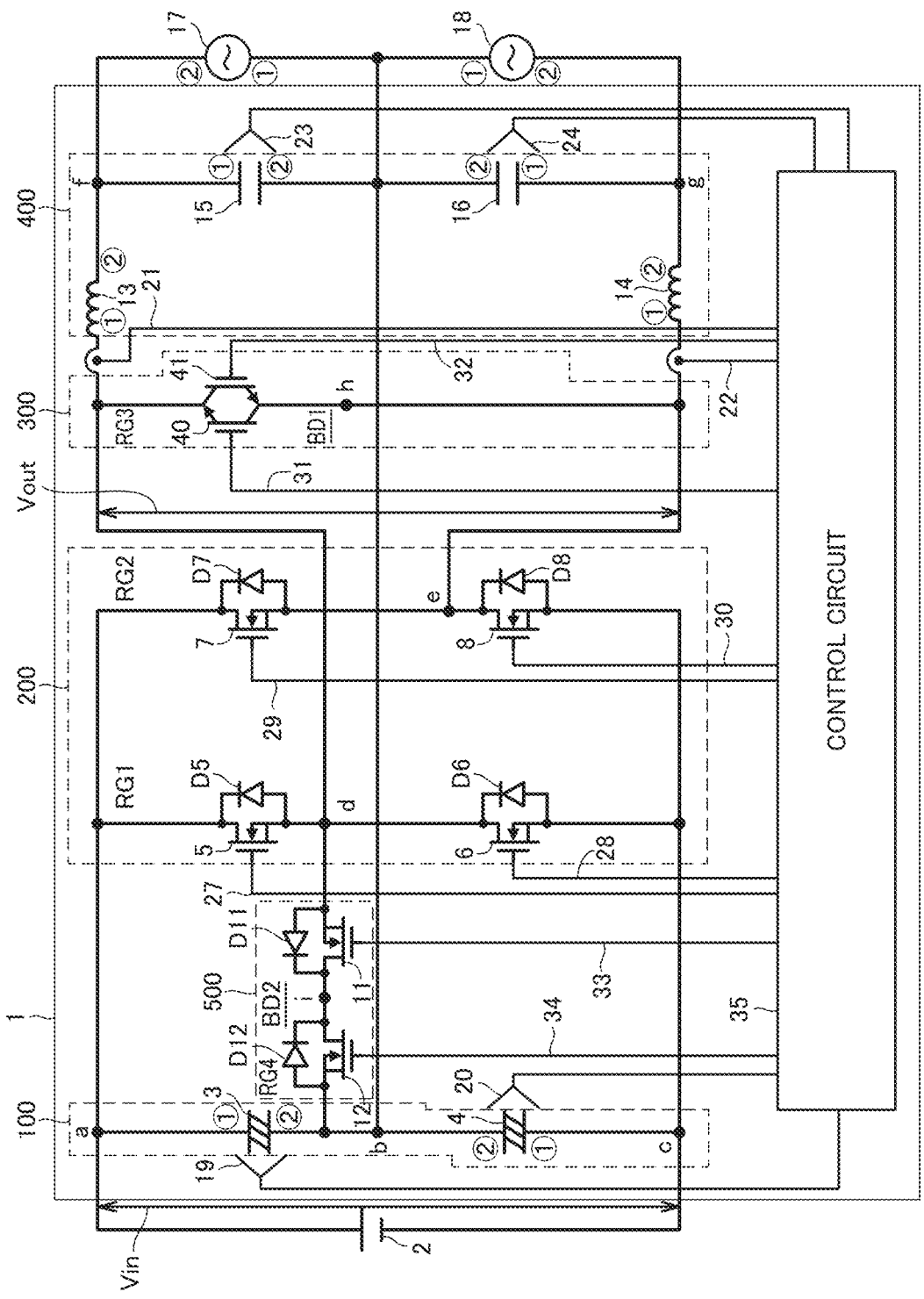
FIG. 35 is a view illustrating a configuration of a power conversion device 1 according to a sixth embodiment.

FIG. 35 is a view illustrating a configuration of a power conversion device 1 according to a sixth embodiment.

Power conversion device 1 of the sixth embodiment is different from power conversion device 1 of the first embodiment in clamp circuit 300.

Clamp circuit 300 includes third leg RG3 including first bidirectional switch BD1 disposed between node d and node e.

First bidirectional switch BD1 includes a switching element 40 (fifth switching element) and a switching element 41 (sixth switching element) that are connected in antiparallel between node d and node e. Switching element 40 and switching element 41 have withstand voltages in opposite directions.

The positive electrode of switching element 40 and the negative electrode of switching element 41 may be connected to node d, and the negative electrode of switching element 40 and the positive electrode of switching element 41 may be connected to node e. Alternatively, the negative electrode of switching element 40 and the positive electrode of switching element 41 may be connected to node d, and the positive electrode of switching element 40 and the negative electrode of switching element 41 may be connected to node e.

Switching elements 40, 41 is configured by IGBTs having withstand voltages in opposite directions. The positive electrode of each of switching elements 40, 41 corresponds to the collector, the negative electrode corresponds to the emitter, and the control electrode corresponds to the gate.

The flow and interruption of the current in both directions can be controlled by switching element 40 and switching element 41.

Also in the sixth embodiment, the effects similar to those of the first embodiment can be obtained.

Seventh Embodiment

Figure 36:
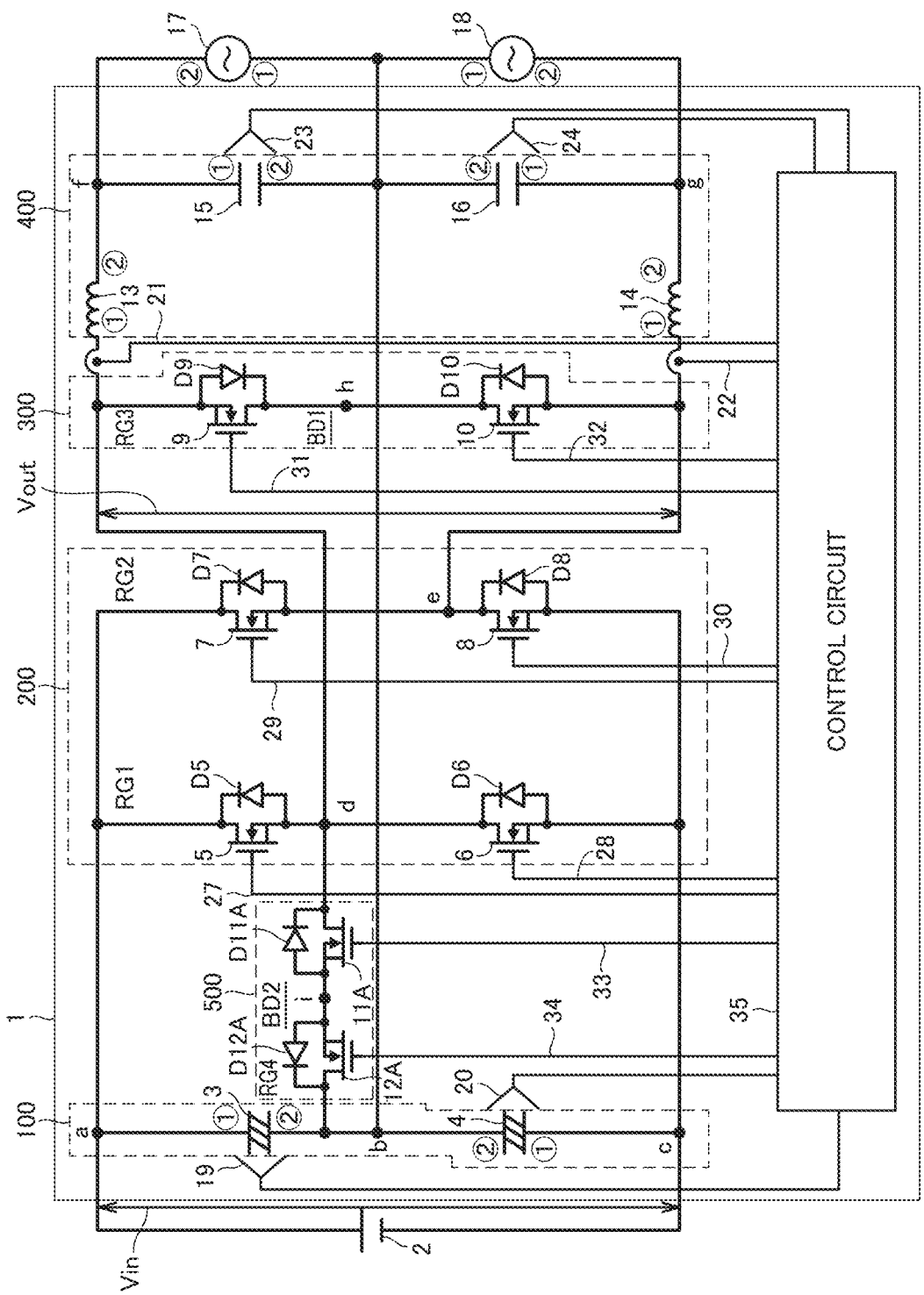
FIG. 36 is a view illustrating a configuration of a power conversion device 1 according to a seventh embodiment.

FIG. 36 is a view illustrating a configuration of a power conversion device 1 according to a seventh embodiment.

Power conversion device 1 of the seventh embodiment is different from power conversion device 1 of the first embodiment in fourth leg 500.

Fourth leg 500 (RG4) includes second bidirectional switch BD2 disposed between node b and node d.

Second bidirectional switch BD2 includes a switching element 11A (eighth switching element), a switching element 12A (seventh switching element), a diode D11A (eighth diode), and a diode D12A (seventh diode).

Switching element 12A is disposed between node b and node i. Switching element 11A is disposed between node i and node d. The positive electrode of switching element 12A is connected to node b. The positive electrode of switching element 11A is connected to node d. The negative electrode of switching element 12A and the negative electrode of switching element 11A are connected to node i.

Diode D12A is connected in antiparallel to switching element 12A. Diode D11A is connected in antiparallel to switching element 11A.

The switching elements 11A, 12A are constituted by MOSFETs or IGBTs. When switching elements 11A, 12A are configured by IGBTs, the positive electrodes of switching elements 11A, 12A correspond to collectors, the negative electrodes correspond to emitters, and the control electrodes correspond to gates. When switching elements 11A, 12A are constituted by MOSFETs, diodes D11A, D12A can use parasitic diodes formed in the direction from the source to the drain of the MOSFET.

Also in the seventh embodiment, the effects similar to those of the first embodiment can be obtained.

Eighth Embodiment

Figure 37:
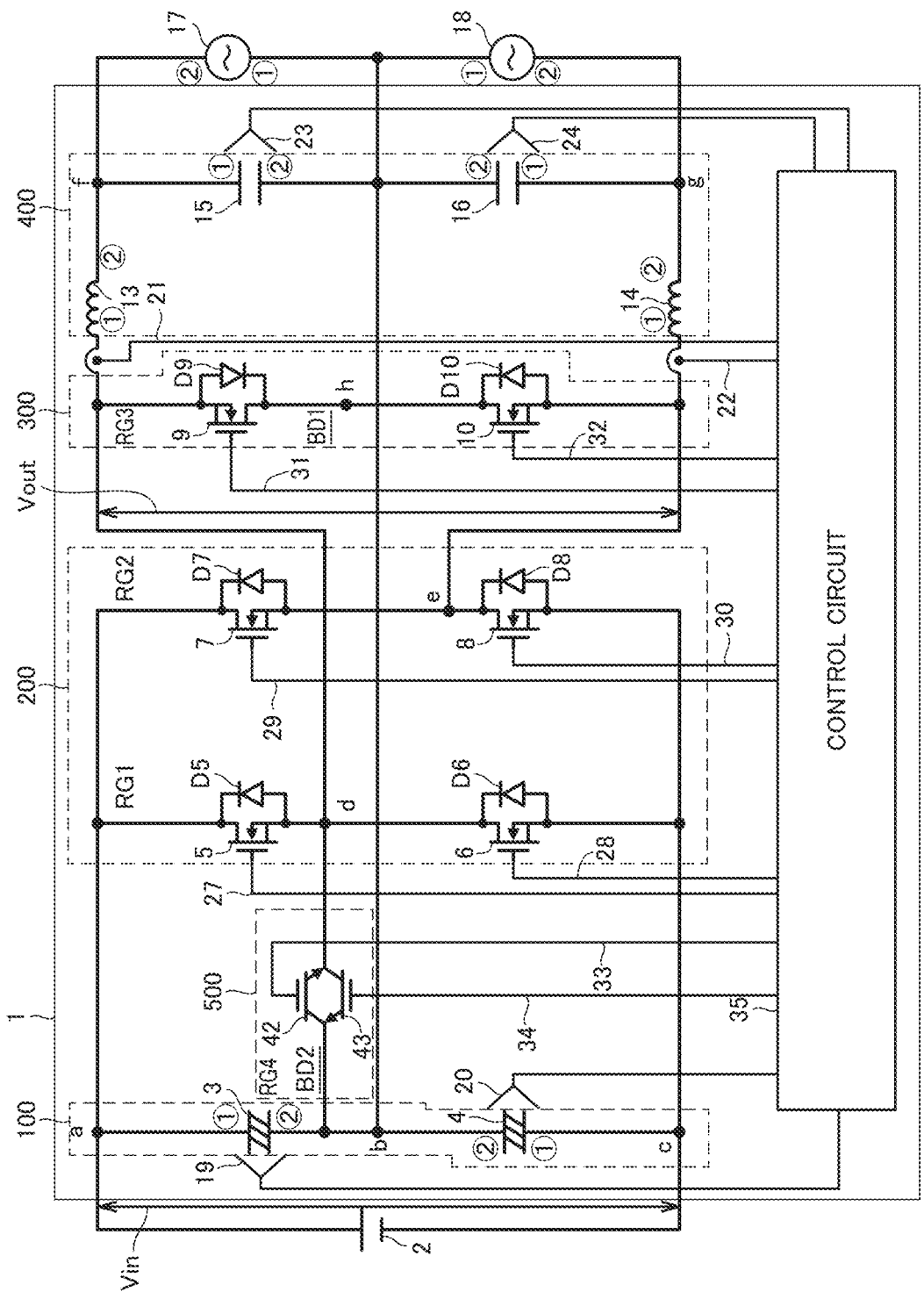
FIG. 37 is a view illustrating a configuration of a power conversion device 1 according to an eighth embodiment.

FIG. 37 is a view illustrating a configuration of a power conversion device 1 according to an eighth embodiment.

Power conversion device 1 of the eighth embodiment is different from power conversion device 1 of the first embodiment in fourth leg 500.

Fourth leg 500 (RG4) includes second bidirectional switch BD2 disposed between node b and node d.

Second bidirectional switch BD2 includes a switching element 42 (seventh switching element) and a switching element 43 (eighth switching element) that are connected in antiparallel between node b and node d. Switching element 42 and switching element 43 have withstand voltages in opposite directions.

The positive electrode of switching element 42 and the negative electrode of switching element 43 may be connected to node b, and the negative electrode of switching element 42 and the positive electrode of switching element 43 may be connected to node d. Alternatively, the negative electrode of switching element 42 and the positive electrode of switching element 43 may be connected to node b, and the positive electrode of switching element 42 and the negative electrode of switching element 43 may be connected to node d.

Switching elements 42, 43 is configured by IGBTs having withstand voltages in opposite directions. The positive electrode of each of switching elements 42, 43 corresponds to the collector, the negative electrode corresponds to the emitter, and the control electrode corresponds to the gate.

The flow and interruption of the current in both directions can be controlled by switching element 42 and switching element 43.

Also in the eighth embodiment, the effects similar to those of the first embodiment can be obtained.

Ninth Embodiment

Figure 38:
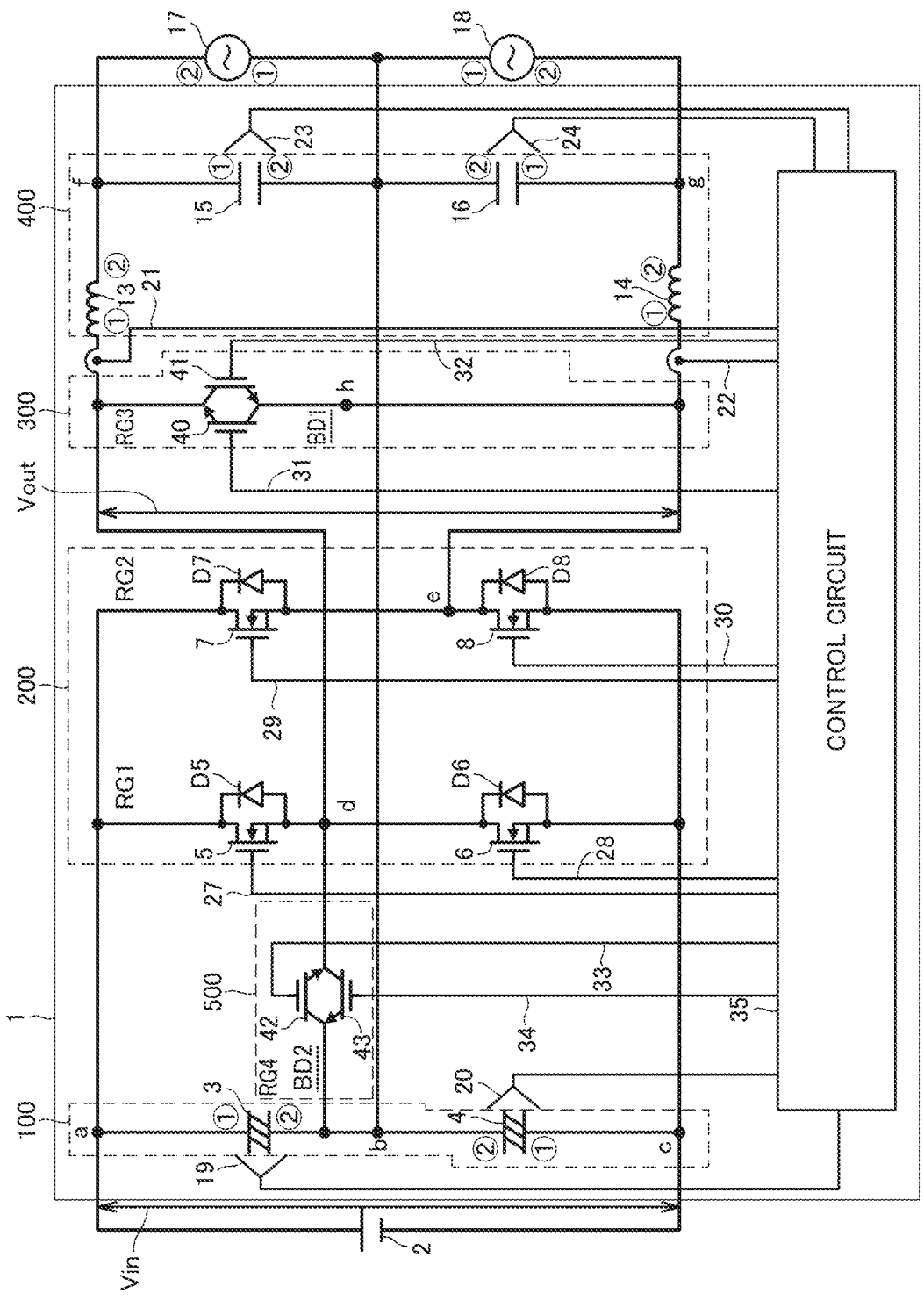
FIG. 38 is a view illustrating a configuration of a power conversion device 1 according to a ninth embodiment.

FIG. 38 is a view illustrating a configuration of a power conversion device 1 according to a ninth embodiment.

Power conversion device 1 of the ninth embodiment is different from power conversion device 1 of the first embodiment in clamp circuit 300 and fourth leg 500.

Clamp circuit 300 is similar to that of the sixth embodiment. Fourth leg 500 is similar to that of the eighth embodiment.

The flow and interruption of the current in both directions can be controlled by switching element 40 and switching element 41. The flow and interruption of the current in both directions can be controlled by switching element 42 and switching element 43.

Also in the ninth embodiment, the effects similar to those of the first embodiment can be obtained.

Tenth Embodiment

Figure 39:
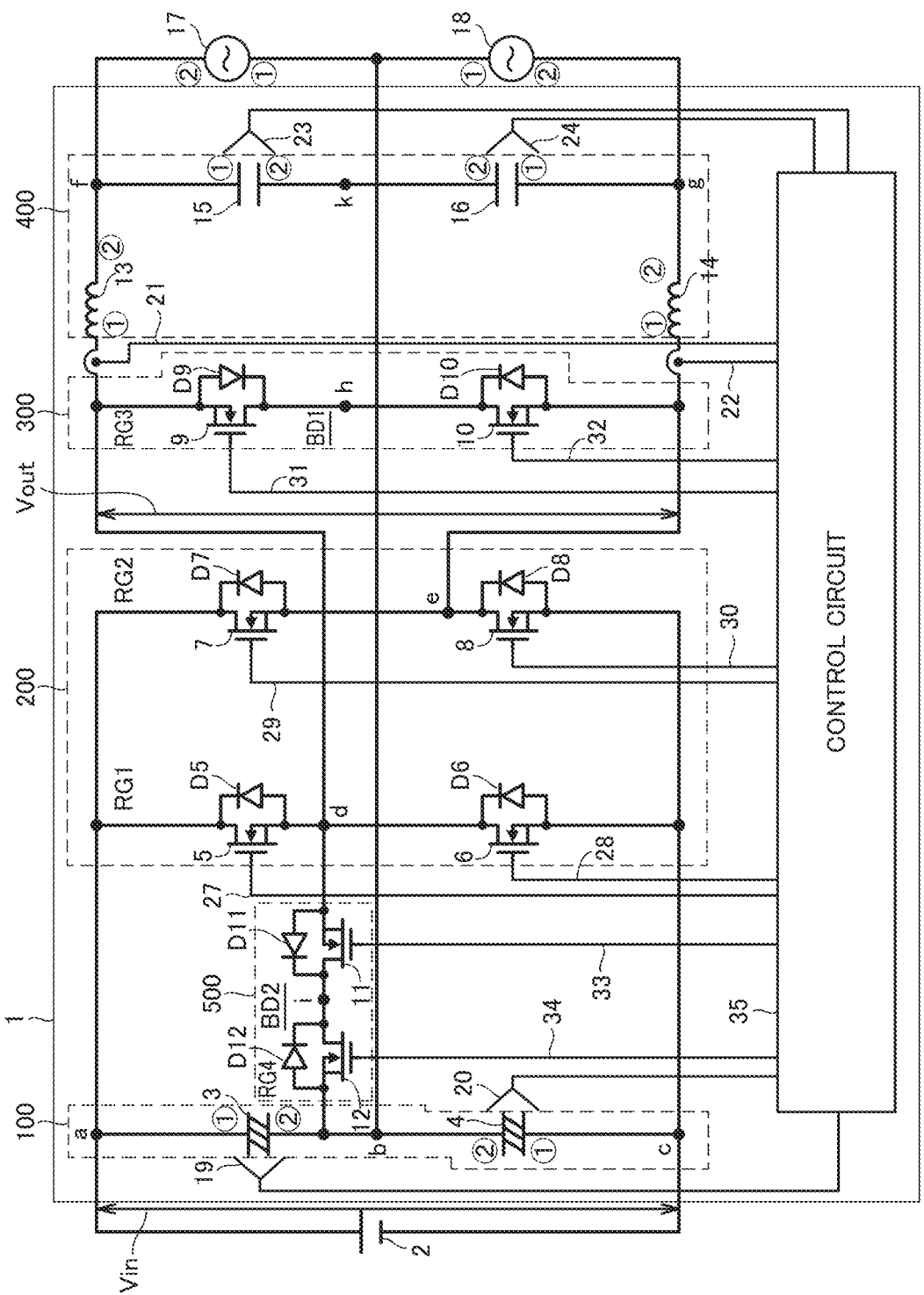
FIG. 39 is a view illustrating a configuration of a power conversion device 1 according to a tenth embodiment.

FIG. 39 is a view illustrating a configuration of a power conversion device 1 according to a tenth embodiment.

Power conversion device 1 of the tenth embodiment is different from power conversion device 1 of the first embodiment in a second filter circuit 400.

Second filter circuit 400 includes a capacitor 15 (third capacitor) connected in series between node f and node g, a capacitor 16 (fourth capacitor), and reactors 13, 14 similar to those in the first embodiment. The first terminal of capacitor 15 is connected to node f, and the second terminal of capacitor 15 is connected to a node k (eleventh node) different from node b. The first terminal of capacitor 16 is connected to node g, and the second terminal of capacitor 16 is connected to node k.

Also in the tenth embodiment, the effects similar to those of the first embodiment can be obtained.

Eleventh Embodiment

Figure 40:
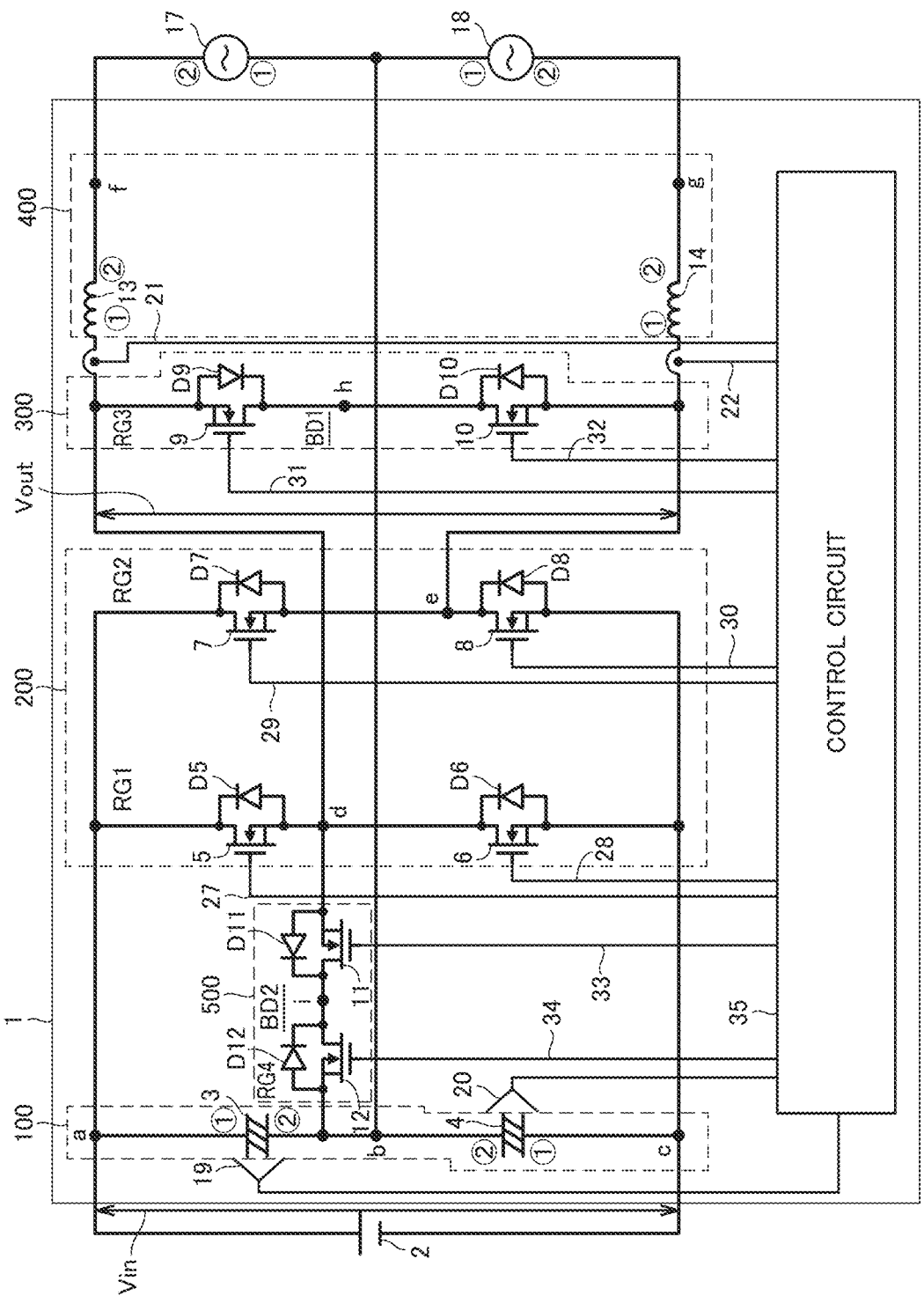
FIG. 40 is a view illustrating a configuration of a power conversion device 1 according to an eleventh embodiment.

FIG. 40 is a view illustrating a configuration of a power conversion device 1 according to an eleventh embodiment.

Power conversion device 1 of the eleventh embodiment is different from power conversion device 1 of the first embodiment in that second filter circuit 400 does not include capacitors 15, 16 in power conversion device 1 of the eleventh embodiment. Second filter circuit 400 includes reactors 13, 14 similarly to the first embodiment.

Also in the eleventh embodiment, the effects similar to those of the first embodiment can be obtained.

In the first to eleventh embodiments, the case where the phase of the AC voltage and the phase of the AC current are the same has been described as an example, but the present invention is not limited thereto. The phase of the AC voltage and the phase of the AC current may be shifted by $\pi$. Furthermore, a shift amount between the phase of the AC voltage and the phase of the AC current may be other than $\pi$. Even in such a case, the power conversion device includes the second bidirectional switch, so that the stable operation can be continued as compared with the case where the power conversion device does not include the second bidirectional switch.

It should be considered that the disclosed embodiments are an example in all respects and not restrictive. The scope of the present invention is defined by not the description above, but the claims, and it is intended that all modifications within the meaning and scope of the claims and their equivalents are included in the present invention.

REFERENCE SIGNS LIST

1: power conversion device
2: DC power supply
3, 4, 15, 16: capacitor
5 to 12, 9A, 10A, 11A, 12A, 40, 41, 42, 43: switching element
13, 14, 36, 37: reactor
17, 18: AC power supply
19, 20, 23, 24: voltage detector
21, 22: current detector
27 to 34: drive signal
100: first filter circuit
200: bridge circuit
300: clamp circuit
400: second filter circuit
500: fourth leg
BD1, BD2: bidirectional switch
SW: changeover switch
D5 to D12, D9A, D10A, D11A, D12A: diode
RG1 to RG4: leg
a to k: node

The invention claimed is:
1. A three-level power conversion device comprising:
a first filter circuit including:
  a first capacitor disposed between a first node to which a positive electrode of a DC power supply is connected and a second node; and
  a second capacitor disposed between the second node and a third node to which a negative electrode of the DC power supply is connected;
a bridge circuit including a first leg and a second leg disposed in parallel between the first node and the third node;
a clamp circuit including a third leg including a first bidirectional switch disposed between a fourth node that is a midpoint of the first leg and a fifth node that is a midpoint of the second leg;
a second filter circuit including:
  a first reactor including a first terminal connected to the fourth node and a second terminal connected to a sixth node; and
  a second reactor including a first terminal connected to the fifth node and a second terminal connected to a seventh node; and
a fourth leg including a second bidirectional switch disposed between the second node and the fourth node or the fifth node,
the second node being connected to a first terminal of a first AC power supply and a first terminal of a second AC power supply, the sixth node being connected to a second terminal of the first AC power supply, and the seventh node being connected to a second terminal of the second AC power supply.
2. The three-level power conversion device according to claim 1, wherein
the first leg includes:
  a first switching element disposed between the first node and the fourth node;
  a second switching element disposed between the fourth node and the third node;
  a first diode connected in antiparallel to the first switching element; and
  a second diode connected in antiparallel to the second switching element, and the second leg includes:
  a third switching element disposed between the first node and the fifth node;
  a fourth switching element disposed between the fifth node and the third node;
  a third diode connected in antiparallel to the third switching element; and
  a fourth diode connected in antiparallel to the fourth switching element.
3. The three-level power conversion device according to claim 2, wherein
the first bidirectional switch includes:
  a fifth switching element disposed between the fourth node and an eighth node and a sixth switching element disposed between the eighth node and the fifth node;
  a fifth diode connected in antiparallel to the fifth switching element; and
  a sixth diode connected in antiparallel to the sixth switching element, and
a positive electrode of the fifth switching element and a positive electrode of the sixth switching element are connected to the eighth node.
4. The three-level power conversion device according to claim 2, wherein
the first bidirectional switch includes:
  a fifth switching element disposed between the fourth node and an eighth node and a sixth switching element disposed between the eighth node and the fifth node;
  a fifth diode connected in antiparallel to the fifth switching element; and
  a sixth diode connected in antiparallel to the sixth switching element, and
a negative electrode of the fifth switching element and a negative electrode of the sixth switching element are connected to the eighth node.
5. The three-level power conversion device according to claim 2, wherein the first bidirectional switch includes a fifth switching element and a sixth switching element that are connected in antiparallel between the fourth node and the fifth node.
6. The three-level power conversion device according to claim 3, wherein
the second bidirectional switch includes:
  a seventh switching element disposed between the second node and a ninth node and an eighth switching element disposed between the ninth node and the fourth node;
  a seventh diode connected in antiparallel to the seventh switching element; and
  an eighth diode connected in antiparallel to the eighth switching element, and
a positive electrode of the seventh switching element and a positive electrode of the eighth switching element are connected to the ninth node.
7. The three-level power conversion device according to claim 3, wherein
the second bidirectional switch includes:
  a seventh switching element disposed between the second node and a ninth node and an eighth switching element disposed between the ninth node and the fourth node;
  a seventh diode connected in antiparallel to the seventh switching element; and
  an eighth diode connected in antiparallel to the eighth switching element, and a negative electrode of the seventh switching element and a negative electrode of the eighth switching element are connected to the ninth node.

8. The three-level power conversion device according to claim 3, wherein the second bidirectional switch includes a seventh switching element and an eighth switching element that are connected in antiparallel between the second node and the fourth node.

9. The three-level power conversion device according to claim 1, wherein a level of a drive signal driving the first bidirectional switch is identical to a level of a drive signal driving the second bidirectional switch.

10. The three-level power conversion device according to claim 1, wherein the first reactor and the second reactor are magnetically coupled to each other.

11. The three-level power conversion device according to claim 6, wherein
the second filter circuit further includes a third capacitor and a fourth capacitor that are connected in series between the sixth node and the seventh node.

12. The three-level power conversion device according to claim 11, wherein
a first terminal of the third capacitor is connected to the sixth node, and a second terminal of the third capacitor is connected to the second node, and
a first terminal of the fourth capacitor is connected to the seventh node, and a second terminal of the fourth capacitor is connected to the second node.

13. The three-level power conversion device according to claim 6, wherein
the second filter circuit further includes a third capacitor disposed between the sixth node and the second node and a fourth capacitor disposed between the second node and the seventh node,
the first terminal of the first AC power supply and the first terminal of the second AC power supply are connected to the second node via a changeover switch,
the three-level power conversion device further comprising
a control circuit to turn on the changeover switch during single-phase three-wire operation, and turns off the changeover switch during single-phase two-wire operation.

14. The three-level power conversion device according to claim 13, wherein the control circuit always turns off the second bidirectional switch during the single-phase two-wire operation.

15. The three-level power conversion device according to claim 12, further comprising a control circuit to:
always turn on the fifth switching element and the eighth switching element;
always turn off the second switching element and the third switching element;
perform switching control of the first switching element and the fourth switching element at identical timing;
perform switching control of the sixth switching element and the seventh switching element at timing complementary to timing of switching of the first switching element and the fourth switching element; and
set a dead time during which the first switching element, the fourth switching element, the sixth switching element, and the seventh switching element are simultaneously turned off,
when a potential of the first terminal of the third capacitor is positive, a potential of the second terminal of the third capacitor is negative, a potential of the first terminal of the fourth capacitor is negative, a potential of the second terminal of the fourth capacitor is positive, and current flows from the first terminal of the first reactor to the second terminal of the first reactor.

16. The three-level power conversion device according to claim 15, further comprising a back control circuit to:
always turn on the sixth switching element and the seventh switching element;
always turn off the first switching element and the fourth switching element;
perform switching control of the second switching element and the third switching element at identical timing;
perform switching control of the fifth switching element and the eighth switching element at timing complementary to timing of switching of the second switching element and the third switching element; and
set the dead time during which the second switching element, the third switching element, the fifth switching element, and the eighth switching element are simultaneously turned off,
when the potential of the first terminal of the third capacitor is negative, the potential of the second terminal of the third capacitor is positive, the potential of the first terminal of the fourth capacitor is positive, the potential of the second terminal of the fourth capacitor is negative, and the current flows from the second terminal of the first reactor to the first terminal of the first reactor.

17. The three-level power conversion device according to claim 14, wherein during the single-phase two-wire operation, the control circuit to:
always turn on the fifth switching element;
always turn off the second switching element, the third switching element, the seventh switching element, and the eighth switching element;
perform switching control of the first switching element and the fourth switching element at identical timing;
perform switching control of the sixth switching element at timing complementary to switching timing of the first switching element and the fourth switching element; and
set a dead time during which the first switching element, the fourth switching element, and the sixth switching element are simultaneously turned off,
when a potential of the first terminal of the third capacitor is positive, a potential of the second terminal of the third capacitor is negative, a potential of the first terminal of the fourth capacitor is negative, a potential of the second terminal of the fourth capacitor is positive, and a current flows from the first terminal of the first reactor to the second terminal of the first reactor.

18. The three-level power conversion device according to claim 17, wherein during the single-phase two-wire operation, the control circuit to:
always turn on the sixth switching element;
always turn off the first switching element, the fourth switching element, the seventh switching element, and the eighth switching element;
perform switching control of the second switching element and the third switching element at identical timing;
perform switching control of the fifth switching element at timing complementary to timing of switching of the second switching element and the third switching element; and set a dead time during which the second switching element, the third switching element, and the fifth switching element are simultaneously turned off,
when the potential of the first terminal of the third capacitor is negative, the potential of the second terminal of the third capacitor is positive, the potential of the first terminal of the fourth capacitor is positive, the potential of the second terminal of the fourth capacitor is negative, and the current flows from the second terminal of the first reactor to the first terminal of the first reactor.

* * * * *